United States Patent
Unno et al.

(10) Patent No.: US 10,205,334 B2
(45) Date of Patent: Feb. 12, 2019

(54) POWER SUPPLY SYSTEM, TRANSPORTATION DEVICE, AND POWER TRANSMISSION METHOD

(71) Applicant: HONDA MOTOR CO., LTD., Tokyo (JP)

(72) Inventors: Ryota Unno, Wako (JP); Daijiro Takizawa, Wako (JP); Masahiro Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 15/429,160

(22) Filed: Feb. 10, 2017

(65) Prior Publication Data

US 2017/0232851 A1   Aug. 17, 2017

(30) Foreign Application Priority Data

Feb. 12, 2016   (JP) .................. 2016-024638

(51) Int. Cl.
*H02J 7/00* (2006.01)
*B60L 11/18* (2006.01)
(Continued)

(52) U.S. Cl.
CPC .......... *H02J 7/0068* (2013.01); *B60L 3/0046* (2013.01); *B60L 7/14* (2013.01); *B60L 11/1803* (2013.01);
(Continued)

(58) Field of Classification Search
CPC ...... B60L 11/1803; B60L 3/0046; B60L 7/14; B60L 11/1859; B60L 11/1862;
(Continued)

(56) References Cited

U.S. PATENT DOCUMENTS

2009/0130538 A1\* 5/2009 Kaita ................ G01R 31/3662
429/50

FOREIGN PATENT DOCUMENTS

| JP | 10-290532 | 10/1998 |
| JP | 2013-541309 | 11/2013 |
| JP | 2015-070726 | 4/2015 |

OTHER PUBLICATIONS

Japanese Office Action for corresponding JP Application No. 2016-024638, dated Sep. 26, 2017 (w/ English machine translation).

\* cited by examiner

*Primary Examiner* — Daniel Cavallari-See
(74) *Attorney, Agent, or Firm* — Mori & Ward, LLP

(57) ABSTRACT

A power supply system includes a first energy storage, a second energy storage, a power transmission circuit, and circuitry. The circuitry acquires a request supply amount, a request output amount, and failure detection information. The circuitry controls the power transmission circuit in accordance with the at least one of the request supply amount and the request output amount such that a ratio of an amount of electric power supplied from or to the first energy storage and an amount of electric power supplied from or to the second energy storage is to be a first ratio in a normal operating. The circuitry controls the power transmission circuit in accordance with the at least one of the request supply amount and the request output amount such that the ratio is to be a second ratio which is different from the first ration in a partial failure state.

16 Claims, 24 Drawing Sheets

(51) Int. Cl.
 *H02J 7/16* (2006.01)
 *H02J 7/24* (2006.01)
 *H02P 27/08* (2006.01)
 *B60L 3/00* (2006.01)
 *B60L 7/14* (2006.01)
 *H02J 7/34* (2006.01)

(52) U.S. Cl.
 CPC ....... *B60L 11/1859* (2013.01); *B60L 11/1862* (2013.01); *B60L 11/1864* (2013.01); *B60L 11/1868* (2013.01); *H02J 7/0026* (2013.01); *H02J 7/0054* (2013.01); *H02J 7/0065* (2013.01); *H02J 7/163* (2013.01); *H02J 7/242* (2013.01); *H02P 27/08* (2013.01); *B60L 2210/10* (2013.01); *B60L 2240/527* (2013.01); *B60L 2240/529* (2013.01); *B60L 2240/545* (2013.01); *B60L 2240/547* (2013.01); *B60L 2240/549* (2013.01); *H02J 7/0077* (2013.01); *H02J 7/345* (2013.01)

(58) Field of Classification Search
 CPC . B60L 11/1864; B60L 11/1868; H02J 7/0026; H02J 7/0054; H02J 7/0065; H02J 7/0068; H02J 7/163; H02J 7/242; H02P 27/08
 See application file for complete search history.

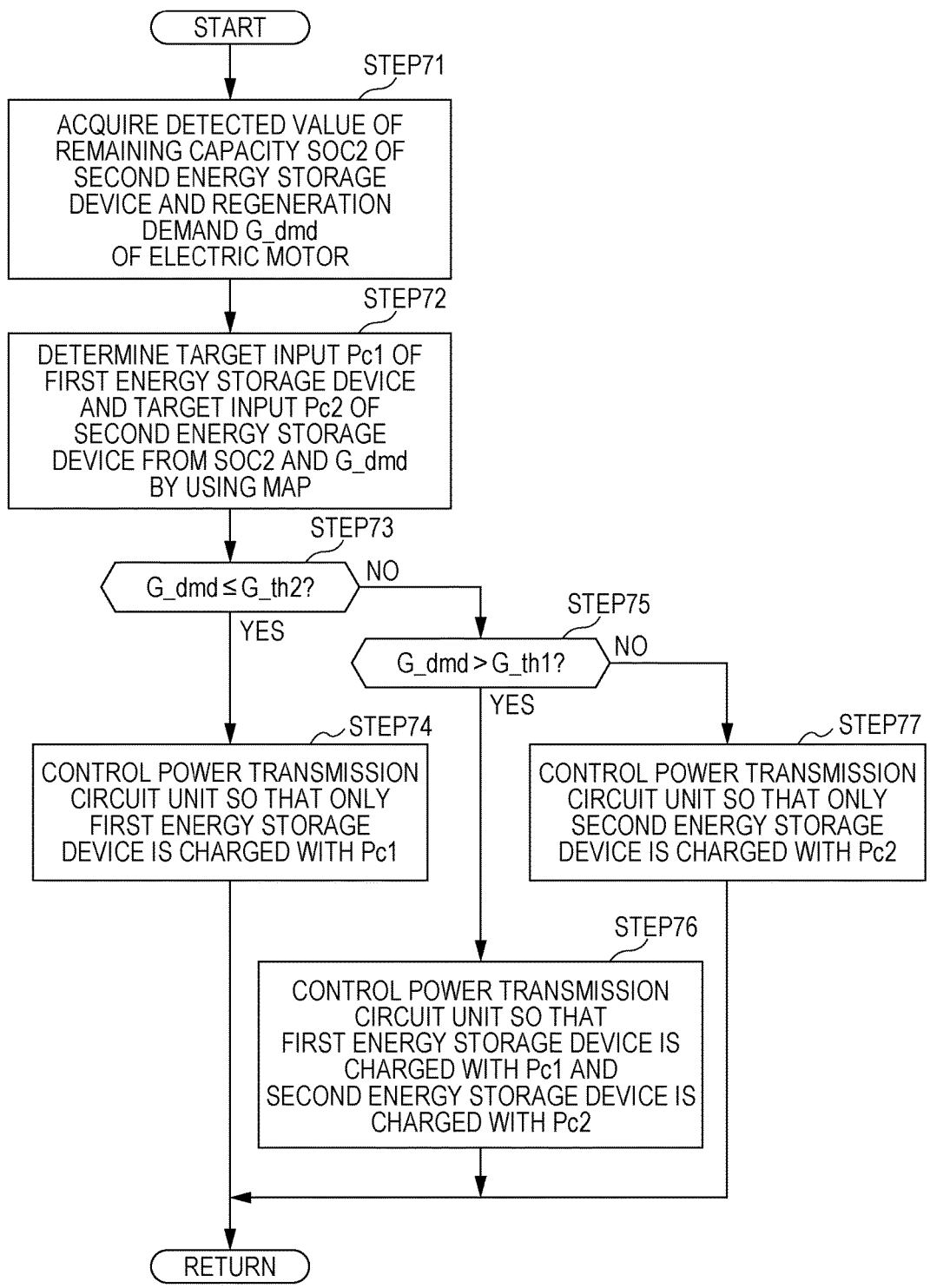

POWER SUPPLY SYSTEM, TRANSPORTATION DEVICE, AND POWER TRANSMISSION METHOD

CROSS-REFERENCE TO RELATED APPLICATIONS

The present application claims priority under 35 U.S.C. § 119 to Japanese Patent Application No. 2016-024638, filed Feb. 12, 2016, entitled "Power Supply System, Transportation Device, and Power Transmission Method." The contents of this application are incorporated herein by reference in their entirety.

BACKGROUND

1. Field

The present disclosure relates to a power supply system, a transportation device, and a power transmission method.

2. Description of the Related Art

In the related art, there is known a power supply system of this type, for example, as disclosed in Japanese Unexamined Patent Application Publication No. 2015-70726, a system for supplying power to an electric motor for a vehicle by using two energy storage devices, namely, a high-capacity energy storage device having a relatively high capacity and a high-power energy storage device having a relatively high upper limit on power that can be output.

SUMMARY

According to a first aspect of the present invention, a power supply system includes a first energy storage, a second energy storage, a power transmission circuit, and circuitry. The first energy storage supplies electric power to an electric load and to be charged by the electric load. The first energy storage includes a plurality of energy storage units connected to each other in parallel. The second energy storage supplies electric power to the electric load and to be charged by the electric load. The electric load is connected to the first energy storage and to the second energy storage via the power transmission circuit. The circuitry is configured to acquire at least one of a request supply amount of electric power to be supplied to the electric load and a request output amount of regenerative electric power output from the electric load. The circuitry is configured to acquire failure detection information indicating whether there is a failure in each of the plurality of energy storage units of the first energy storage. The circuitry is configured to control the power transmission circuit to control electric power transmission among the electric load and at least one of the first energy storage and the second energy storage in accordance with the at least one of the request supply amount and the request output amount such that a ratio of an amount of electric power supplied from or to the first energy storage and an amount of electric power supplied from or to the second energy storage is to be a first ratio in a normal operating state in which no failure is detected in all of the plurality of energy storage units of the first energy storage based on the failure detection information. The circuitry is configured to control the power transmission circuit to control the electric power transmission in accordance with the at least one of the request supply amount and the request output amount such that the ratio is to be a second ratio which is different from the first ration in a partial failure state in which at least one failure is detected in the plurality of energy storage units of the first energy storage based on the failure detection information.

According to a second aspect of the present invention, a power transmission method for performing power transmission among an electric load, a first energy storage, and a second energy storage, the first energy storage including a plurality of energy storage units connected to each other in parallel, the power transmission method includes acquiring at least one of a request supply amount of electric power to be supplied to the electric load and a request output amount of regenerative electric power output from the electric load. The power transmission method includes acquiring failure detection information indicating whether there is a failure in each of the plurality of energy storage units of the first energy storage. The power transmission method includes controlling electric power transmission among the electric load and at least one of the first energy storage and the second energy storage in accordance with the at least one of the request supply amount and the request output amount such that a ratio of an amount of electric power supplied from or to the first energy storage and an amount of electric power supplied from or to the second energy storage is to be a first ratio in a normal operating state in which no failure is detected in all of the plurality of energy storage units of the first energy storage based on the failure detection information. The power transmission method includes controlling the electric power transmission in accordance with the at least one of the request supply amount and the request output amount such that the ratio is to be a second ratio which is different from the first ration in a partial failure state in which at least one failure is detected in the plurality of energy storage units of the first energy storage based on the failure detection information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 27 is a flowchart illustrating a control process (a third embodiment) executed by the control device in the normal operating state of the first energy storage device during the regenerative operation of the electric motor.

DESCRIPTION OF THE EMBODIMENTS

Figure 1:
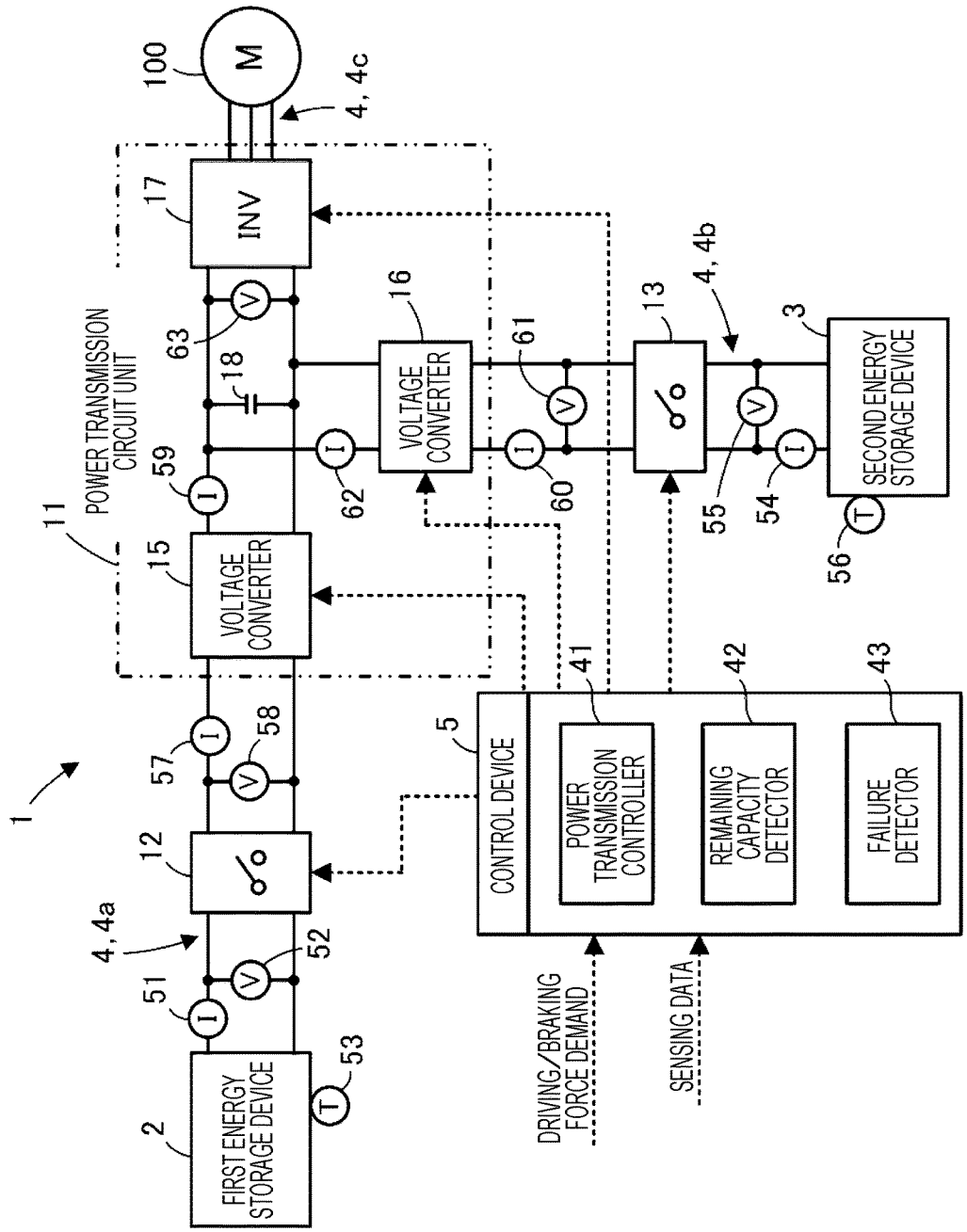
FIG. 1 illustrates an overall configuration of a power supply system according to embodiments of the present disclosure.

The embodiments will now be described with reference to the accompanying drawings, wherein like reference numerals designate corresponding or identical elements throughout the various drawings.

First Embodiment

A first embodiment of the present disclosure will be described hereinafter with reference to FIG. 1 to FIG. 23. Referring to FIG. 1, a power supply system 1 according to this embodiment is a system for supplying power to an electric motor 100. The electric motor 100 is an example of an electric load.

In this embodiment, by way of example, the power supply system 1 is mounted in a transportation device, for example, an electrically driven vehicle (not illustrated), that includes the electric motor 100 as a propulsion generator. The electric motor 100 is capable of performing a power-running operation for generating a driving force upon being supplied with power, and also performing a regenerative operation for outputting regenerative power by using the kinetic energy of the electrically driven vehicle (hereinafter sometimes referred to simply as vehicle).

The power supply system 1 includes a first energy storage device 2, a second energy storage device 3, a power transmission path 4 provided among the electric motor 100, the first energy storage device 2, and the second energy storage device 3, and a control device 5 having a function of controlling activation of the power supply system 1. The first energy storage device 2 and the second energy storage device 3 serve as power sources. The electric load for the power supply system 1 may also include electric loads such as auxiliaries, in addition to the electric motor 100.

In this embodiment, the first energy storage device 2 and the second energy storage device 3 are rechargeable energy storage devices having different characteristics. Specifically, the first energy storage device 2 and the second energy storage device 3 have the following characteristics.

The first energy storage device 2 is an energy storage device having a higher energy density than the second energy storage device 3. The energy density is an amount of electrical energy storable per unit weight or unit volume. Examples of the first energy storage device 2 may include a lithium-ion battery.

The second energy storage device 3 is an energy storage device having a higher power density than the first energy storage device 2. The power density is an amount of electricity that can be output per unit weight or unit volume (an amount of electrical energy per unit time or an amount of charge per unit time). Examples of the second energy storage device 3 may include a lithium-ion battery, a nickel-hydrogen battery, and a capacitor.

The first energy storage device 2 with a relatively high energy density is capable of storing a greater amount of electrical energy than the second energy storage device 3. The second energy storage device 3 with a relatively high power density has a lower impedance (internal resistance) than the first energy storage device 2, and is thus capable of outputting instantaneously high power.

In addition, the first energy storage device 2 is an energy storage device having a lower resistance to deterioration due to changes in the input or output (the amount of discharge power or the amount of charging power) of the first energy storage device 2 than the second energy storage device 3. Thus, if the first energy storage device 2 is discharged or charged in such a manner that changes in the input or output of the first energy storage device 2 frequently occur, deterioration of the first energy storage device 2 is more likely to progress than that of the second energy storage device 3. When the first energy storage device 2 is discharged or charged steadily in such a manner that changes in the input or output of the first energy storage device 2 are less likely to occur, progression of deterioration of the first energy storage device 2 is restrained, compared with when the first energy storage device 2 is discharged or charged in such a manner that changes in the input or output of the first energy storage device 2 frequently occur.

In contrast, even if the second energy storage device 3 having a relatively high resistance to deterioration due to changes in the input or output of the second energy storage device 3 is discharged in such a manner that changes in the input or output of the second energy storage device 3 frequently occur, deterioration of the second energy storage device 3 is less likely to progress than that of the first energy storage device 2.

Furthermore, the first energy storage device 2 and the second energy storage device 3 have the following discharging and charging characteristics. The first energy storage device 2 has a lower resistance to deterioration due to discharging and charging (in particular, discharging and charging at high rates) (i.e., deterioration caused by discharging and charging is more likely to progress) than the second energy storage device 3, whereas the second energy storage device 3 has a higher resistance to deterioration due to discharging and charging (i.e., deterioration caused by discharging and charging is less likely to progress) than the first energy storage device 2.

The second energy storage device 3 further has a characteristic in that discharging or charging with the remaining capacity being kept at an approximately intermediate value results in the progression of deterioration being prevented, compared with discharging or charging with the remaining capacity being biased toward the high-capacity side or the low-capacity side. More specifically, the second energy storage device 3 has a characteristic in that deterioration of the second energy storage device 3 is more likely to progress as the remaining capacity of the second energy storage device 3 increases to the high-capacity side or decreases to the low-capacity side from an approximately intermediate value.

Figure 2:
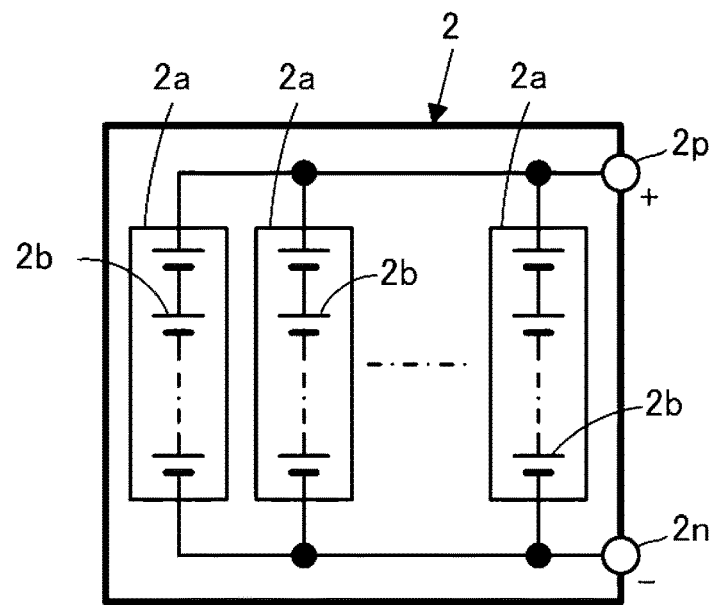
FIG. 2 illustrates a configuration of a first energy storage device in the power supply system according to the embodiments.

The first energy storage device 2 and the second energy storage device 3 are each constituted by a plurality of cells (unit cells). As illustrated in FIG. 2, the first energy storage device 2 with a relatively high energy density is configured such that a plurality of energy storage units 2a each having a plurality of cells 2b are connected in parallel between a pair of input/output terminals (power supply terminals) 2p and 2n of the first energy storage device 2.

In this case, in the example illustrated in FIG. 2, the plurality of cells 2b constituting each of the energy storage units 2a are connected in series. However, the plurality of cells 2b constituting each of the energy storage units 2a may be connected in such a manner that a series connection and a parallel connection are combined (for example, a plurality of cell groups each having a certain number of cells 2b greater than or equal to two connected in parallel are connected in series).

Switch elements (not illustrated) are interposed in current-carrying paths between the energy storage units 2a and the input/output terminals 2p and 2n in such a manner that each of the switch elements is provided for one of the energy storage units 2a. The switch element corresponding to each of the energy storage units 2a is controlled to be turned off, thereby enabling interruption of electrical connection between the energy storage unit 2a and the input/output terminals 2p and 2n (enabling the energy storage unit 2a to be electrically separated from the input/output terminals 2p and 2n).

The power transmission path 4 is constituted by a current-carrying line, a wiring pattern on a substrate, or the like. The power transmission path 4 is provided with a power transmission circuit unit 11 for controlling power transmission among the first energy storage device 2, the second energy storage device 3, and the electric motor 100.

The power transmission path 4 includes a power transmission path segment 4a for power transmission between the first energy storage device 2 and the power transmission circuit unit 11, a power transmission path segment 4b for power transmission between the second energy storage device 3 and the power transmission circuit unit 11, and a power transmission path segment 4c for power transmission between the electric motor 100 and the power transmission circuit unit 11. The power transmission path segments 4a and 4b are respectively provided with contactors 12 and 13 serving as switch units for connection and disconnection of the power transmission path segments 4a and 4b.

The power transmission circuit unit 11 is configured to be capable of controlling power transmission among the first energy storage device 2, the second energy storage device 3, and the electric motor 100 in accordance with a control signal provided by the control device 5. More specifically, the power transmission circuit unit 11 is capable of selectively switching between the source and destination of power supply and controlling an amount of power supplied (a supplied power) from the source to the destination in accordance with the provided control signal.

Specifically, the power transmission circuit unit 11 includes a voltage converter 15, a voltage converter 16, and an inverter 17. The voltage converter 15 is capable of boosting or stepping down a voltage input from the first energy storage device 2 and outputting the resulting voltage. The voltage converter 16 is capable of boosting or stepping down a voltage input from the second energy storage device 3 and outputting the resulting voltage. The inverter 17 is capable of converting direct-current (DC) power into alternating-current (AC) power and outputting the AC power.

The voltage converters 15 and 16 are connected in parallel on the input side of the inverter 17. The inverter 17 is further provided with a capacitor 18 on the input side thereof (the output side of the voltage converters 15 and 16). The capacitor 18 smoothes the DC voltage to be input to the inverter 17 (the DC voltage output from the voltage converter 15 or 16).

The power transmission circuit unit 11 may be a circuit unit including the contactors 12 and 13.

Figure 3:
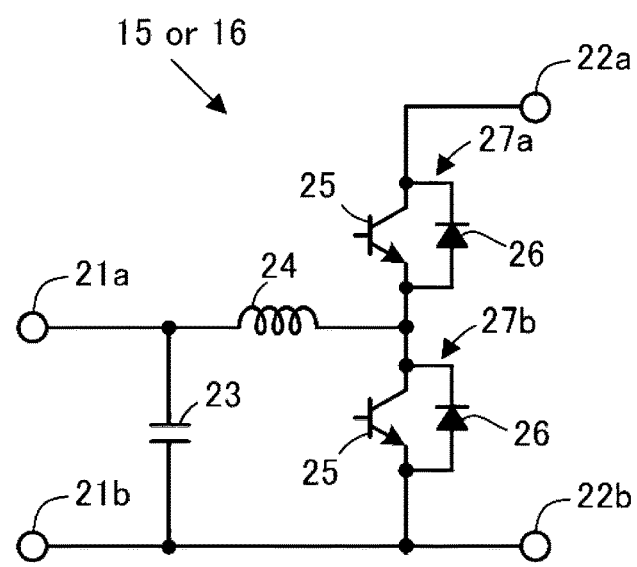
FIG. 3 illustrates an example circuit configuration of a voltage converter in the power supply system according to the embodiments.

The voltage converters 15 and 16 are so-called DC/DC converters, and may be each a known one. FIG. 3 illustrates an example circuit configuration of the voltage converters 15 and 16. The voltage converter 15 or 16 having the illustrated circuit configuration is a voltage converter capable of boosting the output voltage of the corresponding one of the first energy storage device 2 and the second energy storage device 3 and outputting the resulting voltage. The voltage converter 15 or 16 includes, between a pair of primary-side terminals 21a and 21b connected to the corresponding one of the first energy storage device 2 and the second energy storage device 3 and a pair of secondary-side terminals 22a and 22b connected to the inverter 17, a capacitor 23, a coil 24, and high-side and low-side two switch units 27a and 27b, which are connected in an illustrated manner. Each of the switch units 27a and 27b includes a semiconductor switch element 25, such as a transistor, and a diode 26, which are connected in parallel.

The voltage converter 15 or 16 having the configuration described above is capable of controlling the respective semiconductor switch elements 25 of the switch units 27a and 27b to be turned on or off in accordance with a control signal having a predetermined duty ratio (so-called duty signal) to output a DC voltage, which is obtained by boosting a DC voltage input to the primary-side terminals 21a and 21b at a required boosting ratio, from the secondary-side terminals 22a and 22b or to output a DC voltage, which is obtained by stepping down a DC voltage input to the secondary-side terminals 22a and 22b at a required step-down ratio, from the primary-side terminals 21a and 21b. The boosting ratio or the step-down ratio is variably controllable.

The voltage converter 15 or 16 is further capable of controlling the respective semiconductor switch elements 25 of the switch units 27a and 27b to be turned off to interrupt current flow (power transmission) from the secondary side to the primary side.

Additionally, the voltage converters 15 and 16 may have a circuit configuration other than that illustrated in FIG. 3. Furthermore, any one or both of the voltage converters 15 and 16 may be configured to step down a voltage input from the first energy storage device 2 or the second energy storage device 3 and to output the resulting voltage. One of the voltage converters 15 and 16 may be omitted. The necessity of the voltage converter 15 or 16 or the voltage conversion type of the voltage converter 15 or 16 (namely, boosting or stepping down) may be selected from a variety of combinations in accordance with the voltage necessary to activate the electric load, the respective output voltages of the first energy storage device 2 and the second energy storage device 3, and so on.

For example, the first energy storage device 2 is a higher-voltage energy storage device than the second energy storage device 3. In this case, if one of the voltage converters 15 and 16 is to be omitted, it is more preferable that the voltage converter 15, which is connected to the first energy storage device 2, be omitted. Omission of one of the voltage converters 15 and 16 can reduce the cost required to realize a power supply system.

Figure 4:
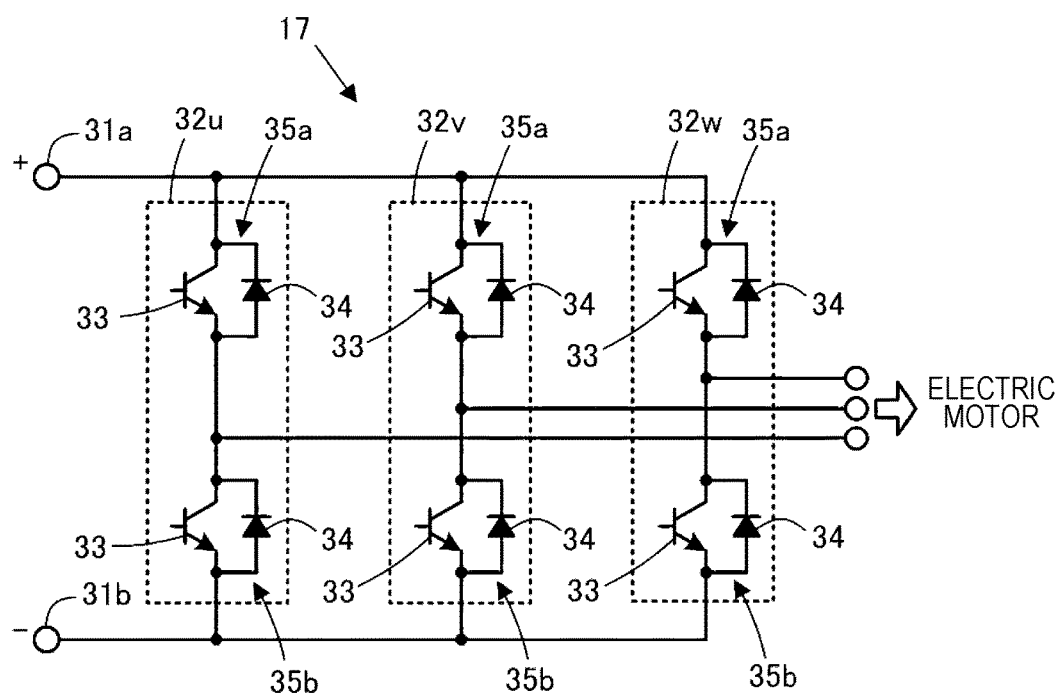
FIG. 4 illustrates an example circuit configuration of an inverter in the power supply system according to the embodiments.

The inverter 17 may be an inverter having a known circuit configuration. FIG. 4 illustrates an example circuit configuration of the inverter 17 when the electric motor 100 is a three-phase electric motor, for example. The inverter 17 illustrated in FIG. 4 is configured such that three-phase arms 32u, 32v, and 32w of the U, V, and W phases are connected in parallel between a pair of power supply terminals 31a and 31b to which a DC voltage is applied. Each of the arms 32u, 32v, and 32w of the respective phases includes high-side and low-side two switch units 35a and 35b that are connected in series. Each of the switch units 35a and 35b includes a diode 34 and a semiconductor switch element 33 such as a transistor that are connected in parallel. The midpoints of the switch units 35a and 35b of the arms 32u, 32v, and 32w of the respective phases serve as three-phase AC power output units.

The inverter 17 having the configuration described above is capable of controlling the respective semiconductor switch elements 33 of the switch units 35a and 35b of the arms 32u, 32v, and 32w of the respective phases to be turned on or off in accordance with a control signal generated by using the pulse width modulation (PWM) control method or the like to convert a DC power input to the power supply terminals 31a and 31b into three-phase AC power, and outputting the AC power to the electric motor 100 (the electric motor 100 which is in power-running operation).

During the regenerative operation of the electric motor 100 (during generation of power), the inverter 17 is capable of controlling the respective semiconductor switch elements 33 of the switch units 35a and 35b of the arms 32u, 32v, and 32w of the respective phases to be turned on or off in accordance with a control signal having a predetermined duty ratio (so-called duty signal) to convert a three-phase AC power input from the electric motor 100 into DC power, and outputting the DC power from the power supply terminals 31a and 31b.

Additionally, the number of phases (the number of arms) of the inverter 17 is set in accordance with the number of phases of the AC power necessary to activate the electric load. If the electric load is an electric load (e.g., a DC motor) activated by causing DC power to flow therethrough, the inverter 17 may be omitted.

The power transmission circuit unit 11 having the configuration described above is configured to control the voltage converters 15 and 16 and the inverter 17 (specifically, provide each of the voltage converters 15 and 16 and the inverter 17 with a control signal (duty signal having a predetermined duty ratio) for turning on or off the semiconductor switch element 25 or 33) to control power transmission among the first energy storage device 2, the second energy storage device 3, and the electric motor 100.

For example, the following operation may be performed during the power-running operation of the electric motor 100: supplying power from one or both of the first energy storage device 2 and the second energy storage device 3 to the electric motor 100, supplying power from the first energy storage device 2 to the second energy storage device 3 to charge the second energy storage device 3, or charging one or both of the first energy storage device 2 and the second energy storage device 3 with regenerative power produced during the regenerative operation of the electric motor 100.

In this embodiment, the first energy storage device 2 is not charged with power supplied by the second energy storage device 3. However, the power transmission circuit unit 11 may be controlled to charge the first energy storage device 2 with power supplied by the second energy storage device 3.

The control device 5 is constituted by an electronic circuit unit including a central processing unit (CPU), a random access memory (RAM), a read-only memory (ROM), an interface circuit, and so on. The control device 5 may be constituted by a plurality of electronic circuit units that are capable of communicating with each other.

The control device 5 includes a power transmission controller 41, a remaining capacity detector 42, and a failure detector 43 as functions implemented by a hardware configuration to be mounted therein or a program (software configuration) installed therein. The power transmission controller 41 controls the power transmission circuit unit 11 to control power transmission among the first energy storage device 2, the second energy storage device 3, and the electric motor 100. The remaining capacity detector 42 detects the respective remaining capacities (called states of charge (SOCs)) of the first energy storage device 2 and the second energy storage device 3. The failure detector 43 detects the presence or absence of a failure in each of the first energy storage device 2 and the second energy storage device 3 to generate failure detection information indicating the presence or absence of the failure.

The power transmission controller 41 also has a function of controlling the switch elements (not illustrated) interposed in the current-carrying paths between the respective energy storage units 2a and the input/output terminals 2p and 2n.

The control device 5 receives a driving/braking force demand and various kinds of sensing data as information necessary to implement the functions described above. The driving/braking force demand is constituted by a driving force demand that is a request value for a driving force (driving torque) to be generated by the electric motor 100 during the power-running operation or a braking force demand that is a request value for a braking force (regenerative torque) to be generated by the electric motor 100 during the regenerative operation.

The driving/braking force demand is set by a vehicle control device (not illustrated) while an electrically driven vehicle in which the power supply system 1 according to this embodiment is mounted is traveling, in accordance with values such as the respective detected values of the amount of operation of the accelerator pedal and the amount of operation of the brake pedal.

The control device 5 may have a function of setting a driving/braking force demand.

As to the sensing data, for example, the following data is input to the control device 5: the detection data of a current sensor 51, a voltage sensor 52, a temperature sensor 53, a current sensor 54, a voltage sensor 55, a temperature sensor 56, a current sensor 57, a voltage sensor 58, a current sensor 59, a current sensor 60, a voltage sensor 61, a current sensor 62, and a voltage sensor 63. The current sensor 51 detects a current flowing through the first energy storage device 2. The voltage sensor 52 detects an output voltage of the first energy storage device 2. The temperature sensor 53 detects a temperature of the first energy storage device 2. The current sensor 54 detects a current flowing through the second energy storage device 3. The voltage sensor 55 detects an output voltage of the second energy storage device 3. The temperature sensor 56 detects a temperature of the second energy storage device 3. The current sensor 57 and the voltage sensor 58 detect a current and voltage on the input side of the voltage converter 15 (the first energy storage device 2 side), respectively. The current sensor 59 detects a current on the output side of the voltage converter 15 (the inverter 17 side). The current sensor 60 and the voltage sensor 61 detect a current and voltage on the input side of the voltage converter 16 (the second energy storage device 3 side), respectively. The current sensor 62 detects a current on the output side of the voltage converter 16 (the inverter 17 side). The voltage sensor 63 detects a voltage on the input side of the inverter 17 (the voltages on the respective output sides of the voltage converters 15 and 16). The above-described pieces of detection data are input to the control device 5.

Although not illustrated in FIG. 1, the first energy storage device 2 is also provided with a sensor for each of the energy storage units 2a for detecting a voltage or current to detect the presence or absence of a failure in the corresponding energy storage unit 2a. The detection data of these sensors is also input to the control device 5.

The remaining capacity detector 42 of the control device 5 sequentially detects (estimates) the remaining capacity of the first energy storage device 2 by using the detection data of the sensors for the first energy storage device 2, namely, the current sensor 51, the voltage sensor 52, and the temperature sensor 53, for example. Further, the remaining capacity detector 42 sequentially detects (estimates) the remaining capacity of the second energy storage device 3 by using the detection data of the sensors for the second energy storage device 3, namely, the current sensor 54, the voltage sensor 55, and the temperature sensor 56, for example.

The respective remaining capacities of the first energy storage device 2 and the second energy storage device 3 are each expressed as, for example, an amount of electric power (e.g., an amount of electric power expressed in ampere hours (Ah)) stored in the energy storage device 2 or 3 or as a charging rate (expressed in percentages (%)) given by dividing the amount of electric power by a fully charged capacity of the energy storage device 2 or 3.

There have hitherto been proposed a variety of techniques for detecting the remaining capacity of an energy storage device. A known technique may be employed as a technique for detecting the remaining capacities of the first energy storage device 2 and the second energy storage device 3.

The technique for detecting the respective remaining capacities of the first energy storage device 2 and the second energy storage device 3 may be a technique that does not use the detection data of any one of the current flow, the output voltage, and the temperature, or a technique that uses any other detection data. A detection device different from the control device 5 may perform a process of detecting the respective remaining capacities of the first energy storage device 2 and the second energy storage device 3.

The failure detector 43 detects the presence or absence of a failure in the overall first energy storage device 2 by using, for example, the detection data of the sensors related to the first energy storage device 2, namely, the current sensor 51, the voltage sensor 52, and the temperature sensor 53. The failure detector 43 further detects the presence or absence of a failure in each of the energy storage units 2a of the first energy storage device 2 by using the detection data of the current sensor or voltage sensor of the energy storage unit 2a of the first energy storage device 2.

For example, when the detected value of any of the current sensor 51, the voltage sensor 52, and the temperature sensor 53 for the first energy storage device 2 is outside a specified range under normal conditions, the failure detector 43 detects occurrence of a failure of the first energy storage device 2. When the detected value of the current sensor or voltage sensor of any of the energy storage units 2a of the first energy storage device 2 is outside a specified range under normal conditions or when the detected value for one of the energy storage units 2a is significantly different from the detected values for the other energy storage units 2a, the failure detector 43 detects occurrence of a failure of the energy storage unit 2a.

The failure detector 43 further detects the presence or absence of a failure in the second energy storage device 3 by using, for example, the detection data of the sensors related to the second energy storage device 3, namely, the current sensor 54, the voltage sensor 55, and the temperature sensor 56.

For example, when the detected value of any of the current sensor 54, the voltage sensor 55, and the temperature sensor 56 for the second energy storage device 3 is outside a specified range under normal conditions, the failure detector 43 detects occurrence of a failure of the second energy storage device 3.

A detection device different from the control device 5 may perform a process for detecting the presence or absence of a failure in each of the first energy storage device 2 and the second energy storage device 3.

The power transmission controller 41 controls the voltage converters 15 and 16 and the inverter 17 of the power transmission circuit unit 11 in accordance with, for example, the detection data of the current sensors 57, 59, 60, and 62 and the voltage sensors 58, 61, and 63, the driving/braking force demand of the electric motor 100, the detected values of the respective remaining capacities of the first energy storage device 2 and the second energy storage device 3, which are obtained by the remaining capacity detector 42, and failure detection information on each of the first energy storage device 2 and the second energy storage device 3.

Further, the power transmission controller 41 appropriately controls the contactors 12 and 13 or the switch elements (not illustrated) interposed in the current-carrying paths between the respective energy storage units 2a of the first energy storage device 2 and the input/output terminals 2p and 2n in accordance with failure detection information on each of the first energy storage device 2 and the second energy storage device 3 and so on.

Control Process for Power Transmission Controller Under Normal Conditions

Next, a control process for the power transmission controller 41 of the control device 5 when both the first energy storage device 2 and the second energy storage device 3 are in normal operation (without failure) will be described in detail.

Figure 5:
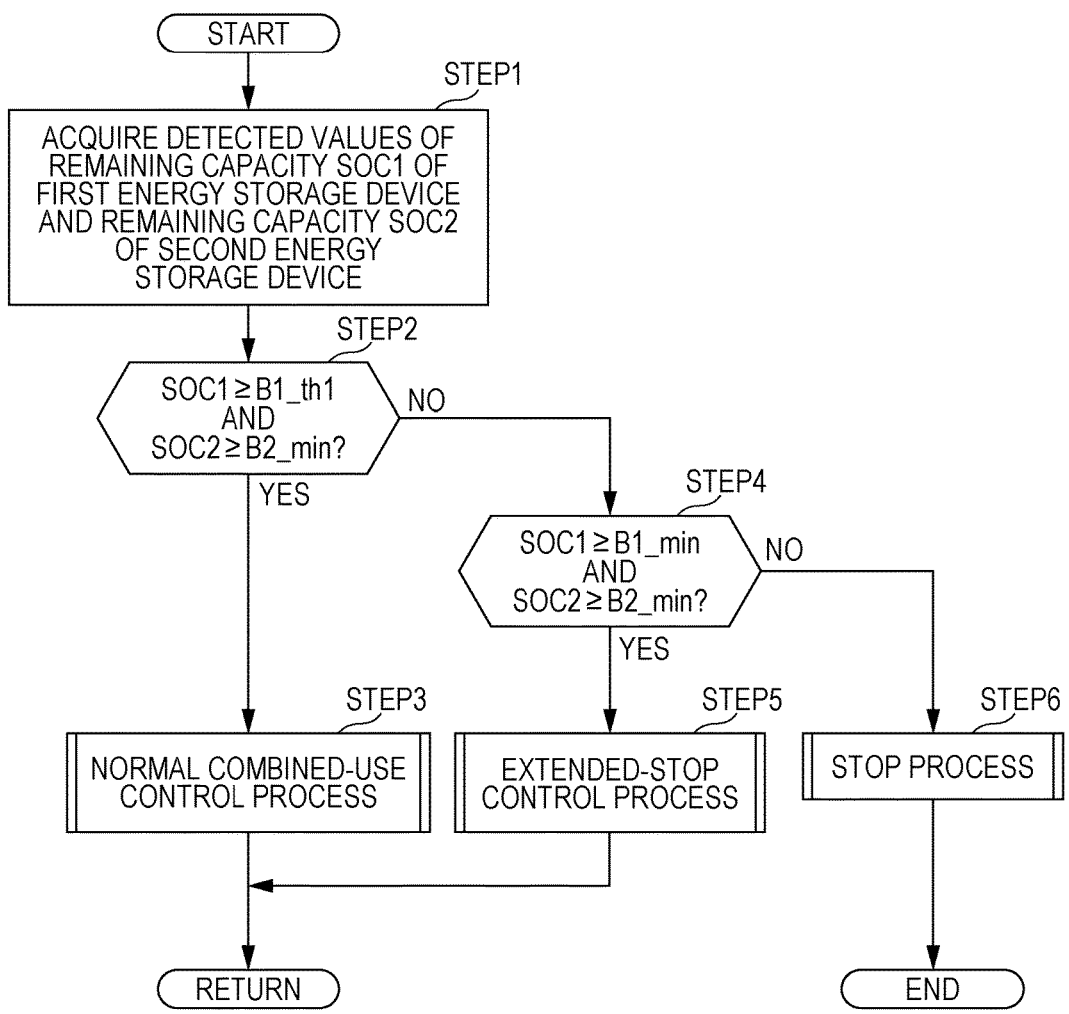
FIG. 5 is a flowchart illustrating a control process executed by a control device in the power supply system according to the embodiments in a normal operating state of the first energy storage device when power is to be supplied to an electric motor (an electric load).

When both the first energy storage device 2 and the second energy storage device 3 are in normal operation, during the travel of the vehicle, the control device 5 sequentially executes a control process illustrated in a flowchart in FIG. 5 by using the power transmission controller 41 at intervals of a predetermined control process period. The control process illustrated in the flowchart in FIG. 5 is a control process performed during the power-running operation of the electric motor 100.

In STEP1, the power transmission controller 41 acquires, from the remaining capacity detector 42, a detected value of the remaining capacity SOC1 of the first energy storage device 2 (hereinafter sometimes referred to as the first remaining capacity SOC1) and a detected value of the remaining capacity SOC2 of the second energy storage device 3 (hereinafter sometimes referred to as the second remaining capacity SOC2).

Then, in STEP2, the power transmission controller 41 determines whether or not the following conditions hold true: the detected value of the first remaining capacity SOC1 is greater than or equal to a predetermined threshold value B1_th1 and the detected value of the second remaining capacity SOC2 is greater than or equal to a predetermined lower limit B2_min.

The threshold value B1_th1 for the first remaining capacity SOC1 is a threshold value determined in advance as a limit value of the first remaining capacity SOC1 which is required for a normal combined-use control process described below. The threshold value B1_th1 may be, for example, a limit remaining capacity value that allows only the first energy storage device 2 to supply a supplied power required for the electric motor 100 to generate a constant output (e.g., a supplied power required for the vehicle to cruise at a predetermined vehicle speed) to the electric motor 100. The threshold value B1_th1 is set to a value slightly higher than a lower limit B1_min (a near-zero value). The lower limit B1_min is a limit remaining capacity value that allows the first energy storage device 2 to supply power to outside so as not to cause deterioration of the first energy storage device 2.

The lower limit B2_min for the second remaining capacity SOC2 is a limit remaining capacity value (a near-zero value) that allows the second energy storage device 3 to supply power to outside so as not to cause deterioration of the second energy storage device 3.

The determination result of STEP2 is affirmative when the first remaining capacity SOC1 and the second remaining capacity SOC2 take values that fall in a normal range (common range). In this situation, in STEP3, the power transmission controller 41 executes a normal combined-use control process. The normal combined-use control process is a process for controlling the power transmission circuit unit 11 to supply power from one or both of the first energy storage device 2 and the second energy storage device 3 to the electric motor 100 and to, when power is supplied from the first energy storage device 2 to the electric motor 100, supply power from the first energy storage device 2 to charge the second energy storage device 3, if necessary. The details of the normal combined-use control process will be described below.

The normal combined-use control process allows the second energy storage device 3 to be charged with power supplied from the first energy storage device 2, if necessary, whereas the remaining capacity SOC1 of the first energy storage device 2 decreases. Thus, the first remaining capacity SOC1 becomes smaller than the threshold value B1_th1 and the determination result of STEP2 becomes negative.

If the determination result of STEP2 is negative, then, in STEP4, the power transmission controller 41 determines whether or not the following conditions hold true: the detected value of the first remaining capacity SOC1 is greater than or equal to the lower limit B1_min and the detected value of the second remaining capacity SOC2 is greater than or equal to the lower limit B2_min.

The determination result of STEP4 is affirmative when, in particular, the remaining capacity of the first energy storage device 2 is low but it is possible to supply power to the electric motor 100 for a certain time period by the cooperation of the first energy storage device 2 and the second energy storage device 3 so as to allow the electric motor 100 to generate a demanded driving force.

In this situation, in STEP5, the power transmission controller 41 executes an extended-stop control process. The extended-stop control process is a process for controlling the power transmission circuit unit 11 so that the remaining capacity of both the first energy storage device 2 and the second energy storage device 3 is consumed as much as possible. The details of the extended-stop control process will be described below.

The determination result of STEP4 is negative when it is difficult to supply power from the first energy storage device 2 and the second energy storage device 3 to the electric motor 100. In this situation, the power transmission controller 41 executes a stop process in STEP6. In the stop process, the power transmission controller 41 controls the voltage converters 15 and 16 or the contactors 12 and 13 to interrupt the output of the first energy storage device 2 and the second energy storage device 3 (discharging to the load side) and to hold the interruption state.

In the stop process, the control device 5 generates an alarm output (visual output or audio output) to alert the vehicle driver that, for example, the vehicle is no longer able to travel or the electric motor 100 is no longer able to operate due to the insufficient remaining capacity of the first energy storage device 2 and the second energy storage device 3.

Normal Combined-Use Control Process

The normal combined-use control process in STEP3 will now be described in detail. Brief definitions of terms as used in the following description are presented below.

In the following description, the "output" or "input", or "supplied power" or "charging power", of each of the first energy storage device 2 and the second energy storage device 3 refers to an amount of electricity expressed as a value of (electric) power (an amount of electrical energy per unit time), for example.

The "supplied power corresponding to a driving force demand DT_dmd" of the electric motor 100 refers to a supplied power that allows a driving force generated by the electric motor 100 when this power is supplied to the electric motor 100 to be identical to or substantially identical to the driving force demand DT_dmd.

The "supplied power corresponding to the driving force demand DT_dmd" is based on the driving force demand DT_dmd and the rotational speed of the electric motor 100 (specifically, the rotational speed of a rotor or an output shaft of the electric motor 100) when the "supplied power" refers to an amount of electricity expressed as a value of (electric) power. The value of the "supplied power corresponding to the driving force demand DT_dmd" can be determined from, for example, the driving force demand DT_dmd and the detected value of the rotational speed of the electric motor 100 by using a map or an operational expression.

The "supplied power corresponding to a certain threshold value" regarding the driving force demand DT_dmd refers to a supplied power corresponding to the driving force demand DT_dmd if the driving force demand DT_dmd is made to coincide with the threshold value.

Figure 6:
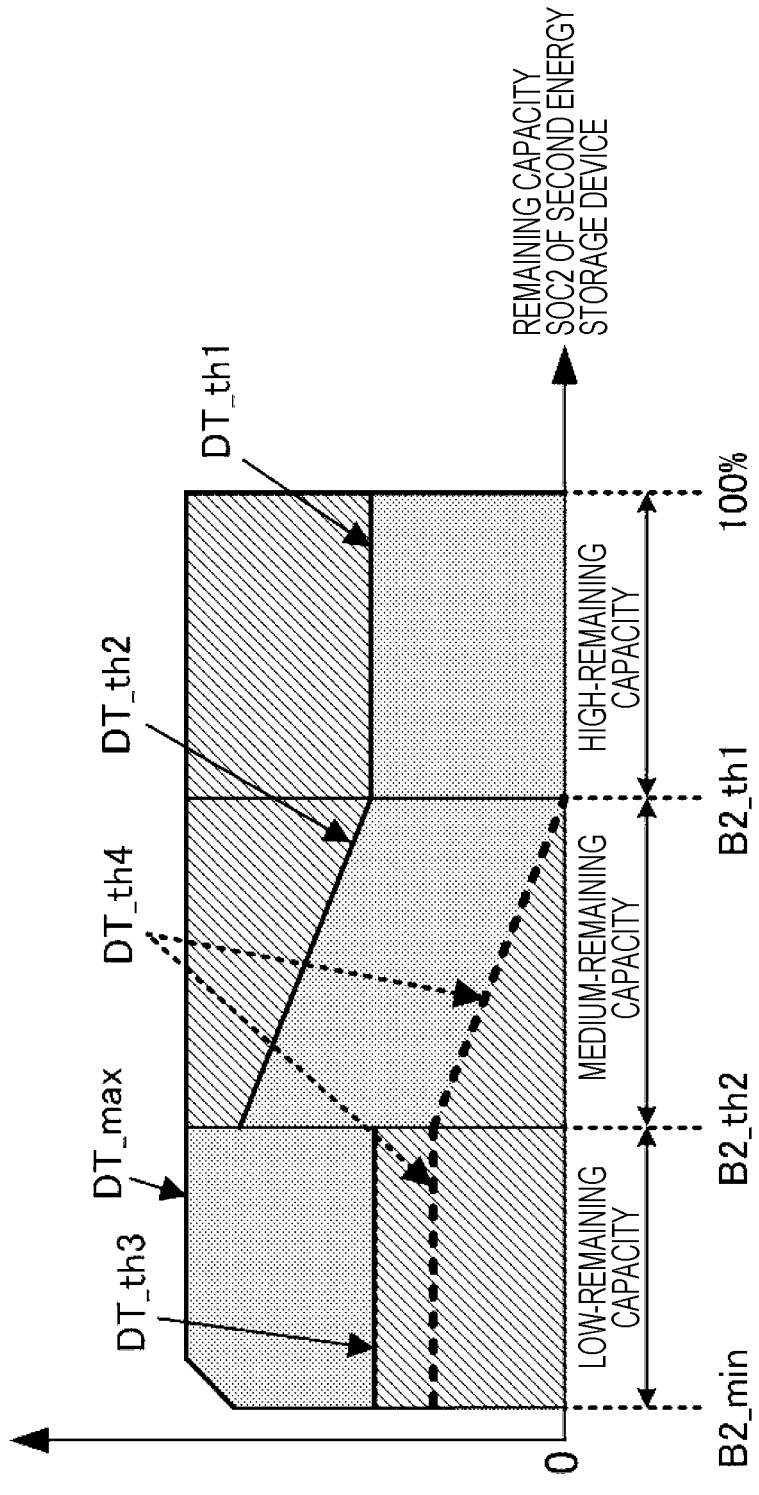
FIG. 6 illustrates, in map form, the relationship among a driving force demand, the remaining capacity of a second energy storage device, and the respective outputs of energy storage devices in a normal combined-use control process executed in STEP3 in FIG. 5.

Based on the terms defined above, the normal combined-use control process will be described with reference to FIG. 6 to FIG. 11. First, an overview of the normal combined-use control process will be described with reference to FIG. 6. FIG. 6 illustrates, in map form, the relationship between the second remaining capacity SOC2 and shares allocated to the respective outputs of the first energy storage device 2 and the second energy storage device 3 with respect to the amount of electricity (supplied power) to be supplied to the electric motor 100 in accordance with the driving force demand DT_dmd of the electric motor 100 in the normal combined-use control process.

In FIG. 6, diagonally hatched areas represent areas within which the first energy storage device 2 is responsible for supplying part or all of the power to be supplied to the electric motor 100, and shaded areas represent areas within which the second energy storage device 3 is responsible for supplying part or all of the power to be supplied to the electric motor 100.

More specifically, diagonally hatched areas adjoining the line (horizontal axis) along which the driving force demand DT_dmd=0 holds represent areas within which the first energy storage device 2 is responsible for supplying all of the power to be supplied to the electric motor 100, and a shaded area adjoining the line (horizontal axis) represents an area within which the second energy storage device 3 is responsible for supplying all of the power to be supplied to the electric motor 100.

Further, shaded areas above the diagonally hatched areas or diagonally hatched areas above the shaded area represent an area within which both the first energy storage device 2 and the second energy storage device 3 are responsible for supplying the power to be supplied to the electric motor 100.

In the normal combined-use control process, as illustrated in FIG. 6, shares allocated to the respective outputs of the first energy storage device 2 and the second energy storage device 3 in accordance with the driving force demand DT_dmd of the electric motor 100 are determined for each of the cases where the value of the second remaining capacity SOC2 falls within a high-remaining-capacity area that satisfies SOC2≥B2_th1 (including the remaining capacity value reaching full state-of-charge (100%)), where the value of the second remaining capacity SOC2 falls within a medium-remaining-capacity area that satisfies B2_th1>SOC2≥B2_th2, and where the value of the second remaining capacity SOC2 falls within a low-remaining-capacity area that satisfies B2_th2>SOC2. The supplied power corresponding to the driving force demand DT_dmd of the electric motor 100 is supplied from one or both of the first energy storage device 2 and the second energy storage device 3 to the electric motor 100 in the proportion of the shares for each of the high-, medium-, and low-remaining-capacity areas.

In this embodiment, the normal combined-use control process is a process performed when the detected value of the second remaining capacity SOC2 is greater than or equal to the lower limit B2_min. Thus, the low-remaining-capacity area is, more specifically, a remaining-capacity area that satisfies B2_th2>SOC2≥B2_min.

In FIG. 6, the threshold values B2_th1 and B2_th2 by which the second remaining capacity SOC2 is separated are predetermined threshold values (fixed values). The threshold values B2_th1 and B2_th2 are set in advance based on an experiment or the like so that the medium-remaining-capacity area whose range is defined by the threshold values B2_th1 and B2_th2 is a remaining-capacity area within which the actual value of the second remaining capacity SOC2 preferably falls to restrain the progression of deterioration of the second energy storage device 3 as much as possible. Accordingly, the medium-remaining-capacity area whose range is defined by the threshold values B2_th1 and B2_th2 is a remaining-capacity area within which the progression of deterioration of the second energy storage device 3 can be desirably prevented when the second energy storage device 3 is charged or discharged so as to keep the actual value of the second remaining capacity SOC2 within the medium-remaining-capacity area as much as possible.

In FIG. 6, DT_max denotes a maximum driving force that can be output by the electric motor 100 in response to power being supplied from both the first energy storage device 2 and the second energy storage device 3 when both the first energy storage device 2 and the second energy storage device 3 are in normal operation.

The normal combined-use control process will now be described in a specific manner.

Figure 7:
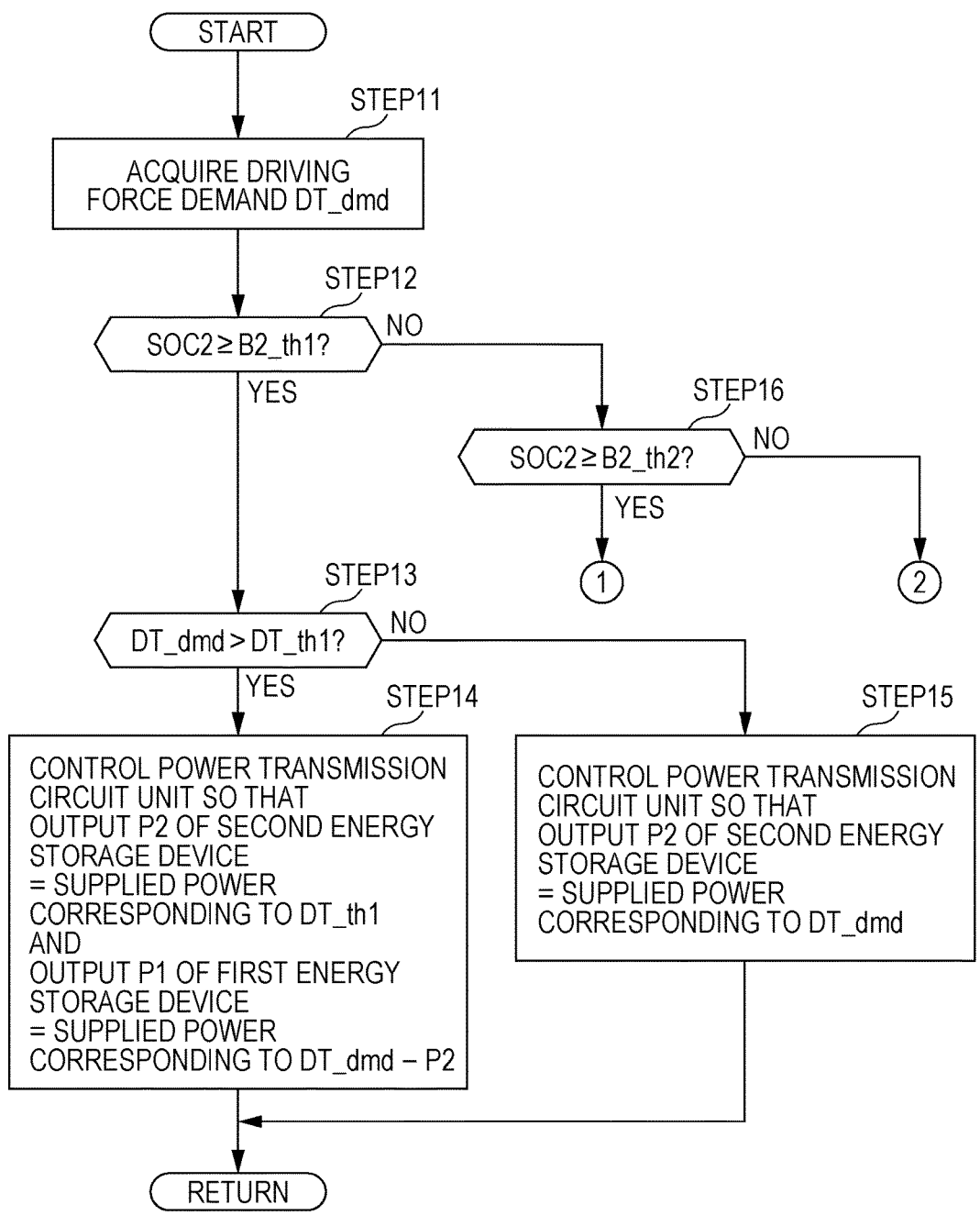
FIG. 7 is a flowchart illustrating the normal combined-use control process executed in STEP3 in FIG. 5.
Figure 8:
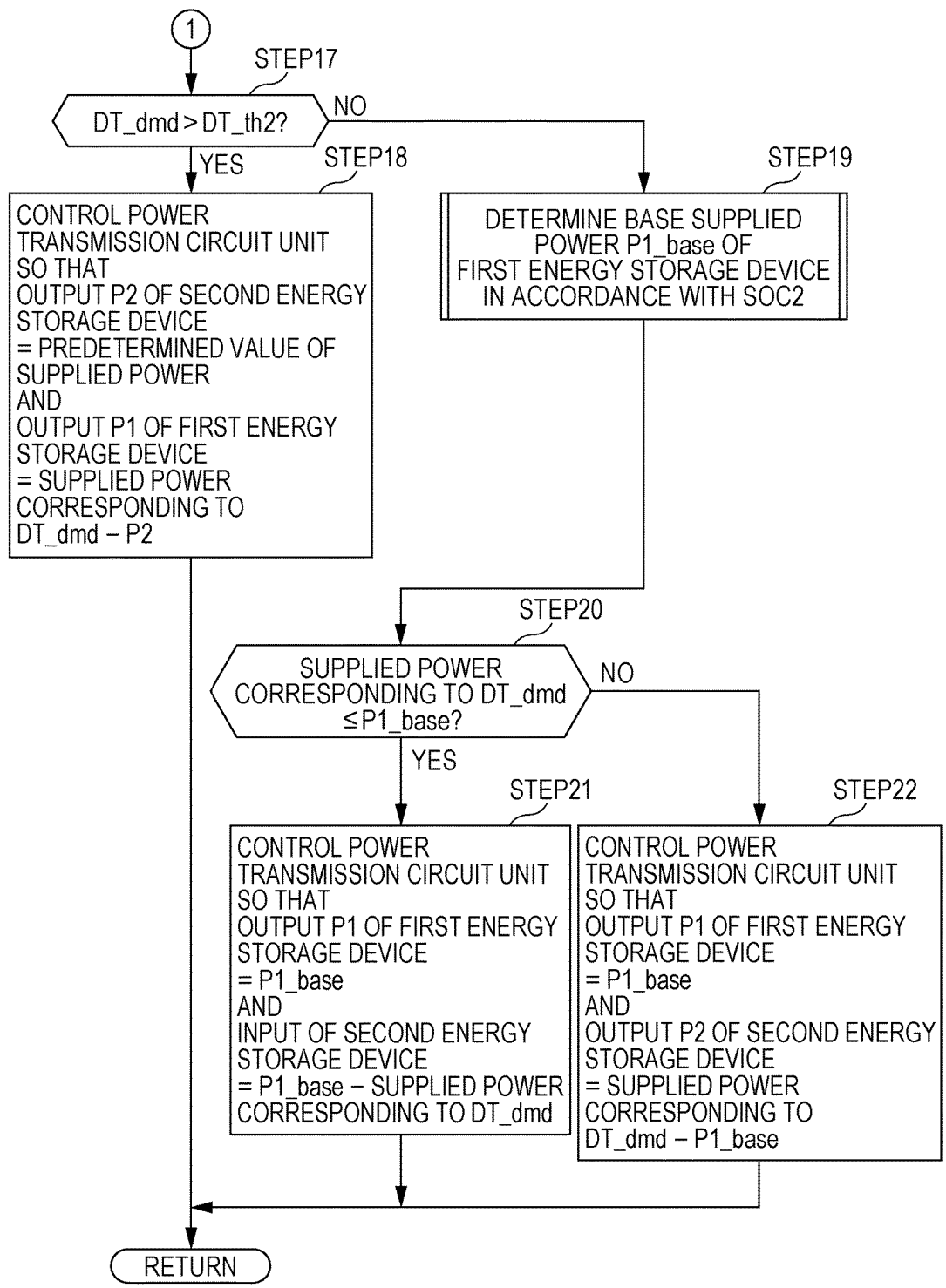
FIG. 8 is a flowchart illustrating the normal combined-use control process executed in STEP3 in FIG. 5.
Figure 9:
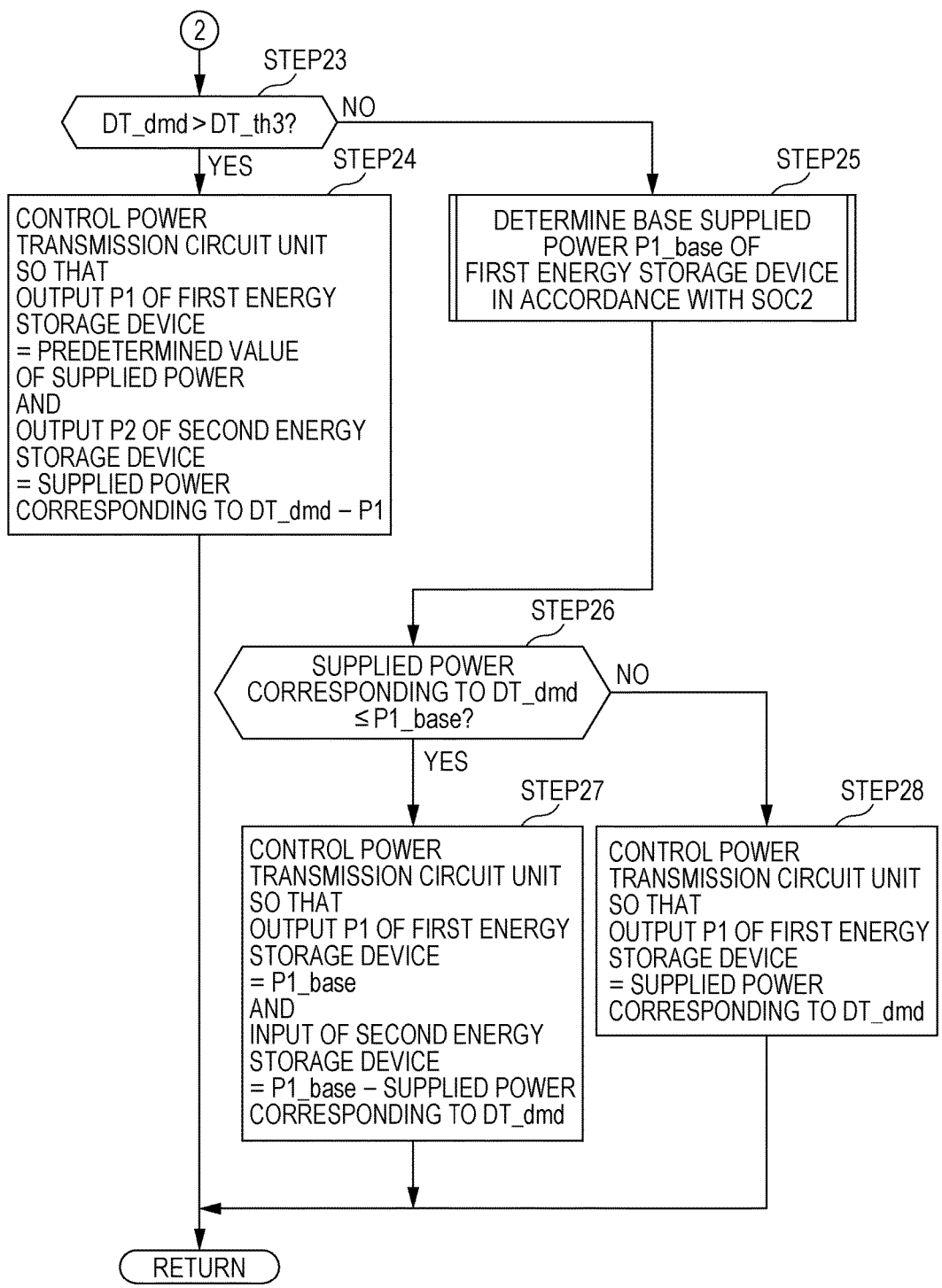
FIG. 9 is a flowchart illustrating the normal combined-use control process executed in STEP3 in FIG. 5.

In the normal combined-use control process, the power transmission controller 41 sequentially executes a process illustrated in a flowchart in FIG. 7 to FIG. 9 at intervals of a predetermined control process period.

In STEP11, the power transmission controller 41 acquires the driving force demand DT_dmd of the electric motor 100. Then, in STEP12, the power transmission controller 41 determines whether or not the detected value of the second remaining capacity SOC2 acquired in STEP1 is greater than or equal to the threshold value B2_th1, which is the lower limit of the high-remaining-capacity area.

The determination result of STEP12 is affirmative when the detected value of the second remaining capacity SOC2 falls within the high-remaining-capacity area. In this case, then, in STEP13, the power transmission controller 41 determines whether or not the driving force demand DT_dmd is greater than a predetermined threshold value DT_th1.

In an example of this embodiment, the threshold value DT_th1 is a predetermined constant value (fixed value). The threshold value DT_th1 may be, for example, an upper limit driving force value, or a nearby driving force value, that can be generated by the electric motor 100 using power supplied only from the second energy storage device 3 when the second remaining capacity SOC2 falls within the high-remaining-capacity area. The threshold value DT_th1 may be set to be variable by using, for example, the detected value of the temperature of the second energy storage device 3, which is obtained by the temperature sensor 56, in order to more appropriately prevent deterioration of the second energy storage device 3.

The determination result of STEP13 is affirmative within the diagonally hatched area in the high-remaining-capacity area illustrated in FIG. 6. In this case, in STEP14, the power transmission controller 41 controls the power transmission circuit unit 11 so that an output P2 of the second energy storage device 3 coincides with a supplied power corresponding to the threshold value DT_th1 and so that an output P1 of the first energy storage device 2 coincides with the power deficit obtained by subtracting the output P2, which is a power that the second energy storage device 3 is responsible for supplying, from the supplied power corresponding to the driving force demand DT_dmd.

The output P1 of the first energy storage device 2 is, specifically, an amount of electricity output from (an amount of power discharged from) the first energy storage device 2, and the output P2 of the second energy storage device 3 is, specifically, an amount of electricity output from (an amount of power discharged from) the second energy storage device 3.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, the share of the supplied power corresponding to the driving force demand DT_dmd which is taken by the second energy storage device 3 (the output P2) is set to the supplied power corresponding to the threshold value DT_th1.

Specifically, the processing of STEP14 can be executed in the following way, for example. A target value for the input voltage of the inverter 17 (=the output voltages of the voltage converters 15 and 16) is set in accordance with the detected value of the rotational speed of the electric motor 100 or the like. In addition, the supplied power corresponding to the threshold value DT_th1 is set as the target value for the output power of the voltage converter 16, and a supplied power obtained by subtracting the output P2 (=the supplied power corresponding to the threshold value DT_th1), which is the share taken by the second energy storage device 3, from the supplied power corresponding to the driving force demand DT_dmd is set as the target value for the output power of the voltage converter 15.

Further, the voltage converters 15 and 16 are controlled by using a control signal (duty signal) so as to realize the target value for the input voltage of the inverter 17 and the target values for the respective output powers of the voltage converters 15 and 16. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the respective outputs of the energy storage devices 2 and 3).

On the other hand, the determination result of STEP13 is negative within the shaded area in the high-remaining-capacity area illustrated in FIG. 6. In this case, in STEP15, the power transmission controller 41 controls the power transmission circuit unit 11 so that the output P2 of the second energy storage device 3 coincides with the supplied power corresponding to the driving force demand DT_dmd.

Accordingly, the supplied power corresponding to the driving force demand DT_dmd is fed to the electric motor 100 only from the second energy storage device 3 without using the first energy storage device 2.

Specifically, the processing of STEP15 can be executed in the following way, for example. A target value for the input voltage of the inverter 17 (=the output voltage of the voltage converter 16) is set in accordance with the detected value of the rotational speed of the electric motor 100 or the like. In addition, the supplied power corresponding to the driving force demand DT_dmd is set as the target value for the output power of the voltage converter 16.

Further, the voltage converter 16 is controlled so as to realize the target value for the input voltage of the inverter 17 and the target value for the output power of the voltage converter 16. Also, the inverter 17 is feedback-controlled so as to cause the target current corresponding to the driving force demand DT_dmd to flow through the electric motor 100.

Furthermore, the voltage converter 15 is controlled to be in current flow interruption state. Alternatively, the contactor 12 on the first energy storage device 2 side is controlled to be turned off.

As described above, when the detected value of the second remaining capacity SOC2 falls within the high-remaining-capacity area, power is supplied to the electric motor 100 from an energy storage device including at least the second energy storage device 3 out of the first energy storage device 2 and the second energy storage device 3 during the power-running operation of the electric motor 100. This allows the second energy storage device 3 to be actively discharged to make the remaining capacity SOC2 of the second energy storage device 3 approach the medium-remaining-capacity area. Accordingly, it is achievable to prevent the second energy storage device 3 from deteriorating while meeting the driving force demand DT_dmd of the electric motor 100.

Additionally, the threshold value DT_th1, which is used in the determination processing in STEP13, may be set in a way different from that described above. For example, the threshold value DT_th1 may be set so that the supplied power corresponding to the threshold value DT_th1 is equal to a predetermined constant value (e.g., an upper-limit supplied power that can be output by the second energy storage device 3 within the high-remaining-capacity area or a nearby constant value of supplied power). The threshold value DT_th1 may also be set to vary depending on the detected value of the second remaining capacity SOC2.

If the determination result of STEP12 is negative, in STEP16, the power transmission controller 41 further determines whether or not the detected value of the second remaining capacity SOC2 is greater than or equal to the threshold value B2_th2, which is the lower limit of the medium-remaining-capacity area.

The determination result of STEP16 is affirmative when the detected value of the second remaining capacity SOC2 falls within the medium-remaining-capacity area. In this situation, then, in STEP17 (see FIG. 8), the power transmission controller 41 determines whether or not the driving force demand DT_dmd is greater than a predetermined threshold value DT_th2.

In an example of this embodiment, for example, as illustrated in FIG. 6, the predetermined threshold value DT_th2 is a threshold value set to be variable in accordance with the detected value of the second remaining capacity SOC2. Specifically, the threshold value DT_th2 is set so that the threshold value DT_th2 increases as the detected value of the second remaining capacity SOC2 decreases. In addition, the threshold value DT_th2 is set to a driving force value greater than a driving force that can be generated by the electric motor 100 when a base supplied power P1_base, described below, is supplied to the electric motor 100.

The determination result of STEP17 is affirmative within the diagonally hatched area above the shaded area in the medium-remaining-capacity area illustrated in FIG. 6. In this case, in STEP18, the power transmission controller 41 controls the power transmission circuit unit 11 so that the output P2 of the second energy storage device 3 coincides with a predetermined value of supplied power and so that the output P1 of the first energy storage device 2 coincides with the power deficit obtained by subtracting the output P2, which is the share taken by the second energy storage device 3, from the supplied power corresponding to the driving force demand DT_dmd.

In this case, specific control of the power transmission circuit unit 11 can be performed in a manner similar to that in STEP14 in FIG. 7.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, the share of the supplied power corresponding to the driving force demand DT_dmd which is taken by the second energy storage device 3 is set to the predetermined value of supplied power.

The predetermined value of supplied power to be output from the second energy storage device 3 may be, for example, an upper-limit supplied power that can be output by the second energy storage device 3 within the medium-remaining-capacity area or a nearby constant value of supplied power. Alternatively, the predetermined value of supplied power may be, for example, a supplied power set to vary depending on the detected value of the second remaining capacity SOC2.

On the other hand, if the determination result of STEP17 is negative, then, in STEP19, the power transmission controller 41 determines the base supplied power P1_base, which is a "base" value of the output P1 of the first energy storage device 2, in accordance with the detected value of the second remaining capacity SOC2.

The base supplied power P1_base is a lower limit amount of electricity to be output from the first energy storage device 2 regardless of the driving force demand DT_dmd when the detected value of the second remaining capacity SOC2 falls within the medium-remaining-capacity area or the low-remaining-capacity area. That is, in this embodiment, the power transmission circuit unit 11 is controlled so that the base supplied power P1_base or a larger supplied power is output from the first energy storage device 2 regardless of the driving force demand DT_dmd when the detected value of the second remaining capacity SOC2 falls within the medium-remaining-capacity area or the low-remaining-capacity area.

Figure 10:
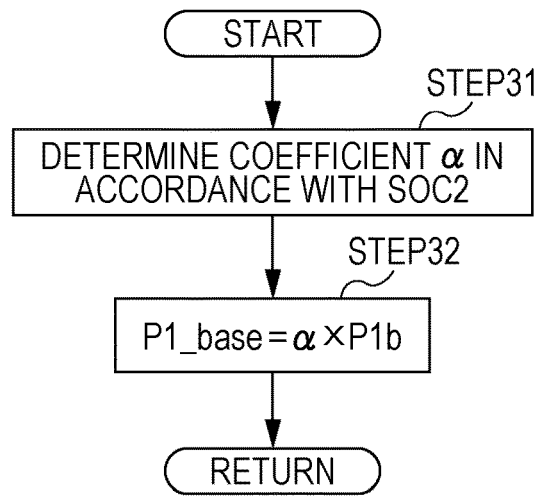
FIG. 10 is a flowchart illustrating the processing of STEP19 in FIG. 8 or STEP25 in FIG. 9.

The base supplied power P1_base is set in a way illustrated in a flowchart in FIG. 10, for example. Specifically, in STEP31, the power transmission controller 41 determines a coefficient α in accordance with the detected value of the second remaining capacity SOC2. The coefficient α specifies a pattern in which the base supplied power P1_base changes in accordance with the detected value of the second remaining capacity SOC2.

Figure 11:
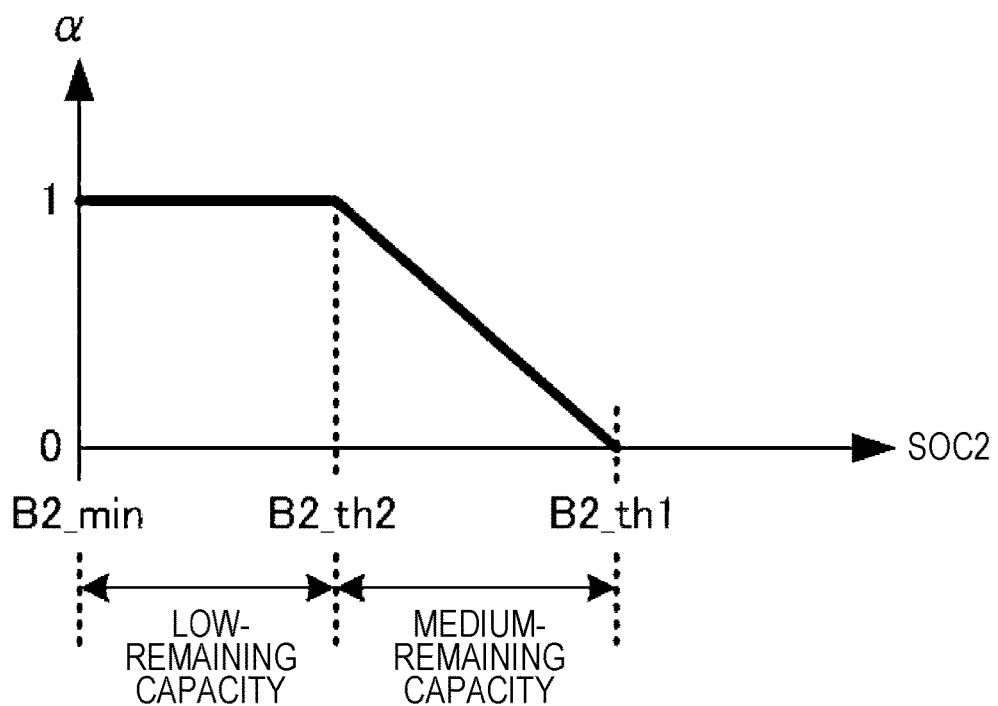
FIG. 11 is a graph illustrating the relationship between a coefficient α, which is used in the process illustrated in FIG. 10, and the remaining capacity of the second energy storage device.

The coefficient α is set from the detected value of the second remaining capacity SOC2 in accordance with, for example, a pattern depicted on a graph in FIG. 11 by using a map created in advance or by using an operational expression. In the illustrated example, the coefficient α takes a value in the range from "0" to "1". The value of the coefficient α is basically set to increase as the detected value of the second remaining capacity SOC2 decreases within a remaining capacity area (low-side remaining capacity area) obtained by combining the medium-remaining-capacity area and the low-remaining-capacity area of the second energy storage device 3.

More specifically, when the detected value of the second remaining capacity SOC2 falls within the medium-remaining-capacity area, the value of the coefficient α is set to successively increase from "0" to "1" as the detected value of the second remaining capacity SOC2 decreases from the upper-limit threshold value B2_th1 to the lower-limit threshold value B2_th2 of the medium-remaining-capacity area.

When the detected value of the second remaining capacity SOC2 falls within the low-remaining-capacity area, the value of the coefficient α is set to the maximum value "1".

Then, in STEP32, the power transmission controller 41 multiplies a supplied power P1b having a predetermined value (fixed value) by the value of the coefficient α, which is determined in the way described above, to calculate the base supplied power P1_base ($=\alpha \times P1b$). The supplied power P1b is a maximum value of the base supplied power P1_base.

Accordingly, the base supplied power P1_base is determined to change in the same or substantially the same pattern as that for the coefficient α in accordance with the detected value of the second remaining capacity SOC2.

The base supplied power P1_base may be defined by, for example, setting an upper limit of the output P1 of the first energy storage device 2 in accordance with the detected value of the first remaining capacity SOC1 or the like and, when the base supplied power P1_base calculated in the way described above exceeds the upper limit, executing a limiting process subsequently to the processing of STEP32 to forcibly limit the base supplied power P1_base to the upper limit.

Alternatively, for example, the base supplied power P1_base may be determined, instead of by performing the processing of STEP31 and STEP32, directly from the detected value of the second remaining capacity SOC2 by using a map created in advance or by using an operational expression.

Referring back to FIG. 8, after the processing of STEP19 has been executed in the way described above, then, in STEP20, the power transmission controller 41 determines whether or not the supplied power corresponding to the driving force demand DT_dmd is less than or equal to the base supplied power P1_base. The determination processing in STEP20 is equivalent to a process of determining whether or not the driving force demand DT_dmd is less than or equal to a threshold value obtained by converting the base supplied power P1_base into a driving force value in accordance with the detected value of the rotational speed of the electric motor 100. This threshold value is a threshold value DT_th4 indicated by a broken line in FIG. 6. The threshold value DT_th4 indicated by the broken line in FIG. 6 is a threshold value obtained when the rotational speed of the electric motor 100 is set to be constant.

The determination result of STEP20 is affirmative within the bottom diagonally hatched area in the medium-remaining-capacity area illustrated in FIG. 6. In this situation, in STEP21, the power transmission controller 41 controls the power transmission circuit unit 11 so that the output P1 of the first energy storage device 2 coincides with the base supplied power P1_base and so that the input of the second energy storage device 3, that is, the charging power, coincides with a supplied power corresponding to the surplus power obtained by subtracting the supplied power corresponding to the driving force demand DT_dmd from the base supplied power P1_base (the surplus supplied power).

Accordingly, the base supplied power P1_base, which is set in the way described above in accordance with the detected value of the second remaining capacity SOC2, is output from the first energy storage device 2 regardless of the driving force demand DT_dmd. In addition, a supplied power that is a portion of the base supplied power P1_base corresponding to the driving force demand DT_dmd is fed from the first energy storage device 2 to the electric motor 100 and the surplus supplied power obtained by subtracting the supplied power that is a portion of the base supplied power P1_base corresponding to the driving force demand DT_dmd from the base supplied power P1_base is supplied from the first energy storage device 2 to charge the second energy storage device 3.

Specifically, the processing of STEP21 can be executed in the following way, for example. A target value for the input voltage of the inverter 17 (=the output voltage of the voltage converter 15) is set in accordance with the detected value of the rotational speed of the electric motor 100 or the like. In addition, the base supplied power P1_base is set as the target value for the output power of the voltage converter 15, and a supplied power obtained by subtracting the supplied power corresponding to the driving force demand DT_dmd from the base supplied power P1_base is set as the target value for the power to be supplied from the input side of the voltage converter 16 (the second energy storage device 3 side) to the second energy storage device 3.

Further, the voltage converter 15 is controlled so as to realize the target value for the input voltage of the inverter 17 and the target value for the output power of the voltage converter 15, and the voltage converter 16 is controlled so as to realize the target value for the power to be supplied from the voltage converter 16 to the second energy storage device 3. Also, the inverter 17 is feedback-controlled so as to cause the target current corresponding to the driving force demand DT_dmd to flow through the electric motor 100.

When the base supplied power P1_base coincides with the supplied power corresponding to the driving force demand DT_dmd, the input (the charging power) of the second energy storage device 3 is zero. Thus, the voltage converter 16 is controlled to be in current flow interruption state or the contactor 13 on the second energy storage device 3 side is controlled to be turned off.

On the other hand, the determination result of STEP20 is negative within the shaded area in the medium-remaining-capacity area illustrated in FIG. 6. In this case, in STEP22, the power transmission controller 41 controls the power transmission circuit unit 11 so that the output P1 of the first energy storage device 2 coincides with the base supplied power P1_base and so that the output P2 of the second energy storage device 3 coincides with the power deficit obtained by subtracting the base supplied power P1_base from the supplied power corresponding to the driving force demand DT_dmd.

In this case, specific control of the power transmission circuit unit 11 can be performed in a manner similar to that in STEP14 in FIG. 7.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, the share of the supplied power corresponding to the driving force demand DT_dmd which is taken by the first energy storage device 2 (the output P1) is set to the base supplied power P1_base, which is set in the way described above in accordance with the detected value of the second remaining capacity SOC2.

Additionally, when, in STEP22, the output P2 of the second energy storage device 3 (the power deficit obtained by subtracting the base supplied power P1_base from the supplied power corresponding to the driving force demand DT_dmd) exceeds the upper-limit supplied power that can be output by the second energy storage device 3 within the medium-remaining-capacity area, the output P2 of the second energy storage device 3 may be limited to the upper-limit supplied power and processing similar to that of STEP18 may be performed to control the power transmission circuit unit 11.

Alternatively, the threshold value DT_th2 in the determination processing in STEP17 may be set so that a supplied power corresponding to the threshold value DT_th2 coincides with a value obtained by adding the upper-limit supplied power of the second energy storage device 3, or a nearby constant value of supplied power, to the base supplied power P1_base.

As described above, when the detected value of the second remaining capacity SOC2 falls within the medium-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the driving force demand DT_dmd is less than or equal to the threshold value DT_th2, the output P1 of the first energy storage device 2 is kept at the base supplied power P1_base, which is set in accordance with the detected value of the second remaining capacity SOC2. If the base supplied power P1_base is greater than the supplied power corresponding to the driving force demand DT_dmd (in other words, if the driving force demand DT_dmd is less than the threshold value DT_th4, which is obtained by converting the base supplied power P1_base into a driving force value of the electric motor 100), a supplied power that is a portion of the base supplied power P1_base corresponding to the driving force demand DT_dmd is supplied only from the first energy storage device 2 to the electric motor 100 and, at the same time, the surplus supplied power is used to charge the second energy storage device 3.

Furthermore, when the driving force demand DT_dmd is less than or equal to the threshold value DT_th2, if the base supplied power P1_base is smaller than the supplied power corresponding to the driving force demand DT_dmd (in other words, if the driving force demand DT_dmd is greater than the threshold value DT_th4), the base supplied power P1_base is fed from the first energy storage device 2 to the electric motor 100, whereas the power deficit is fed from the second energy storage device 3 to the electric motor 100.

Thus, when the detected value of the second remaining capacity SOC2 falls within the medium remaining capacity, a situation in which power is supplied from the second energy storage device 3 to the electric motor 100 is less likely to occur than when the detected value of the second remaining capacity SOC2 falls within the high-remainingcapacity area. In addition, as the second remaining capacity SOC2 decreases, a range for the driving force demand DT_dmd over which power is supplied from the first energy storage device 2 to charge the second energy storage device 3 increases and the amount of charging power used to charge the second energy storage device 3 is more likely to increase.

As a result, the second remaining capacity SOC2 can be kept within the medium-remaining-capacity area as much as possible. Thus, the progression of deterioration of the second energy storage device 3 can be restrained as much as possible.

When the driving force demand DT_dmd is less than or equal to the threshold value DT_th2, the base supplied power P1_base to be output from the first energy storage device 2 is set in accordance with the second remaining capacity SOC2 regardless of the driving force demand DT_dmd. Thus, the output P2 or the input of the second energy storage device 3 varies in accordance with a change in the driving force demand DT_dmd, whereas the output P1 of the first energy storage device 2 varies with low sensitivity to changes in the driving force demand DT_dmd.

As a result, the output P1 of the first energy storage device 2 is of high stability with less frequent changes. Thus, the progression of deterioration of the first energy storage device 2 can be restrained as much as possible.

The determination result of STEP16 is negative when the detected value of the second remaining capacity SOC2 falls within the low-remaining-capacity area. In this situation, then, in STEP23 (see FIG. 9), the power transmission controller 41 determines whether or not the driving force demand DT_dmd is greater than a predetermined threshold value DT_th3.

In an example of this embodiment, the predetermined threshold value DT_th3 is set to a predetermined constant value. In addition, the threshold value DT_th3 is set to a driving force value larger than a driving force that can be generated by the electric motor 100 when the base supplied power P1_base, which is set in the way described above in accordance with the second remaining capacity SOC2, is supplied to the electric motor 100.

Note that the threshold value DT_th3 may be set so that a supplied power corresponding to the threshold value DT_th3 becomes equal to the upper-limit supplied power (>P1_base) of the first energy storage device 2 or a nearby constant value of supplied power.

The determination result of STEP23 is affirmative within the shaded area in the low-remaining-capacity area illustrated in FIG. 6. In this case, in STEP24, the power transmission controller 41 controls the power transmission circuit unit 11 so that the output P1 of the first energy storage device 2 coincides with a predetermined value of supplied power and so that the output P2 of the second energy storage device 3 coincides with the power deficit obtained by subtracting the output P1, which is the share taken by the first energy storage device 2, from the supplied power corresponding to the driving force demand DT_dmd.

In this case, specific control of the power transmission circuit unit 11 can be performed in a manner similar to that in STEP14 in FIG. 7.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, the share of the supplied power corresponding to the driving force demand DT_dmd which is taken by the first energy storage device 2 is set to the predetermined value of supplied power.

The predetermined value of supplied power to be output from the first energy storage device 2 may be, for example, an upper-limit supplied power that can be output by the first energy storage device 2 or a nearby constant value of supplied power. Alternatively, the predetermined value of supplied power may be a supplied power set to vary depending on either or both of the detected value of the first remaining capacity SOC1 and the detected value of the second remaining capacity SOC2.

On the other hand, if the determination result of STEP23 is negative, then, in STEP25, the power transmission controller 41 determines the base supplied power P1_base, which is a "base" value of the output P1 of the first energy storage device 2, in accordance with the detected value of the second remaining capacity SOC2.

The processing of STEP25 is the same or substantially the same as the processing of STEP19. In this embodiment, the coefficient α is the maximum value "1" within the low-remaining-capacity area. Thus, the base supplied power P1_base, which is determined in STEP25, is equal to the maximum value P1$b$.

As in the processing of STEP19, for example, an upper limit of the output P1 of the first energy storage device 2 may be set in accordance with the detected value of the first remaining capacity SOC1 and so on, and, when the base supplied power P1_base, which is determined in accordance with the second remaining capacity SOC2, exceeds the upper limit, the base supplied power P1_base may be forcibly limited to the upper limit.

Alternatively, for example, the base supplied power P1_base may be determined, instead of by executing the process illustrated in the flowchart in FIG. 10 in STEP25, directly from the detected value of the second remaining capacity SOC2 by using a map created in advance or by using an operational expression.

After the processing of STEP25 has been executed, then, in STEP26, the power transmission controller 41 determines whether or not the supplied power corresponding to the driving force demand DT_dmd is less than or equal to the base supplied power P1_base. As in the determination processing in STEP20, the determination processing in STEP26 is equivalent to a process of determining whether or not the driving force demand DT_dmd is less than or equal to the threshold value DT_th4 (see FIG. 6), which is obtained by converting the base supplied power P1_base into a driving force value in accordance with the detected value of the rotational speed of the electric motor 100.

The determination result of STEP26 is affirmative within the diagonally hatched area in the low-remaining-capacity area illustrated in FIG. 6 when the driving force demand DT_dmd is less than or equal to the threshold value DT_th4. In this situation, in STEP27, the power transmission controller 41 controls the power transmission circuit unit 11 so that the output P1 of the first energy storage device 2 coincides with the base supplied power P1_base and so that the input (the charging power) of the second energy storage device 3 coincides with a supplied power corresponding to the surplus power obtained by subtracting the supplied power corresponding to the driving force demand DT_dmd from the base supplied power P1_base.

In this case, specific control of the power transmission circuit unit 11 can be performed in a manner similar to that in STEP21 in FIG. 8.

Accordingly, the base supplied power P1_base, which is set in the way described above in accordance with the detected value of the second remaining capacity SOC2, is output from the first energy storage device 2 regardless of the driving force demand DT_dmd. In addition, a supplied power that is a portion of the base supplied power P1_base corresponding to the driving force demand DT_dmd is fed from the first energy storage device 2 to the electric motor 100 and the surplus supplied power obtained by subtracting the supplied power that is a portion of the base supplied power P1_base corresponding to the driving force demand DT_dmd from the base supplied power P1_base is supplied from the first energy storage device 2 to charge the second energy storage device 3.

On the other hand, the determination result of STEP26 is negative within the diagonally hatched area in the low-remaining-capacity area illustrated in FIG. 6 when the driving force demand DT_dmd is greater than the threshold value DT_th4. In this case, in STEP28, the power transmission controller 41 controls the power transmission circuit unit 11 so that the output P1 of the first energy storage device 2 coincides with the supplied power corresponding to the driving force demand DT_dmd.

Accordingly, the supplied power corresponding to the driving force demand DT_dmd is fed to the electric motor 100 only from the first energy storage device 2 without using the second energy storage device 3.

Specifically, the processing of STEP28 can be executed in the following way, for example. A target value for the input voltage of the inverter 17 (=the output voltage of the voltage converter 15) is set in accordance with the detected value of the rotational speed of the electric motor 100 or the like. In addition, the supplied power corresponding to the driving force demand DT_dmd is set as the target value for the output power of the voltage converter 15.

Further, the voltage converter 15 is controlled by using a control signal (duty signal) so as to realize the target value for the input voltage of the inverter 17 and the target value for the output power of the voltage converter 15. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the output of the first energy storage device 2.

Further, the voltage converter 16 is controlled to be in current flow interruption state. Alternatively, the contactor 13 on the second energy storage device 3 side is controlled to be turned off.

As described above, when the detected value of the second remaining capacity SOC2 falls within the low-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the supplied power corresponding to the driving force demand DT_dmd is less than or equal to the base supplied power P1_base, the output P1 of the first energy storage device 2 is kept at the base supplied power P1_base regardless of the driving force demand DT_dmd. Then, a supplied power that is a portion of the base supplied power P1_base corresponding to the driving force demand DT_dmd is supplied only from the first energy storage device 2 to the electric motor 100 and, at the same time, the surplus supplied power is used to charge the second energy storage device 3. Thus, the input of the second energy storage device 3 varies in accordance with a change in the driving force demand DT_dmd, whereas the output P1 of the first energy storage device 2 (=P1_base) varies with low sensitivity to changes in the driving force demand DT_dmd.

In addition, when the supplied power corresponding to the driving force demand DT_dmd is greater than the base supplied power P1_base, the supplied power corresponding to the driving force demand DT_dmd is supplied only from the first energy storage device 2 to the electric motor 100 until the driving force demand DT_dmd exceeds the threshold value DT_th3. Only when the driving force demand DT_dmd exceeds the threshold value DT_th3, the second energy storage device 3 is responsible for supplying a portion of the supplied power corresponding to the driving force demand DT_dmd.

Thus, when the detected value of the second remaining capacity SOC2 falls within the low-remaining-capacity area, a situation in which power is supplied from the second energy storage device 3 to the electric motor 100 is less likely to occur than when the detected value of the second remaining capacity SOC2 falls within the high-remaining-capacity area or the medium-remaining-capacity area.

In addition, since the base supplied power P1_base is equal to the maximum value P1b within the low-remaining-capacity area, a range for the driving force demand DT_dmd over which power is supplied from the first energy storage device 2 to charge the second energy storage device 3 and the amount of charging power are larger than those within the medium-remaining-capacity area.

As a result, unless a situation in which the driving force demand DT_dmd is greater than the threshold value DT_th3 continues, the second remaining capacity SOC2 is likely to return from the low-remaining-capacity area to the medium-remaining-capacity area.

When the supplied power corresponding to the driving force demand DT_dmd is less than or equal to the base supplied power P1_base, furthermore, the base supplied power P1_base to be output from the first energy storage device 2 is set in accordance with the second remaining capacity SOC2 regardless of the driving force demand DT_dmd. In particular, the base supplied power P1_base is a constant value (=P1b) in the low-remaining-capacity area. Thus, the output P1 of the first energy storage device 2 does not vary in accordance with a change in the driving force demand DT_dmd.

In addition, the output P1 of the first energy storage device 2 is set to a predetermined constant value when the driving force demand DT_dmd is greater than the threshold value DT_th3, which can prevent the output P1 of the first energy storage device 2 from varying in accordance with the driving force demand DT_dmd.

As a result, the output P1 of the first energy storage device 2 within the low-remaining-capacity area is of high stability with less frequent changes. Thus, the progression of deterioration of the first energy storage device 2 can be restrained as much as possible.

The normal combined-use control process has been described in detail.

Extended-Stop Control Process

The extended-stop control process in STEP5 will now be described in detail.

In the extended-stop control process, the power transmission controller 41 controls the power transmission circuit unit 11 to supply only the deficit against the supplied power corresponding to the driving force demand DT_dmd from the second energy storage device 3 to the electric motor 100 while supplying power from the first energy storage device 2 to the electric motor 100 as continuously as possible during the power-running operation of the electric motor 100.

Figure 12:
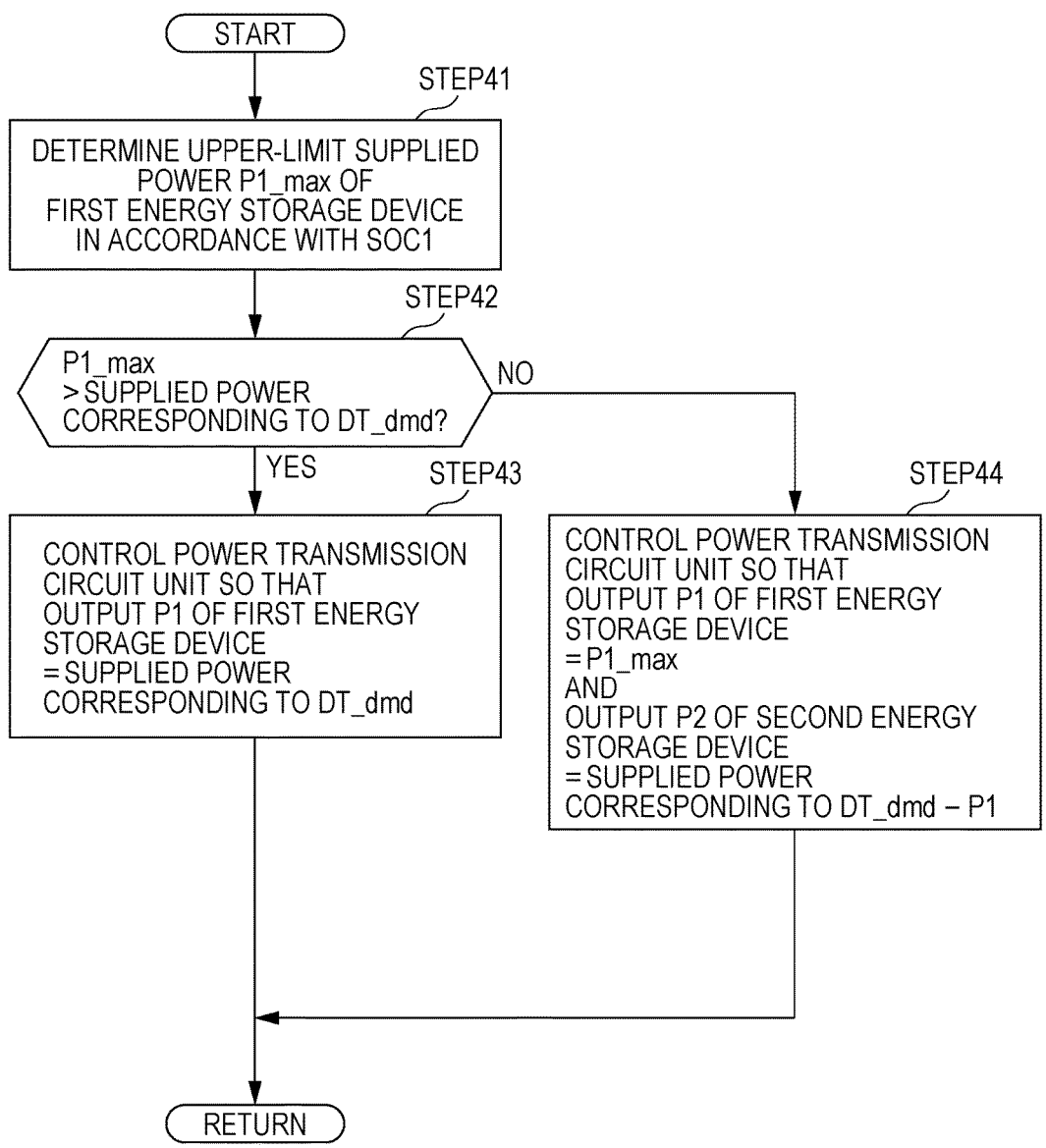
FIG. 12 is a flowchart illustrating an extended-stop control process executed in STEP5 in FIG. 5.

In the extended-stop control process, the power transmission controller 41 executes a process illustrated in a flowchart in FIG. 12 at intervals of a predetermined control process period. Specifically, in STEP41, the power transmission controller 41 determines an upper-limit supplied power P1_max that can be output from the first energy storage device 2, in accordance with the detected value of the first remaining capacity SOC1.

Figure 14:
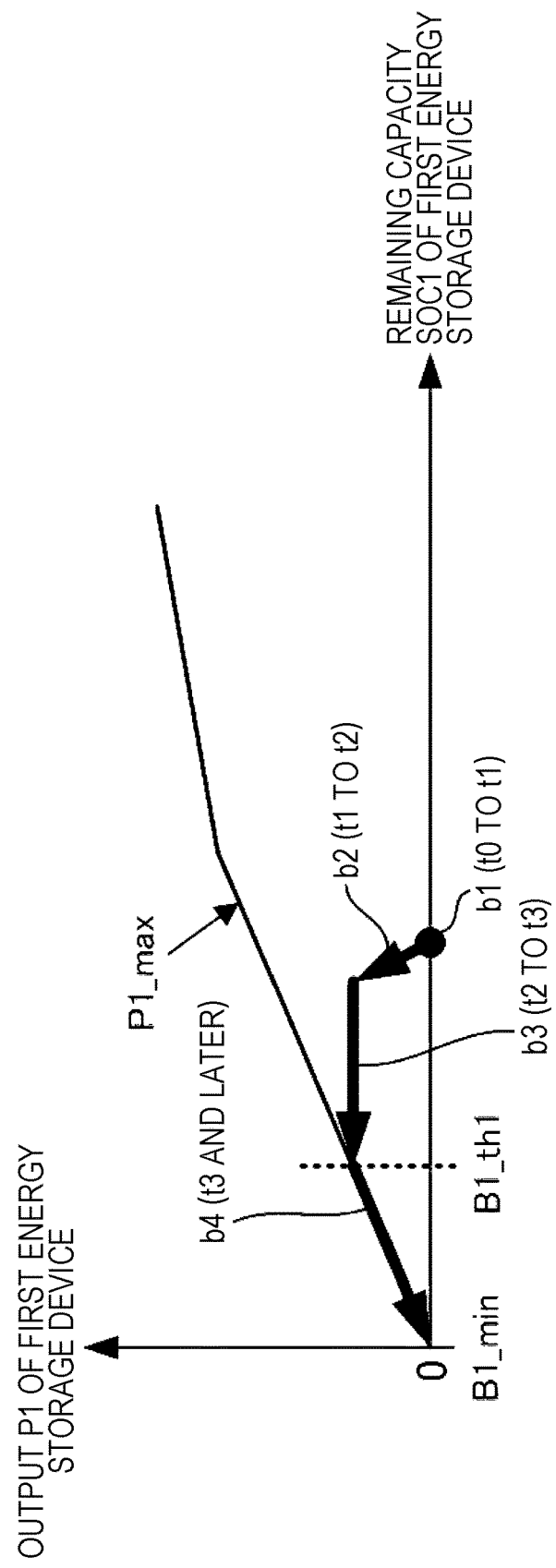
FIG. 14 is a graph illustrating an example of changes in the remaining capacity of the first energy storage device over time.

The upper-limit supplied power P1_max is determined from the detected value of the first remaining capacity SOC1, for example, in a manner depicted on a graph in FIG. 14 by using a map created in advance or by using an operational expression. The upper-limit supplied power P1_max is determined to be a value that becomes smaller as the first remaining capacity SOC1 decreases.

Then, in STEP42, the power transmission controller 41 determines whether or not the upper-limit supplied power P1_max is greater than the supplied power corresponding to the driving force demand DT_dmd.

If the determination result of STEP42 is affirmative, in STEP43, the power transmission controller 41 controls the power transmission circuit unit 11 so that the output P1 of the first energy storage device 2 coincides with the supplied power corresponding to the driving force demand DT_dmd.

In this case, specific control of the power transmission circuit unit 11 can be performed in a manner similar to that in STEP28 in FIG. 9.

On the other hand, if the determination result of STEP42 is negative, in STEP44, the power transmission controller 41 controls the power transmission circuit unit 11 so that the output P1 of the first energy storage device 2 coincides with the upper-limit supplied power P1_max and so that the output P2 of the second energy storage device 3 coincides with the power deficit obtained by subtracting the output P1 of the first energy storage device 2 (=P1_max) from the supplied power corresponding to the driving force demand DT_dmd.

In this case, specific control of the power transmission circuit unit 11 can be performed in a manner similar to that in STEP14 in FIG. 7.

In STEP44, when the detected value of the first remaining capacity SOC1 has reached the lower limit B1_min and the upper-limit supplied power P1_max=0 holds, the supplied power corresponding to the driving force demand DT_dmd is supplied only from the second energy storage device 3 to the electric motor 100. In this situation, the voltage converter 15 of the power transmission circuit unit 11 is controlled to be in current flow interruption state or the contactor 12 on the first energy storage device 2 side is controlled to be turned off.

The extended-stop control process is executed in the way described above. In the extended-stop control process, the first energy storage device 2 from which it is difficult to output a large amount of supplied power is preferentially used to supply power to the electric motor 100. Even when the upper-limit supplied power P1_max, which can be output by the first energy storage device 2, does not reach the supplied power corresponding to the driving force demand DT_dmd, power is supplied from both the first energy storage device 2 and the second energy storage device 3 to the electric motor 100, allowing the first energy storage device 2 to be discharged to the remaining capacity corresponding to the lower limit B1_min.

Thereafter, the second energy storage device 3 from which it is easy to output a large amount of supplied power is used to supply power to the electric motor 100. This allows the second energy storage device 3 to be discharged to the remaining capacity corresponding to the lower limit B2_min or to a nearby remaining capacity.

An example of changes in the first remaining capacity SOC1 and the second remaining capacity SOC2 through the normal combined-use control process and extended-stop control process described above will now be described with reference to FIG. 13 to FIG. 15.

Figure 13:
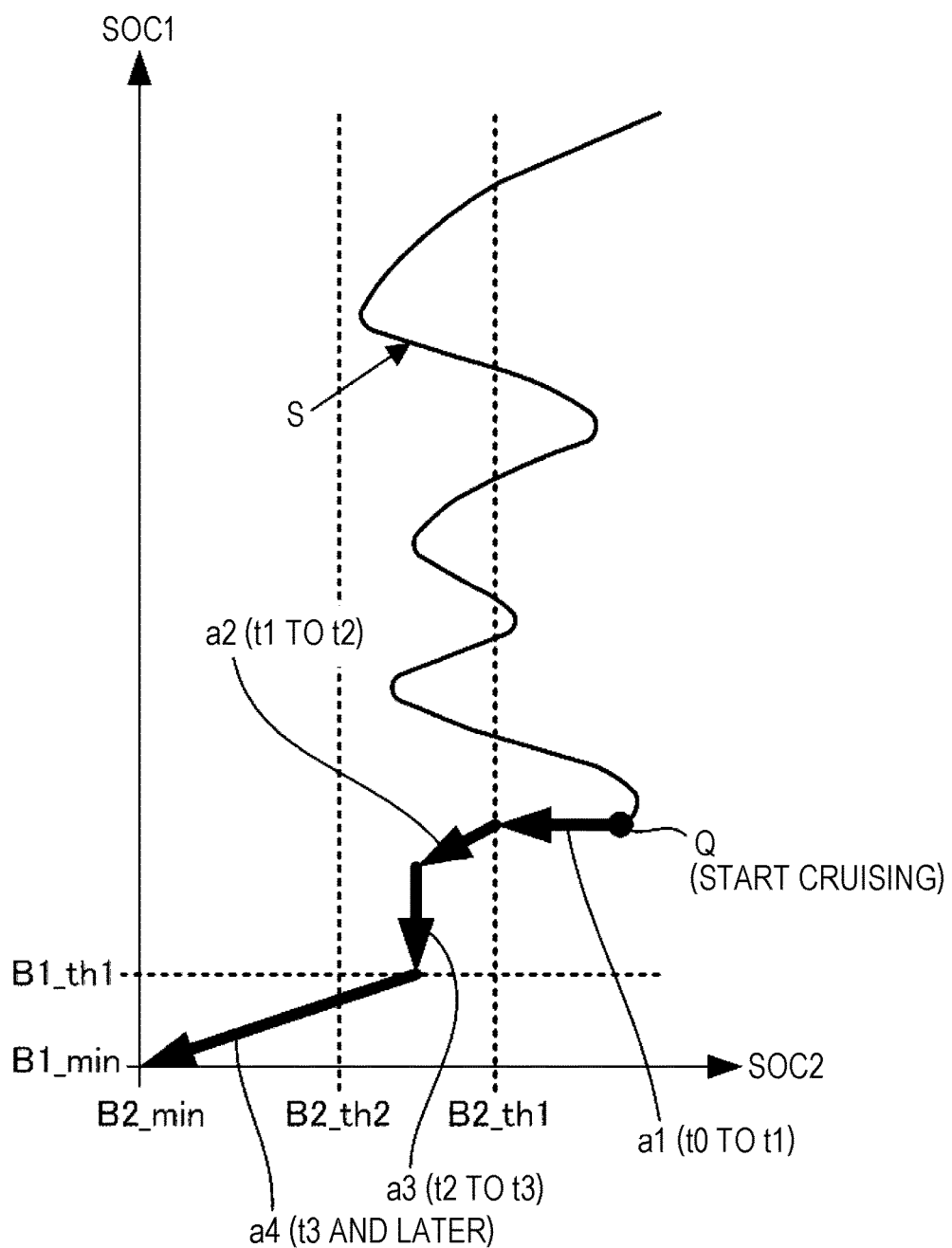
FIG. 13 is a graph illustrating an example of changes in a combination of the respective remaining capacities of the first energy storage device and the second energy storage device over time.

FIG. 13 illustrates a graph S, which depicts, by way of example, in which pattern the combination of the first remaining capacity SOC1 and the second remaining capacity SOC2 changes when the vehicle is traveling with the normal combined-use control process being executed.

The graph S demonstrates that the second remaining capacity SOC2 increases or decreases so as to be kept at, for example, a value near the threshold value B2_th1 by appropriately charging the second energy storage device 3 with power supplied from the first energy storage device 2, whereas the first remaining capacity SOC1 decreases.

In FIG. 13, thick-line arrows a1 to a4 indicate how the combination of the first remaining capacity SOC1 and the second remaining capacity SOC2 changes when the vehicle starts cruising at, for example, the time point (time t0) at which the combination of the first remaining capacity SOC1 and the second remaining capacity SOC2 is in a state indicated by a point Q. Cruising is movement of a vehicle with the driving force demand DT_dmd of the electric motor 100 and the rotational speed being kept substantially constant.

In FIG. 14, a point b1 and thick-line arrows b2 to b4 indicate changes in the first remaining capacity SOC1 from the time t0. In FIG. 15, thick-line arrows c1 and c2, a point c3, and a thick-line arrow c4 indicate changes in the second remaining capacity SOC2 from the time t0.

The indications a1, b1, and c1 represent the time period from the time t0 to time t1, the indications a2, b2, and c2 represent the time period from the time t1 to time t2, the indications a3, b3, and c3 represent the time period from the time t2 to time t3, and the indications a4, b4, and c4 represent the time period after the time t3. The time t3 is a time at which the extended-stop control process is started in response to the first remaining capacity SOC1 reaching the threshold value B1_th1. In addition, the driving force demand DT_dmd of the electric motor 100 which is cruising has a value positioned at the height indicated by c1, c2, c3, and c4 in FIG. 15, for example.

Figure 15:
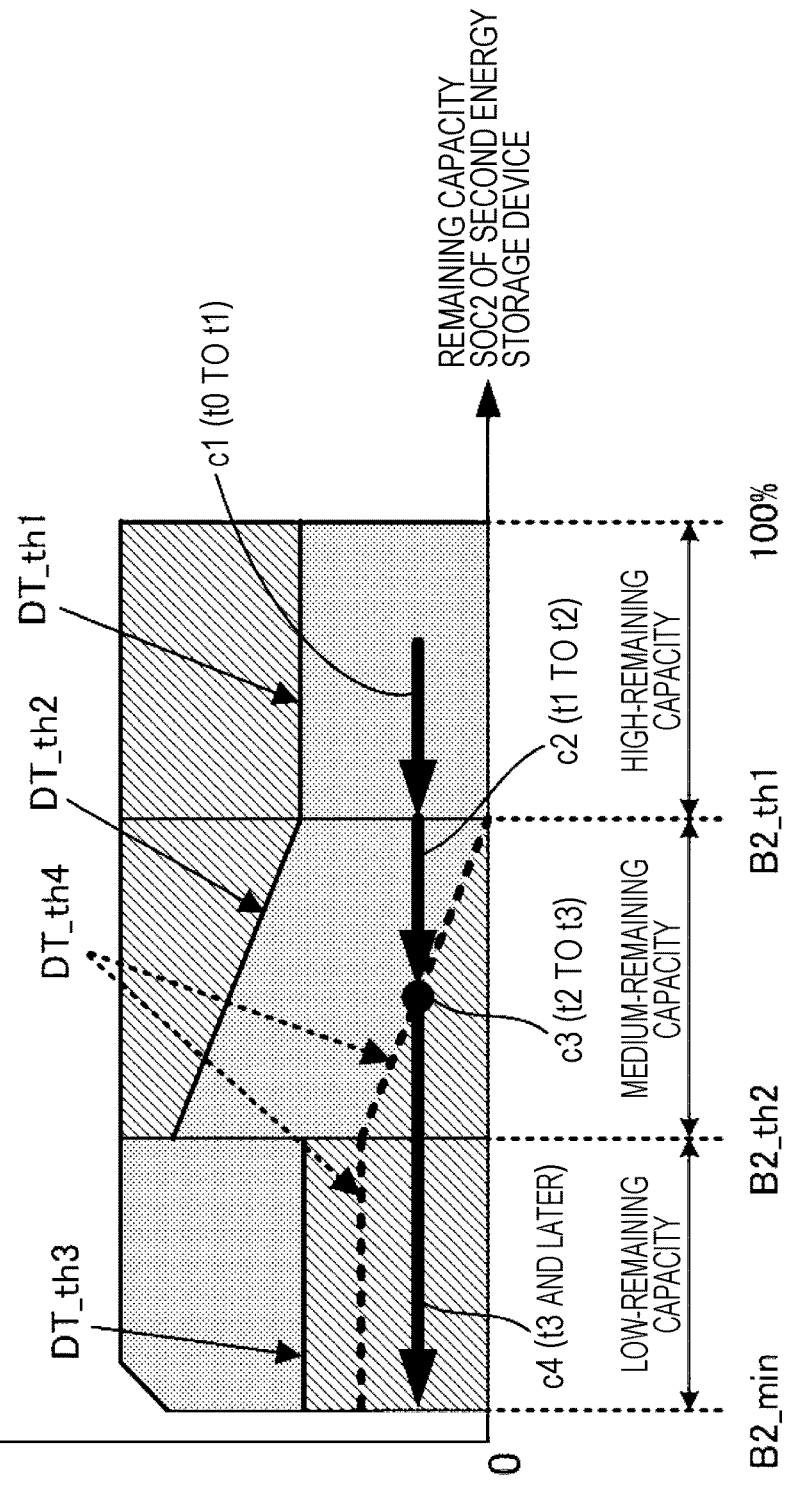
FIG. 15 is a graph illustrating an example of changes in the remaining capacity of the second energy storage device over time.

During the time period from the time t0 to the time t1, through the normal combined-use control process, no power is supplied from the first energy storage device 2 to the electric motor 100 or nor is the second energy storage device 3 charged with power supplied from the first energy storage device 2, and power is supplied only from the second energy storage device 3 to the electric motor 100 (see FIG. 15). Thus, as indicated by way of example by the arrow a1 in FIG. 13 and the point b1 in FIG. 14, the first remaining capacity SOC1 is kept constant. In addition, as indicated by way of example by the arrow a1 in FIG. 13 and the arrow c1 in FIG. 15, the second remaining capacity SOC2 decreases.

When the second remaining capacity SOC2 reaches the threshold value B2_th1 at the time t1, then, during the time period from the time t1 to the time t2, through the normal combined-use control process, power is supplied from both the first energy storage device 2 and the second energy storage device 3 to the electric motor 100 (see FIG. 15). Thus, as indicated by way of example by the arrow a2 in FIG. 13 and the arrow b2 in FIG. 14, the first remaining capacity SOC1 decreases and, as indicated by way of example by the arrow a2 in FIG. 13 and the arrow c2 in FIG. 15, the second remaining capacity SOC2 decreases.

When the second remaining capacity SOC2 reaches the value corresponding to the point c3 in FIG. 15 at the time t2, through the normal combined-use control process, power is supplied only from the first energy storage device 2 to the electric motor 100. Thus, during the time period from the time t2 to the time t3, as indicated by way of example by the arrow a3 in FIG. 13 and the point c3 in FIG. 15, the second remaining capacity SOC2 is kept constant. Then, as indicated by way of example by the arrow a3 in FIG. 13 and the arrow b3 in FIG. 14, the first remaining capacity SOC1 decreases.

When the first remaining capacity SOC1 decreases to the threshold value B1_th1 at the time t3, the extended-stop control process is started. Thus, after the time t3, as indicated by way of example by the arrow a4 in FIG. 13 and the arrow b4 in FIG. 14, the first remaining capacity SOC1 decreases to the lower limit B1_min while the first energy storage device 2 outputs the upper-limit supplied power P1_max. In addition, as indicated by way of example by the arrow a4 in FIG. 13 and the arrow c4 in FIG. 15, the second remaining capacity SOC2 decreases to the lower limit B2_min.

Figure 16:
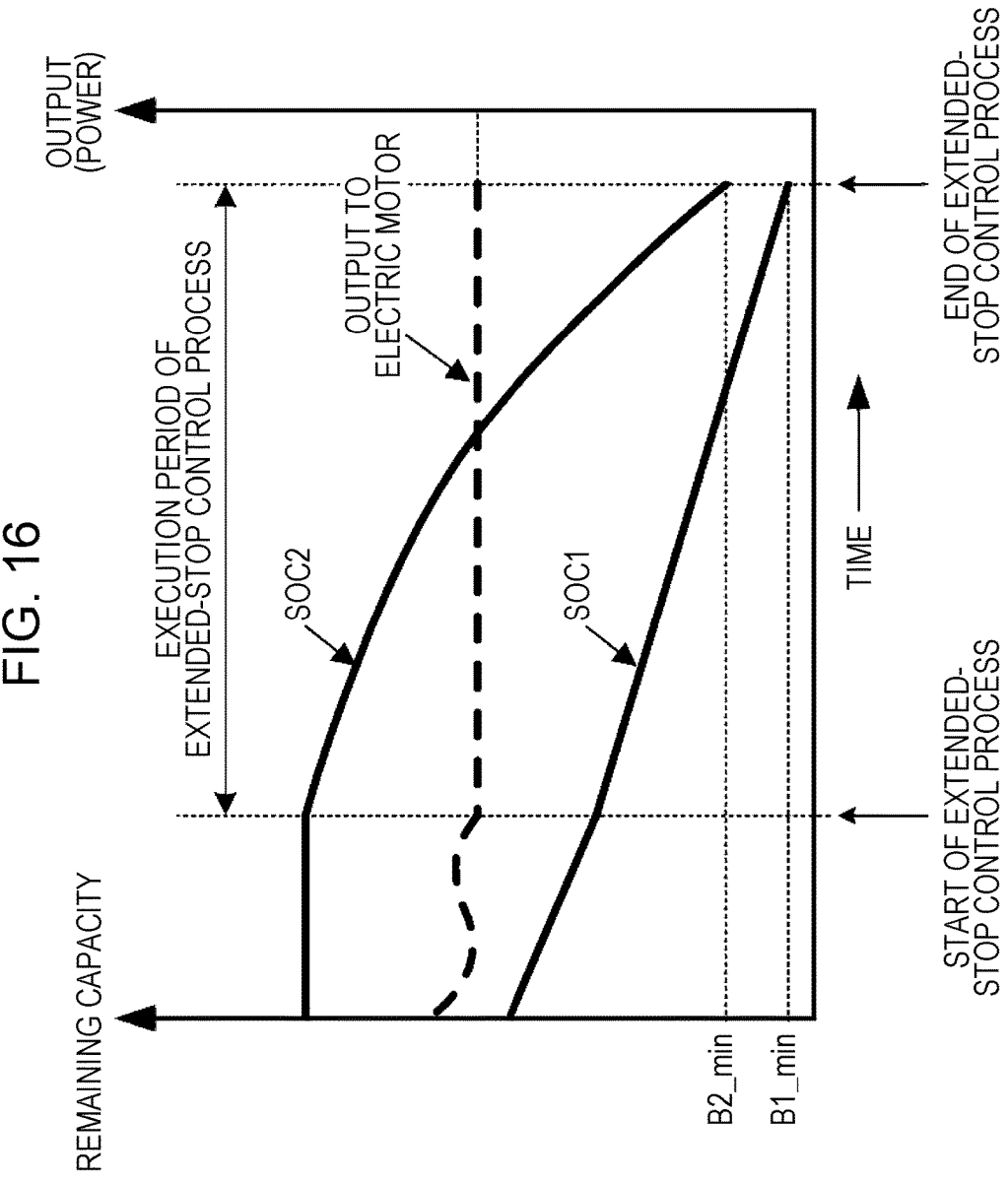
FIG. 16 is a graph illustrating an example of changes in the remaining capacities of the first energy storage device and the second energy storage device over time within a period during which the extended-stop control process is executed.

FIG. 16 illustrates an example of changes in the first remaining capacity SOC1 and the second remaining capacity SOC2 over time in the extended-stop control process. The illustrated example provides an example of changes in the first remaining capacity SOC1 and the second remaining capacity SOC2 over time when the output (the supplied power) to the electric motor 100 is kept at a certain constant value (that is, when the vehicle is cruising) after the start of the extended-stop control process.

As illustrated in FIG. 16, power is supplied from both the first energy storage device 2 and the second energy storage device 3 to the electric motor 100. This allows the remaining capacities SOC1 and SOC2 of the first energy storage device 2 and the second energy storage device 3 to be consumed to the lower limits B1_min and B2_min, respectively, while ensuring a constant value of supplied power to the electric motor 100.

In the manner described above, an extension of the period during which power can be supplied to the electric motor 100 with the use of both the first energy storage device 2 and the second energy storage device 3 allows the power of both the first energy storage device 2 and the second energy storage device 3 to be exhausted more fully than an extension of the period during which power can be supplied to the electric motor 100 with the use of either energy storage device (e.g., the first energy storage device 2). Thus, the period during which power can be supplied to the electric motor 100 and therefore the drivable range of the vehicle can further be extended.

As described above, the normal combined-use control process enables the first the remaining capacity SOC1 to decrease while holding the second remaining capacity SOC2 within the medium-remaining-capacity area or at a nearby value.

In the extended-stop control process, furthermore, the first energy storage device 2 and the second energy storage device 3 can be discharged fully to the respective lower limits B1_min and B2_min or to nearby remaining capacity values due to power supply to the electric motor 100.

Control Process During Regenerative Operation

There will now be described a control process for the power transmission controller 41 during the regenerative operation of the electric motor 100.

Figure 17:
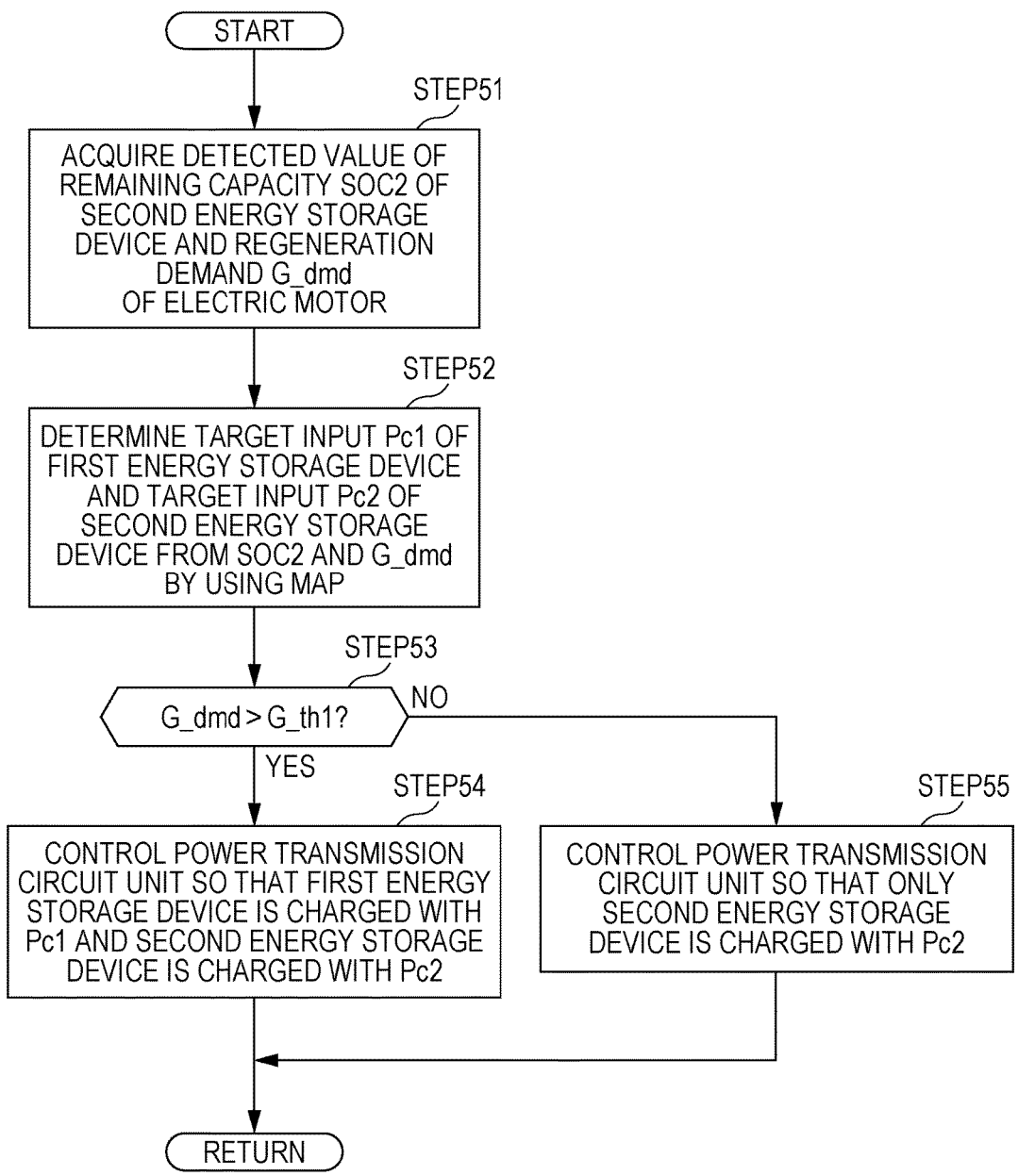
FIG. 17 is a flowchart illustrating a control process (a first embodiment) executed by the control device in the normal operating state of the first energy storage device during a regenerative operation of the electric motor.

In this embodiment, the control process for the power transmission controller 41 during the regenerative operation of the electric motor 100 is executed at intervals of a predetermined control process period in a way illustrated in a flowchart in FIG. 17.

Specifically, in STEP51, the power transmission controller 41 acquires a detected value of the second remaining capacity SOC2 and a regeneration demand G_dmd of the electric motor 100. In this embodiment, the regeneration demand G_dmd is a request value for power to be generated by the electric motor 100 (an amount of energy generated per unit time).

The regeneration demand G_dmd is determined from, for example, a braking force demand during the regenerative operation of the electric motor 100 and a detected value of the rotational speed of the electric motor 100 by using a map created in advance or by using an operational expression.

Then, in STEP52, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Figure 18:
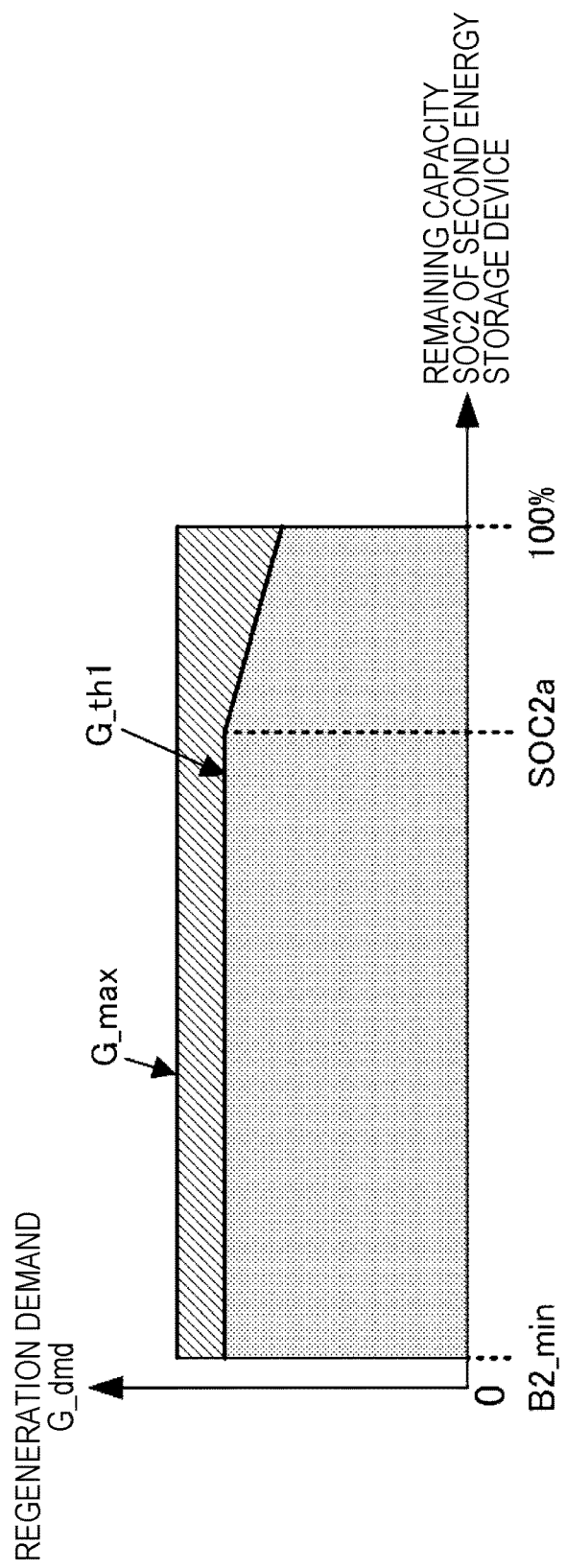
FIG. 18 illustrates a map for the process illustrated in FIG. 17.

FIG. 18 illustrates a visual representation of the map (specifically, a map created when both the first energy storage device 2 and the second energy storage device 3 are in normal operation). On the map, a shaded area within which the regeneration demand G_dmd is less than or equal to a predetermined threshold value G_th1 represents an area within which only the second energy storage device 3 is charged (an area within which Pc1=0 holds), and a diagonally hatched area within which the regeneration demand G_dmd is greater than the threshold value G_th1 represents an area within which both the first energy storage device 2 and the second energy storage device 3 are charged.

The threshold value G_th1 is a threshold value set in accordance with the detected value of the second remaining capacity SOC2. In the illustrated example, the threshold value G_th1 is a predetermined constant value (fixed value) in an area within which the second remaining capacity SOC2 is less than or equal to a predetermined value SOC2$a$, and is set to decrease in accordance with an increase in the second remaining capacity SOC2 in an area within which the second remaining capacity SOC2 is larger than the predetermined value SOC2$a$. The threshold value G_th1 in an area less than or equal to the predetermined value SOC2$a$ is set to a value closer to a maximum value G_max of the regeneration demand G_dmd.

In STEP52, when the combination of the detected value of the second remaining capacity SOC2 and the regeneration demand G_dmd falls within the shaded area, the target input Pc1 of the first energy storage device 2 is set to zero and the regeneration demand G_dmd is set as the target input Pc2 of the second energy storage device 3. Accordingly, if the regeneration demand G_dmd is smaller than the threshold value G_th1, the target inputs Pc1 and Pc2 are set so that only the second energy storage device 3 is charged with regenerative power.

When the combination of the detected value of the second remaining capacity SOC2 and the regeneration demand G_dmd falls within the diagonally hatched area, a regenerative value that coincides with the threshold value G_th1 is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Accordingly, the target inputs Pc1 and Pc2 are set so that, when the regeneration demand G_dmd is greater than the threshold value G_th1 and when the detected value of the second remaining capacity SOC2 is larger than the predetermined value SOC2a, the ratio of the target input Pc2 of the second energy storage device 3 to the regeneration demand G_dmd decreases as the detected value of the second remaining capacity SOC2 increases (in other words, so that the ratio of the target input Pc1 of the first energy storage device 2 to the regeneration demand G_dmd increases as the detected value of the second remaining capacity SOC2 increases).

Then, in STEP53, the power transmission controller 41 determines whether or not the regeneration demand G_dmd is greater than the threshold value G_th1.

The determination result of STEP53 is affirmative within the diagonally hatched area illustrated in FIG. 18. In this situation, in STEP54, the power transmission controller 41 controls the power transmission circuit unit 11 so that the first energy storage device 2 and the second energy storage device 3 are charged with the target inputs Pc1 and Pc2, respectively.

Specifically, the processing of STEP54 can be executed in the following way, for example. A target value for the output voltage of the inverter 17 (=the input voltages of the voltage converters 15 and 16) is set in accordance with the detected value of the rotational speed of the electric motor 100 or the like. In addition, the target input Pc1 is set as the target value for the output power from the voltage converter 15 to the first energy storage device 2, and the target input Pc2 is set as the target value for the output power from the voltage converter 16 to the second energy storage device 3.

Further, the inverter 17 is controlled so as to realize the target value for the output voltage of the inverter 17. Also, the voltage converters 15 and 16 are controlled so as to realize the target value for the output power from the voltage converter 15 to the first energy storage device 2 and the target value for the output power from the voltage converter 16 to the second energy storage device 3.

On the other hand, the determination result of STEP53 is negative within the shaded area illustrated in FIG. 18. In this situation, in STEP55, the power transmission controller 41 controls the power transmission circuit unit 11 so that only the second energy storage device 3 is charged with the target input Pc2.

Specifically, the processing of STEP55 can be executed in the following way, for example. A target value for the output voltage of the inverter 17 (=the input voltage of the voltage converter 16) is set in accordance with the detected value of the rotational speed of the electric motor 100 or the like. In addition, the target input Pc2 is set as the target value for the output power from the voltage converter 16 to the second energy storage device 3.

Further, the inverter 17 is controlled so as to realize the target value for the output voltage of the inverter 17. Also, the voltage converter 16 is controlled so as to realize the target value for the output power from the voltage converter 16 to the second energy storage device 3.

Furthermore, the voltage converter 15 is controlled to be in current flow interruption state. Alternatively, the contactor 12 on the first energy storage device 2 side is controlled to be turned off. This prohibits discharging from the first energy storage device 2.

When both the first energy storage device 2 and the second energy storage device 3 are in normal operation, the control process for the power transmission controller 41 during the regenerative operation of the electric motor 100 is executed in the way described above.

The control process for the power transmission controller 41 during the regenerative operation is executed in the way described above, thereby allowing regenerative power to be used to basically charge the second energy storage device 3. Only an excess of regenerative power used to charge the second energy storage device 3 (a regenerative value exceeding the threshold value G_th1) is used to charge the first energy storage device 2.

This allows the second remaining capacity SOC2 to be kept within the medium-remaining-capacity area or at a nearby remaining capacity value while reducing as much as possible the occurrence of a situation in which it is necessary to charge the second energy storage device 3 with power supplied by the first energy storage device 2.

In addition, the first energy storage device 2 typically has a low resistance to charging at high rates (high-speed charging in which the amount of charging power per unit time is large). However, reducing the regenerative value for the first energy storage device 2 as much as possible enables deterioration of the first energy storage device 2 to be prevented as much as possible.

Control Process in Response to Failure of Some of Energy Storage Units of First Energy Storage Device Next, a description will be given of a control process for the power transmission controller 41 when the failure detector 43 detects that some of the energy storage units 2a of the first energy storage device 2 have failed and the second energy storage device 3 is in normal operation (the second energy storage device 3 has experienced no failure). This state (hereinafter sometimes referred to as the partial failure state of the first energy storage device 2) is a state in which (normally operating) energy storage units 2a that have experienced no failure among the energy storage units 2a of the first energy storage device 2 can supply power to the electric motor 100.

Figure 19:
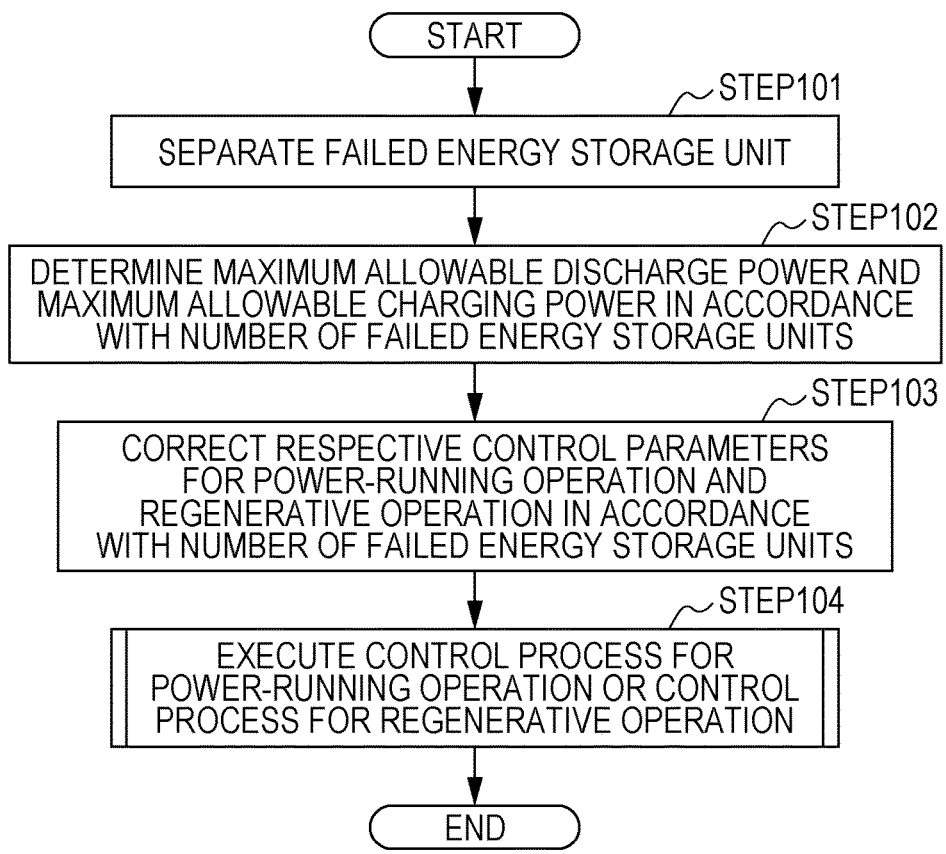
FIG. 19 is a flowchart illustrating a control process executed by the control device in a partial failure state of the first energy storage device.

In the partial failure state of the first energy storage device 2, the power transmission controller 41 executes a process illustrated in a flowchart in FIG. 19.

In STEP101, the power transmission controller 41 electrically separates failed energy storage units 2a of the first energy storage device 2 from the input/output terminals 2p and 2n of the first energy storage device 2. Specifically, the power transmission controller 41 controls the switch elements (not illustrated) interposed in the current-carrying paths between the failed energy storage units 2a and the input/output terminal 2p or 2n to be turned off to interrupt the current-carrying paths. This allows the failed energy storage units 2a to be electrically separated from the input/output terminals 2p and 2n of the first energy storage device 2.

When the partial failure state of the first energy storage device 2 has occurred, the control device 5 may further execute a process for alerting the driver of the vehicle to the occurrence of a failure in the first energy storage device 2 or to information (visual or audio information) such as rapid repair of the first energy storage device 2.

Then, in STEP102, the power transmission controller 41 determines a maximum allowable discharge power and a maximum allowable charging power in accordance with the number of failed energy storage units 2a. The maximum allowable discharge power is a maximum discharge power that can be output from the entirety of the first energy storage device 2 and the second energy storage device 3. The maximum allowable charging power is a maximum charging power that can be input to the entirety of the first energy storage device 2 and the second energy storage device 3.

The maximum allowable discharge power is, more specifically, a total discharge power that is the sum of a maximum discharge power that can be output from the first energy storage device 2 and a maximum discharge power that can be output from the second energy storage device 3. In other words, the maximum allowable discharge power is an upper limit of the supplied power that can be supplied from the entirety of the first energy storage device 2 and the second energy storage device 3 to the electric motor 100.

The maximum allowable charging power is, more specifically, a total charging power that is the sum of a maximum charging power that can be input to the first energy storage device 2 and a maximum charging power that can be input to the second energy storage device 3. In other words, the maximum allowable charging power is an upper limit of the regenerative power that can be supplied from the electric motor 100 to charge the entirety of the first energy storage device 2 and the second energy storage device 3.

The maximum allowable discharge power and the maximum allowable charging power have values smaller than those when both the first energy storage device 2 and the second energy storage device 3 are in normal operation (hereinafter sometimes referred to simply as the normal operating state).

In the partial failure state of the first energy storage device 2, the maximum allowable discharge power and the maximum allowable charging power are determined on the basis of a data table created in advance, an operational expression, or the like in accordance with the number of failed energy storage units 2a (or the number of normally operating energy storage units 2a). In this case, the maximum allowable discharge power and the maximum allowable charging power are determined to be values that become smaller as the number of failed energy storage units 2a increases (as the number of normally operating energy storage units 2a decreases).

Additionally, in this embodiment, the maximum allowable discharge power and maximum allowable charging power in the normal operating state are set to predetermined values, for example. In the control process in the normal operating state, the maximum value DT_max of the driving force demand DT_dmd illustrated in FIG. 6 (the maximum value DT_max of the driving force demand DT_dmd acquired by the power transmission controller 41 in STEP11) is a value set so that the corresponding supplied power has a value less than or equal to the maximum allowable discharge power in the normal operating state. The maximum value G_max of the regeneration demand G_dmd illustrated in FIG. 18 (the maximum value G_max of the regeneration demand G_dmd acquired by the power transmission controller 41 in STEP51 in FIG. 17) has a value set to a value less than or equal to the maximum allowable charging power in the normal operating state.

In STEP102, the maximum allowable discharge power and the maximum allowable charging power may be determined by reflecting, in addition to the number of failed energy storage units 2a (or the number of normally operating energy storage units 2a), for example, the detected values of the respective remaining capacities SOC1 and SOC2 of the first energy storage device 2 and the second energy storage device 3 immediately before the failure of the energy storage units 2a is detected, or the detected values of the respective temperatures of the first energy storage device 2 and the second energy storage device 3.

Then, in STEP103, the power transmission controller 41 corrects a control parameter for the power-running operation of the electric motor 100 and a control parameter for the regenerative operation of the electric motor 100 from the respective values in the normal operating state in accordance with the number of failed energy storage units 2a.

In this embodiment, the control parameter for the power-running operation of the electric motor 100, which is to be corrected in STEP103, is an upper limit of the supplied power (discharge power) output from the first energy storage device 2 during the power-running operation of the electric motor 100. This upper limit is corrected to a value smaller than that when both the first energy storage device 2 and the second energy storage device 3 are in normal operation. Further, the upper limit is corrected to a value that becomes smaller as the number of failed energy storage units 2a of the first energy storage device 2 increases (or the number of normally operating energy storage units 2a decreases).

In this case, the amount of correction of the upper limit (the amount of correction from the value in the normal operating state) is determined from the number of failed energy storage units 2a (or the number of normally operating energy storage units 2a) of the first energy storage device 2 by using a data table created in advance, an operational expression, or the like.

Here, in the normal operating state, the upper limit of the supplied power output from the first energy storage device 2 is represented as, in FIG. 6, described above, the value of the supplied power corresponding to the total width of the diagonally hatched areas (the widths on the vertical axis) at the individual values of the second remaining capacity SOC2.

In this case, in FIG. 6, the supplied power corresponding to the total width of the diagonally hatched areas at the individual values of the second remaining capacity SOC2 is the supplied power corresponding to the threshold value DT_th3 for the driving force demand DT_dmd in the low-remaining-capacity area of the second remaining capacity SOC2, the supplied power corresponding to the driving force given by (DT_max−(DT_th2−DT_th4)) in the medium-remaining-capacity area of the second remaining capacity SOC2, and the supplied power corresponding to the driving force given by (DT_max−DT_th1) in the high-remaining-capacity area of the second remaining capacity SOC2.

Figure 20:
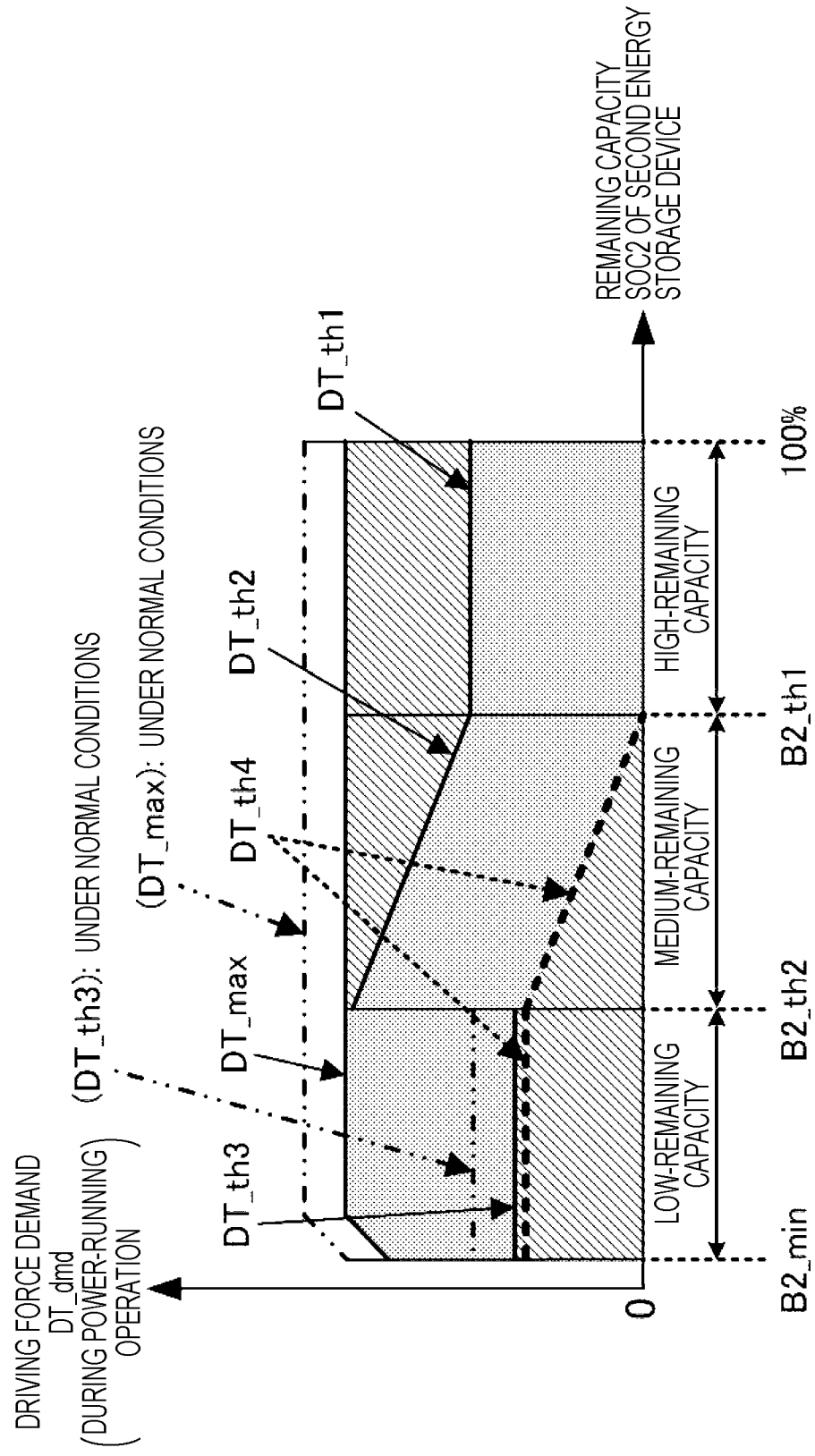
FIG. 20 illustrates a map for a control process for a power-running operation in STEP104 in FIG. 19.

In contrast, FIG. 20 illustrates, in map form similar to that in FIG. 6, the relationship between the second remaining capacity SOC2 and shares allocated to the respective outputs of the first energy storage device 2 and the second energy storage device 3 with respect to the supplied power to be supplied to the electric motor 100 in accordance with the driving force demand DT_dmd of the electric motor 100 in the partial failure state of the first energy storage device 2 (the relationship in which the above-described correction of the upper limit of the supplied power output from the first energy storage device 2 is reflected).

The upper limit of the supplied power output from the first energy storage device 2 in the partial failure state of the first energy storage device 2 is represented as, in FIG. 20, the value of the supplied power corresponding to the total width of the diagonally hatched areas (the widths on the vertical axis) at the individual values of the second remaining capacity SOC2.

In this case, in FIG. 20, as in FIG. 6, the supplied power corresponding to the total width of the diagonally hatched areas at the individual values of the second remaining capacity SOC2 is the supplied power corresponding to the threshold value DT_th3 for the driving force demand DT_dmd in the low-remaining-capacity area of the second remaining capacity SOC2, the supplied power corresponding to the driving force given by (DT_max−(DT_th2−DT_th4)) in the medium-remaining-capacity area of the second remaining capacity SOC2, and the supplied power corresponding to the driving force given by (DT_max−DT_th1) in the high-remaining-capacity area of the second remaining capacity SOC2.

Note that, in FIG. 20, the threshold value DT_th3 and the maximum value DT_max of the driving force demand DT_dmd have values smaller than those in the normal operating state (the values indicated by two-dot chain lines). In FIG. 20, accordingly, the upper limit of the supplied power output from the first energy storage device 2 has a value smaller than that in the normal operating state.

In this embodiment, in the partial failure state of the first energy storage device 2, the upper limit (represented as, in FIG. 20, the value of the supplied power corresponding to the total width of the shaded areas (the widths on the vertical axis) at the individual values of the second remaining capacity SOC2) of the supplied power output from the second energy storage device 3, which is in normal operation, is the same as that when both the first energy storage device 2 and the second energy storage device 3 are in normal operation.

In this case, the upper limit of the supplied power output from the first energy storage device 2 is corrected in the manner described above, thus allowing, as illustrated in FIG. 20, the threshold value DT_th3 and the maximum value DT_max regarding the driving force demand DT_dmd to be set to values smaller than those when both the first energy storage device 2 and the second energy storage device 3 are in normal operation.

The threshold values other than the threshold value DT_th3 regarding the driving force demand DT_dmd in FIG. 20, namely, the threshold values DT_th1 and DT_th2 and the base supplied power P1_base, which is the supplied power corresponding to the threshold value DT_th4, are the same values as those when both the first energy storage device 2 and the second energy storage device 3 are in normal operation.

Further, the control parameter for the regenerative operation of the electric motor 100, which is to be corrected in STEP103, is the upper limit of the regenerative power input to the first energy storage device 2 during the regenerative operation of the electric motor 100 (the upper limit of the charging power input to the first energy storage device 2). This upper limit is corrected to a value smaller than that in the normal operating state. Further, the upper limit is corrected to a value that becomes smaller as the number of failed energy storage units 2a of the first energy storage device 2 increases (or the number of normally operating energy storage units 2a decreases).

In this case, the amount of correction of the upper limit is determined from the number of failed energy storage units 2a (or the number of normally operating energy storage units 2a) of the first energy storage device 2 by using a data table created in advance, an operational expression, or the like.

Here, in the normal operating state, the upper limit of the regenerative power input to the first energy storage device 2 is represented as, in FIG. 18, described above, the value of the regenerative power corresponding to the total width of the diagonally hatched area (the widths on the vertical axis) at the individual values of the second remaining capacity SOC2.

In this case, in FIG. 18, the regenerative power corresponding to the total width of the diagonally hatched area at the individual values of the second remaining capacity SOC2 is the regenerative value equal to the difference between the maximum value G_max of the regeneration demand G_dmd and the threshold value G_th1 (=G_max−G_th1) at the individual values of the second remaining capacity SOC2.

Figure 21:
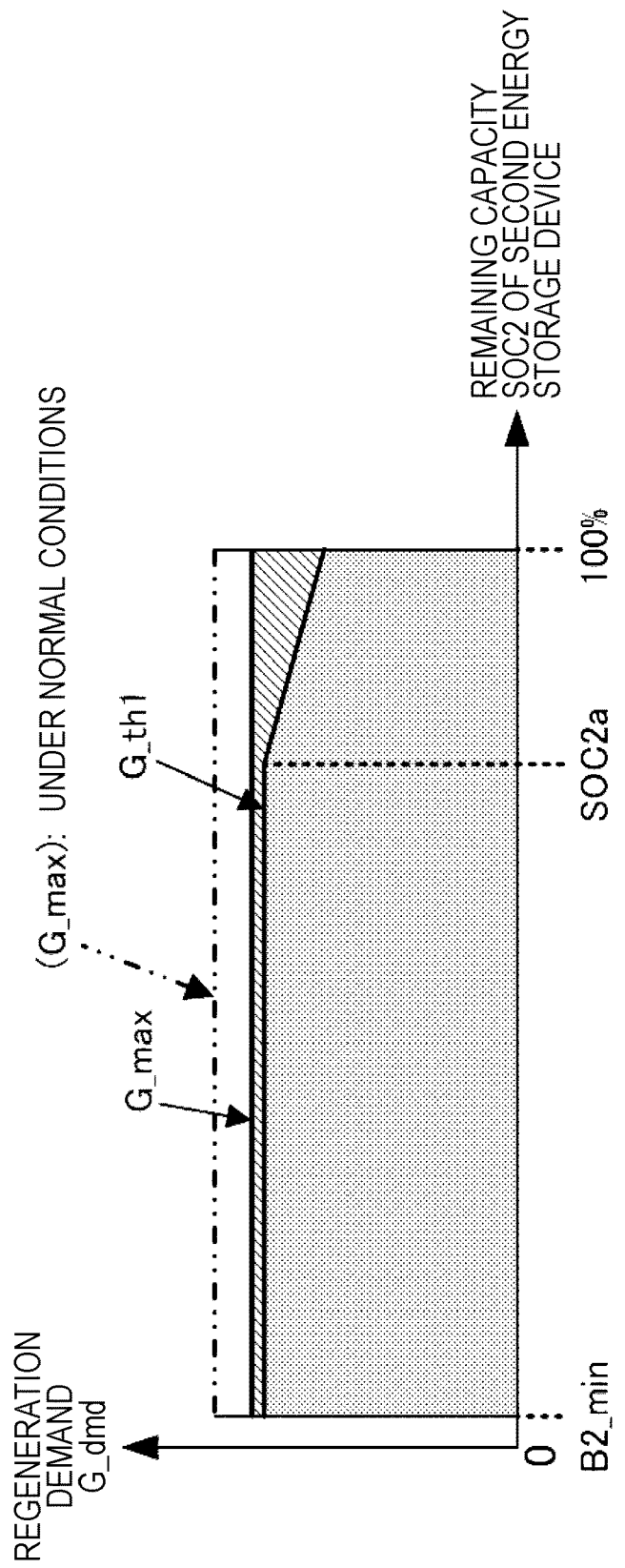
FIG. 21 illustrates a map for a control process for a regenerative operation in STEP104 in FIG. 19.

In contrast, FIG. 21 illustrates a map (a map in form similar to that in FIG. 18) representing the shares allocated to the respective charging powers of the first energy storage device 2 and the second energy storage device 3 in accordance with the regeneration demand G_dmd of the electric motor 100 and the detected value of the remaining capacity SOC2 of the second energy storage device 3 in the partial failure state of the first energy storage device 2.

The upper limit of the regenerative power input to the first energy storage device 2 in the partial failure state of the first energy storage device 2 is represented as, in FIG. 21, the value of the regenerative power corresponding to the total width of the diagonally hatched area (the width on the vertical axis) at the individual values of the second remaining capacity SOC2.

In this case, in FIG. 21, as in FIG. 18, the regenerative power corresponding to the total width of the diagonally hatched area at the individual values of the second remaining capacity SOC2 is the regenerative value equal to the difference between the maximum value G_max of the regeneration demand G_dmd and the threshold value G_th1 (=G_max−G_th1) at the individual values of the second remaining capacity SOC2.

Note that, in FIG. 21, the maximum value G_max of the regeneration demand G_dmd has a value smaller than that in the normal operating state (the value indicated by a two-dot chain line). In FIG. 21, accordingly, the upper limit of the regenerative power input to the first energy storage device 2 has a value smaller than that in the normal operating state.

In this embodiment, in the partial failure state of the first energy storage device 2, the threshold value G_th1, which is the upper limit of the regenerative power input to the second energy storage device 3, which is in normal operation, is the same as that when both the first energy storage device 2 and the second energy storage device 3 are in normal operation.

In this case, the upper limit of the regenerative power input to the first energy storage device 2 is corrected in the manner described above, thus allowing, as illustrated in FIG. 21, the maximum value G_max of the regeneration demand G_dmd to be specified as a value smaller than that in the normal operating state.

After the processing of STEP101 to STEP103 has been executed in the way described above, in STEP104, the power transmission controller 41 executes a control process (a control process for the power-running operation or a control process for the regenerative operation) for sequentially controlling the power transmission circuit unit 11 during each of the power-running operation and the regenerative operation of the electric motor 100.

Figure 22:
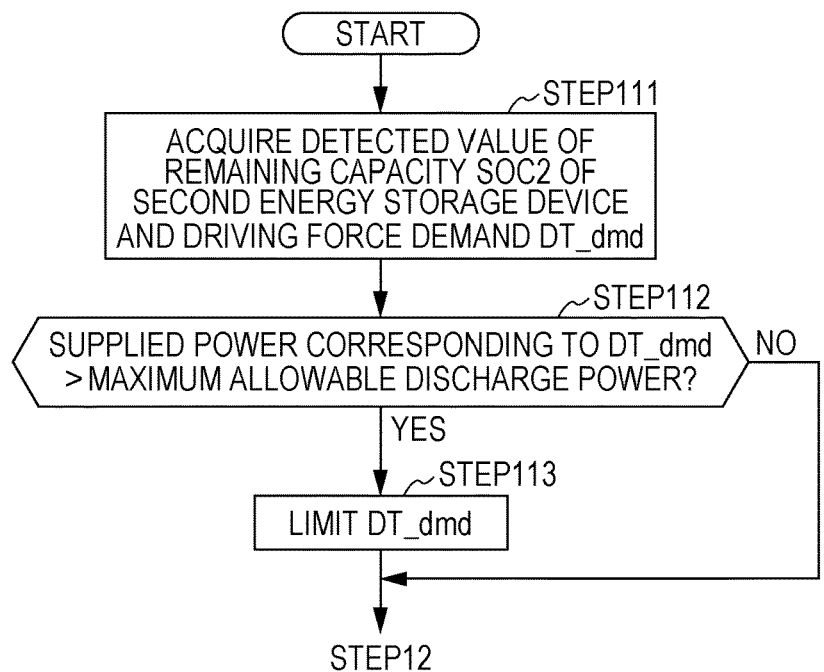
FIG. 22 is a flowchart illustrating the control process for a power-running operation in STEP104 in FIG. 19.

The control process for the power-running operation of the electric motor 100 in STEP104 is executed at intervals of a predetermined control process period in a way illustrated in a flowchart in FIG. 22.

Specifically, in STEP111, the power transmission controller 41 acquires a detected value of the remaining capacity SOC2 of the second energy storage device 3 and the driving force demand DT_dmd.

Then, in STEP112, the power transmission controller 41 determines whether or not the supplied power corresponding to the driving force demand DT_dmd is greater than the maximum allowable discharge power set in STEP102.

If the determination result of STEP112 is affirmative, in STEP113, the power transmission controller 41 forcibly limits the value of the driving force demand DT_dmd (saves power). In this case, the value of the driving force generated by the electric motor 100 when the supplied power equal to the maximum allowable discharge power set in STEP102 is supplied to the electric motor 100 is set as the limited value of the driving force demand DT_dmd.

The limited value of the driving force demand DT_dmd is the maximum value DT_max indicated by a solid line in FIG. 20. The maximum value DT_max is a value smaller than that in the normal operating state by an amount corresponding to the amount of correction of the upper limit of the supplied power output from the first energy storage device 2 in the partial failure state (the amount of correction in the processing of STEP103).

If the determination result of STEP112 is negative or after the execution of the processing of STEP113, the power transmission controller 41 executes the same or substantially the same processing as the processing in STEP12 in FIG. 7 and the subsequent processing described above. Accordingly, the power transmission circuit unit 11 is controlled by a control process similar to the normal combined-use control process described above.

Note that the threshold value DT_th3, which is used in the determination processing in STEP23 in FIG. 9, is a threshold value set so that the supplied power corresponding to the threshold value DT_th3 coincides with the upper limit of the supplied power output from the first energy storage device 2 in the partial failure state (the upper limit determined in the processing of STEP103). Accordingly, as illustrated in FIG. 20, the threshold value DT_th3 is a value smaller than that in the normal operating state.

The process, other than the determination processing in STEP23, is the same or substantially the same as that of the normal combined-use control process in the normal operating state described above.

Figure 23:
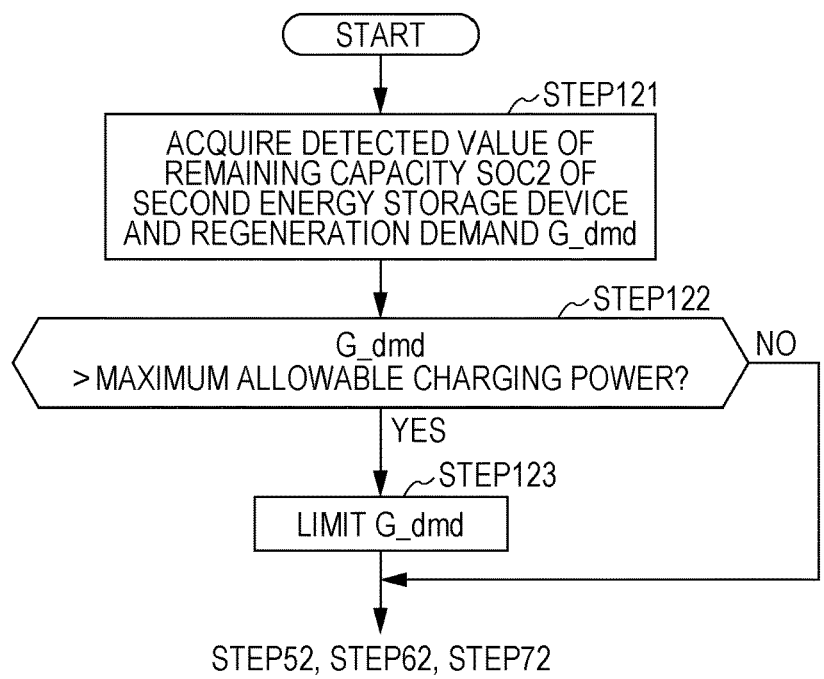
FIG. 23 is a flowchart illustrating the control process for a regenerative operation in STEP104 in FIG. 19.

The control process for the regenerative operation of the electric motor 100 in STEP104 is executed at intervals of a predetermined control process period in a way illustrated in a flowchart in FIG. 23.

Specifically, in STEP121, the power transmission controller 41 acquires a detected value of the remaining capacity SOC2 of the second energy storage device 3 and the regeneration demand G_dmd.

Then, in STEP122, the power transmission controller 41 determines whether or not the regeneration demand G_dmd is greater than the maximum allowable charging power set in STEP102.

If the determination result of STEP122 is affirmative, in STEP123, the power transmission controller 41 forcibly limits the value of the regeneration demand G_dmd. In this case, the maximum allowable charging power set in STEP102 is set as the limited value of the regeneration demand G_max.

The limited value of the regeneration demand G_dmd is the maximum value G_max indicated by a solid line in FIG. 21. The maximum value G_max is a value smaller than that in the normal operating state by an amount corresponding to the amount of correction of the upper limit of the regenerative power input to the first energy storage device 2 in the partial failure state (the amount of correction in the processing of STEP103).

If the determination result of STEP122 is negative or after the execution of the processing of STEP123, the power transmission controller 41 executes the same or substantially the same processing as the processing in STEP52 in FIG. 17 and the subsequent processing described above. Accordingly, the power transmission circuit unit 11 is controlled by a control process similar to the control process illustrated in FIG. 17.

Note that the map illustrated in FIG. 21 instead of the map illustrated in FIG. 18 is used in the processing of STEP52 in FIG. 17. Accordingly, the target input Pc1 of the first energy storage device 2 when the regeneration demand G_dmd is greater than the threshold value G_th1 is determined to be within a range less than or equal to the upper limit of the charging power input to the first energy storage device 2 in the partial failure state (the upper limit determined in the processing of STEP103), that is, within a range of the difference between the maximum value G_max, which is indicated by the solid line in FIG. 21, and the threshold value G_th1 (=Gmax−G_th1).

In this case, the maximum value G_max indicated by the solid line in FIG. 21 is a value smaller than that in the normal operating state by an amount corresponding to the amount of correction of the upper limit of the charging power input to the first energy storage device 2 in the partial failure state (the amount of correction in the processing of STEP103). In this embodiment, the threshold value G_th1 is the same value as that in the normal operating state. The process, other than the processing of STEP52, is the same or substantially the same as that in the normal operating state.

Note that STEP62 and STEP72 illustrated in FIG. 23 relate to the corresponding process in a second embodiment and a third embodiment described below, respectively.

The control process for the power-running operation of the electric motor 100 and the control process for the regenerative operation of the electric motor 100 in the partial failure state of the first energy storage device 2 are executed in the way described above.

In this case, in the control process for the power-running operation, the upper limit of the supplied power output from the first energy storage device 2 is limited to a value smaller than that in the normal operating state, and is also set to decrease as the number of failed energy storage units 2a of the first energy storage device 2 increases.

Thus, power can be supplied from the first energy storage device 2 to the electric motor 100 so that the output (the amount of discharge power) of normally operating energy storage units 2a of the first energy storage device 2 is not excessively larger than that in the normal operating state, regardless of the number of failed energy storage units 2a of the first energy storage device 2.

In addition, the maximum allowable discharge power is also limited to a value smaller than that in the normal operating state, and is also set to decrease as the number of failed energy storage units 2a of the first energy storage device 2 increases.

Thus, even if the upper limit of the supplied power output from the first energy storage device 2 is limited in the manner described above, the output (the amount of discharge power) of the second energy storage device 3 can also be prevented from being excessively larger than that in the normal operating state. For example, in this embodiment, in the partial failure state of the first energy storage device 2, the maximum allowable discharge power is set in accordance with the number of failed energy storage units 2a of the first energy storage device 2 so that the upper limit of the supplied power output from the second energy storage device 3 is equal to the upper limit in the normal operating state.

In the manner described above, power can be supplied to the electric motor 100 during the power-running operation so that the output of each normally operating energy storage unit 2a of the first energy storage device 2 in the partial failure state and the output of the second energy storage device 3 do not excessively increase. This can prevent early or unexpected termination of power supply to the electric motor 100 in response to a failure of some of the energy storage units 2a of the first energy storage device 2, and can result in continuation of power supply to the electric motor 100 for as long a period as possible. Consequently, the drivable range of the vehicle can be extended as much as possible.

In addition, power can be supplied to the electric motor 100 during the power-running operation so that the output of each normally operating energy storage unit 2a of the first energy storage device 2 and the output of the second energy storage device 3 are not excessively larger than those in the normal operating state. Thus, power can be supplied to the electric motor 100 so that the progression of deterioration of each normally operating energy storage unit 2a of the first energy storage device 2 and the progression of deterioration of the second energy storage device 3 can be restrained as much as possible.

Furthermore, in conditions where the supplied power corresponding to the driving force demand DT_dmd is smaller than the base supplied power P1_base and the detected value of the second remaining capacity SOC2 is smaller than the threshold value B2_th1 (the upper limit of the medium-remaining-capacity area), power is supplied from the first energy storage device 2 to charge the second energy storage device 3 in the same or substantially the same manner regardless of whether the first energy storage device 2 is in the normal operating state or the partial failure state.

Thus, even if the partial failure state of the first energy storage device 2 occurs, the remaining capacity SOC2 of the second energy storage device 3 is likely to be kept within the medium-remaining-capacity area as in the normal operating state. Thus, not only in the normal operating state but also the partial failure state of the first energy storage device 2, upon a comparative increase in the supplied power corresponding to the driving force demand DT_dmd up to a supplied power larger than the base supplied power P1_base, the output of the second energy storage device 3 can be caused to increase with high responsivity to supply the supplied power corresponding to the driving force demand DT_dmd to the electric motor 100.

In this embodiment, the control process for the power-running operation in the partial failure state of the first energy storage device 2 (a control process for the power transmission circuit unit 11) is performed in the same way as the normal combined-use control process in the normal operating state, except that the upper limit of the supplied power output from the first energy storage device 2 and the maximum allowable discharge power are set to be different from those in the normal operating state. Therefore, the control process for the power-running operation in the partial failure state of the first energy storage device 2 can basically achieve advantages similar to the advantages described above for the normal combined-use control process in the normal operating state.

In the control process for the regenerative operation in the partial failure state of the first energy storage device 2, the upper limit of the regenerative power input to the first energy storage device 2 is limited to a value smaller than that in the normal operating state and is also set to decrease as the number of failed energy storage units 2a of the first energy storage device 2 increases.

Thus, the first energy storage device 2 can be charged with regenerative power so that the input (the amount of charging power) of each normally operating energy storage unit 2a of the first energy storage device 2 is not excessively larger than that in the normal operating state, regardless of the number of failed energy storage units 2a of the first energy storage device 2.

In addition, the maximum allowable charging power is also limited to a value smaller than that in the normal operating state, and is also set to decrease as the number of failed energy storage units 2a of the first energy storage device 2 increases.

Thus, even if the upper limit of the regenerative power input to the first energy storage device 2 is limited in the manner described above, the input (the amount of charging power) of the second energy storage device 3 can also be prevented from being excessively larger than that in the normal operating state. For example, in this embodiment, in the partial failure state of the first energy storage device 2, the maximum allowable charging power is set in accordance with the number of failed energy storage units 2a of the first energy storage device 2 so that the upper limit of the regenerative power input to the second energy storage device 3 is equal to the upper limit in the normal operating state.

In the manner described above, both the first energy storage device 2 and the second energy storage device 3, or the second energy storage device 3 can be charged with regenerative power of the electric motor 100 during the regenerative operation so that the input of each normally operating energy storage unit 2a of the first energy storage device 2 in the partial failure state and the input of the second energy storage device 3 do not excessively increase.

Thus, both the first energy storage device 2 and the second energy storage device 3, or the second energy storage device 3 can be charged with regenerative power of the electric motor 100 so that the progression of deterioration of each normally operating energy storage unit 2a of the first energy storage device 2 and the progression of deterioration of the second energy storage device 3 can be restrained as much as possible.

In this embodiment, the control process for the regenerative operation in the partial failure state of the first energy storage device 2 (a control process for the power transmission circuit unit 11) is performed in the same way as the control process during the regenerative operation in the normal operating state, except that the upper limit of the regenerative power input to the first energy storage device 2 and the maximum allowable charging power are set to be different from those in the normal operating state. Therefore, the control process for the regenerative operation in the partial failure state of the first energy storage device 2 can basically achieve advantages similar to the advantages described above for the control process during the regenerative operation in the normal operating state.

The correspondences between the first embodiment described above and the present disclosure will be briefly explained below.

In this embodiment, the driving force demand DT_dmd and the regeneration demand G_dmd of the electric motor 100 (electric load) correspond to a request value in the present disclosure.

The maximum allowable discharge power and the maximum allowable charging power correspond to a second upper limit in the present disclosure.

The upper limit of the supplied power output from the first energy storage device 2 and the upper limit of the regenerative power input to the first energy storage device 2 correspond to a first upper limit in the present disclosure.

The threshold value DT_th4, which is obtained by converting the base supplied power P1_base into a driving force value of the electric motor 100, corresponds to an A-th threshold value in the present disclosure, and the threshold value B2_th1 regarding the second remaining capacity SOC2 corresponds to a first threshold value in the present disclosure.

The control process executed by the power transmission controller 41 described above corresponds to a power transmission control process in the present disclosure. In the control process executed by the power transmission controller 41 during the power-running operation of the electric motor 100, the control process for the power transmission circuit unit 11 in STEP21 and STEP27 corresponds to a first power supply process in the present disclosure, and the control process for the power transmission circuit unit 11 in STEP14, STEP15, STEP18, STEP22, STEP24, and STEP28 corresponds to a second power supply process in the present disclosure.

Further, the base supplied power P1_base is an upper limit of the output of the first energy storage device 2 in the first power supply process, regardless of whether the first energy storage device 2 is in the normal operating state or the partial failure state. Accordingly, the upper limit of the output of the first energy storage device 2 in the first power supply process is kept constant even when the state of the first energy storage device 2 changes from the normal operating state to the partial failure state.

As to the failure of the first energy storage device 2 and the second energy storage device 3, only the case where some of the energy storage units 2a of the first energy storage device 2 have failed has been described. If any other failure occurs in the first energy storage device 2 or the second energy storage device 3, the control device 5 can execute the following process.

For example, if the failure of no current flow between the input/output terminals 2p and 2n of the first energy storage device 2 has occurred (including the case where all the energy storage units 2a have failed), for example, the control device 5 executes a process similar to the stop process in STEP6.

If the second energy storage device 3 has failed, the control device 5 controls the power transmission circuit unit 11 to supply the supplied power corresponding to the driving force demand DT_dmd only from the first energy storage device 2 to the electric motor 100 until the remaining capacity of the first energy storage device 2 is reduced to a predetermined value.

Second Embodiment

Next, a second embodiment of the present disclosure will be described with reference to FIGS. 24 to 26. This embodiment is the same or substantially the same as the first embodiment, except for a control process performed during the regenerative operation of the electric motor 100. Thus, the same or substantially the same portions as those in the first embodiment are not described herein.

Figure 24:
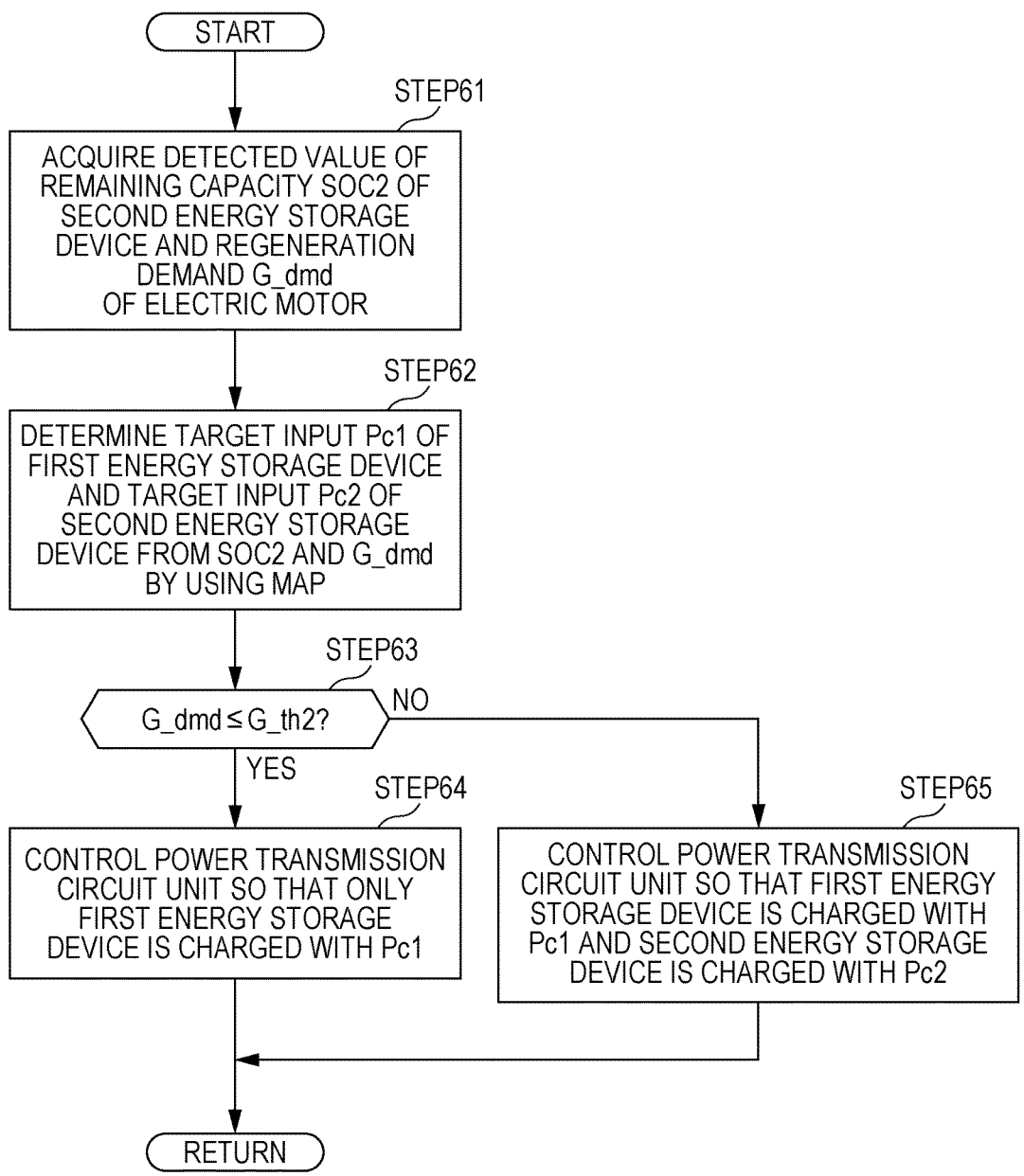
FIG. 24 is a flowchart illustrating a control process (a second embodiment) for the control device during the regenerative operation of the electric motor.

In this embodiment, in the normal operating state (in the state where the first energy storage device 2 and the second energy storage device 3 are in normal operation), the control process for the power transmission controller 41 during the regenerative operation of the electric motor 100 is executed at intervals of a predetermined control process period in a way illustrated in a flowchart in FIG. 24.

Specifically, in STEP61, the power transmission controller 41 acquires a detected value of the second remaining capacity SOC2 and a regeneration demand G_dmd of the electric motor 100. The processing of STEP61 is the same or substantially the same as the processing of STEP51 in the first embodiment.

Then, in STEP62, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Figure 25:
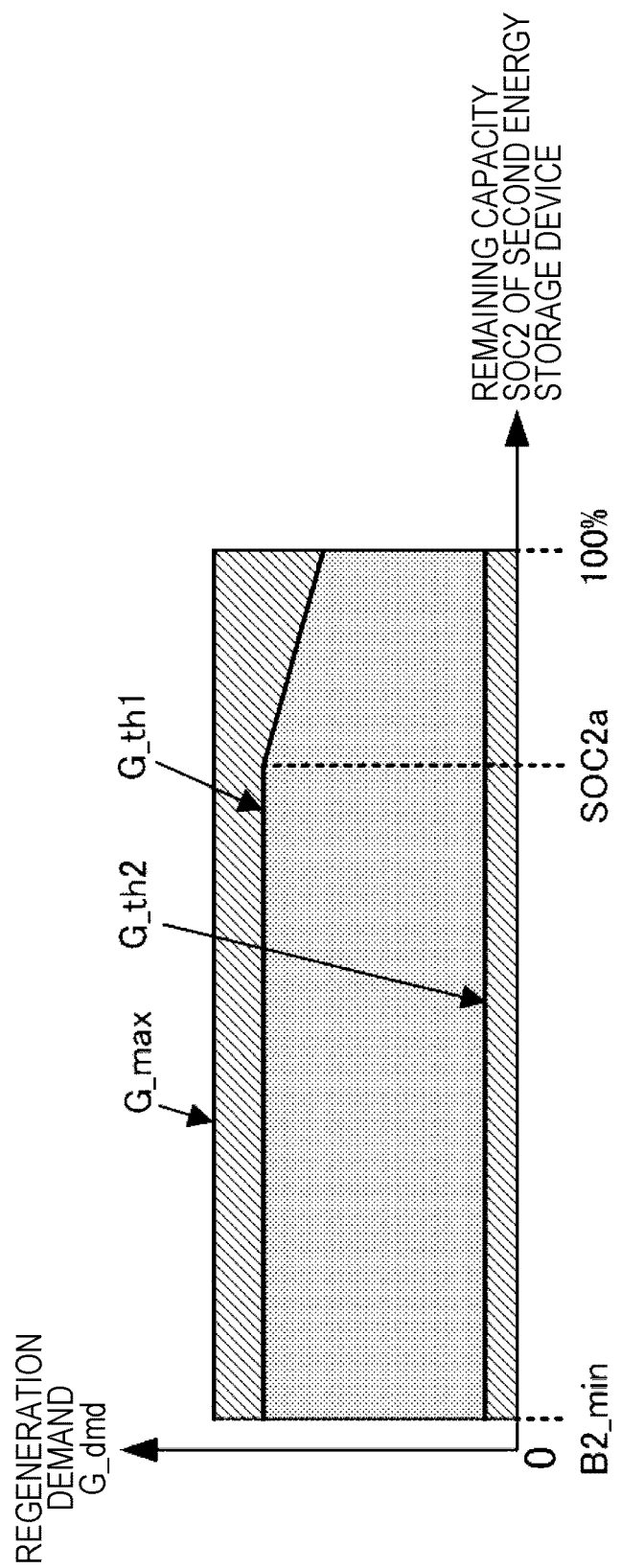
FIG. 25 illustrates a map for the process illustrated in FIG. 24 (or FIG. 27).

FIG. 25 illustrates a visual representation of the map in this embodiment. On the map, a diagonally hatched area within which the regeneration demand G_dmd is less than or equal to a predetermined threshold value G_th2 represents an area within which only the first energy storage device 2 is charged (an area within which Pc2=0 holds), and a shaded area within which the regeneration demand G_dmd is greater than the threshold value G_th2 and is less than or equal to a predetermined threshold value G_th1 and a diagonally hatched area within which the regeneration demand G_dmd is greater than the threshold value G_th1 represent an area within which both the first energy storage device 2 and the second energy storage device 3 are charged.

Of the threshold values G_th1 and G_th2, the threshold value G_th1 is a threshold value set in accordance with the detected value of the second remaining capacity SOC2, as in the first embodiment.

In this embodiment, the threshold value G_th2 is a predetermined constant value. The threshold value G_th2 is a comparatively small value (a near-zero value).

In FIG. 25, G_max denotes a maximum value of the regeneration demand G_dmd, and is a value set to a value less than or equal to the maximum allowable charging power in the normal operating state, as in the first embodiment.

In this embodiment, furthermore, the value of the regenerative power corresponding to the total width of the diagonally hatched areas (the widths on the vertical axis) (=G_th2+(G_max−G_th1)) at the individual values of the second remaining capacity SOC2 corresponds to the upper limit of the regenerative power input to the first energy storage device 2 in the normal operating state, and the value of the regenerative power corresponding to the total width of the shaded area (the widths on the vertical axis) (=G_th1−G_th2) at the individual values of the second remaining capacity SOC2 corresponds to the upper limit of the regenerative power input to the second energy storage device 3 in the normal operating state.

In STEP62, when the combination of the detected value of the second remaining capacity SOC2 and the regeneration demand G_dmd falls within the bottom diagonally hatched area, the target input Pc2 of the second energy storage device 3 is set to zero and the regeneration demand G_dmd is set as the target input Pc1 of the first energy storage device 2.

Accordingly, the target inputs Pc1 and Pc2 are set so that only the first energy storage device 2 is charged with regenerative power.

When the combination of the detected value of the second remaining capacity SOC2 and the regeneration demand G_dmd falls within the shaded area, a regenerative value that coincides with the threshold value G_th2 is set as the target input Pc1 of the first energy storage device 2 and the residual regenerative value, which is obtained by subtracting the target input Pc1 of the first energy storage device 2 from the regeneration demand G_dmd, is set as the target input Pc2 of the second energy storage device 3.

When the combination of the detected value of the second remaining capacity SOC2 and the regeneration demand G_dmd falls within the top diagonally hatched area, a supplied power that coincides with a value obtained by subtracting the threshold value G_th2 from the threshold value G_th1 (=G_th1−G_th2) is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Then, in STEP63, the power transmission controller 41 determines whether or not the regeneration demand G_dmd is less than or equal to the threshold value G_th2.

The determination result of STEP63 is affirmative within the bottom diagonally hatched area illustrated in FIG. 25. In this situation, in STEP64, the power transmission controller 41 controls the power transmission circuit unit 11 so that only the first energy storage device 2 is charged with the target input Pc1.

Specifically, the processing of STEP64 can be executed in the following way, for example. A target value for the output voltage of the inverter 17 (=the input voltage of the voltage converter 15) is set in accordance with the detected value of the rotational speed of the electric motor 100 or the like. In addition, the target input Pc1 is set as the target value for the output power from the voltage converter 15 to the first energy storage device 2.

Further, the inverter 17 is controlled so as to realize the target value for the output voltage of the inverter 17. Also, the voltage converter 15 is controlled so as to realize the target value for the output power from the voltage converter 15 to the first energy storage device 2.

Furthermore, the voltage converter 16 is controlled to be in current flow interruption state. Alternatively, the contactor 13 on the second energy storage device 3 side is controlled to be turned off. This prohibits discharging from the second energy storage device 3.

On the other hand, the determination result of STEP63 is negative within the shaded area or the top diagonally hatched area illustrated in FIG. 25. In this situation, in STEP65, the power transmission controller 41 controls the power transmission circuit unit 11 so that the first energy storage device 2 and the second energy storage device 3 are charged with the target inputs Pc1 and Pc2, respectively.

In this case, specific control of the power transmission circuit unit 11 can be performed in a manner similar to that in the processing of STEP54 in the first embodiment.

In this embodiment, the threshold values G_th1 and G_th2 are set so that the target input Pc1 of the first energy storage device 2 is kept less than or equal to a predetermined value.

In this embodiment, in the normal operating state, the control process for the power transmission controller 41 during the regenerative operation of the electric motor 100 is executed in the way described above.

The control process for the power transmission controller 41 during the regenerative operation is executed in the way described above, thereby allowing the first energy storage device 2 to be charged with a small amount of regenerative power less than or equal to the threshold value G_th2, except for the case where the regeneration demand G_dmd is greater than the threshold value G_th1. Since the amount of charging power used to charge the first energy storage device 2 is small, the first energy storage device 2 can be charged at a low charging rate (low rate). This allows the first energy storage device 2 to be charged while preventing the progression of deterioration of the first energy storage device 2 during the regenerative operation. Hence, the drivable range of the vehicle can be extended.

Next, a description will be given of a control process for the power transmission controller 41 during the regenerative operation of the electric motor 100 in the partial failure state of the first energy storage device 2.

In this embodiment, in the partial failure state of the first energy storage device 2, as in the first embodiment, the control process illustrated in the flowchart in FIG. 19 is executed. In this case, the process other than the control process for the regenerative operation in STEP104 is the same or substantially the same as that in the first embodiment.

During the regenerative operation of the electric motor 100, the control process for the regenerative operation is executed at intervals of a predetermined control process period in a way illustrated in a flowchart in FIG. 23. In this case, the processing of STEP121 to STEP123 is the same or substantially the same as that in the first embodiment.

In this embodiment, if the determination result of STEP122 is negative or after the execution of the processing of STEP123, the power transmission controller 41 executes the same or substantially the same processing as the processing in STEP62 in FIG. 24 and the subsequent processing. Accordingly, the power transmission circuit unit 11 is controlled by a control process similar to the control process illustrated in FIG. 24.

Figure 26:
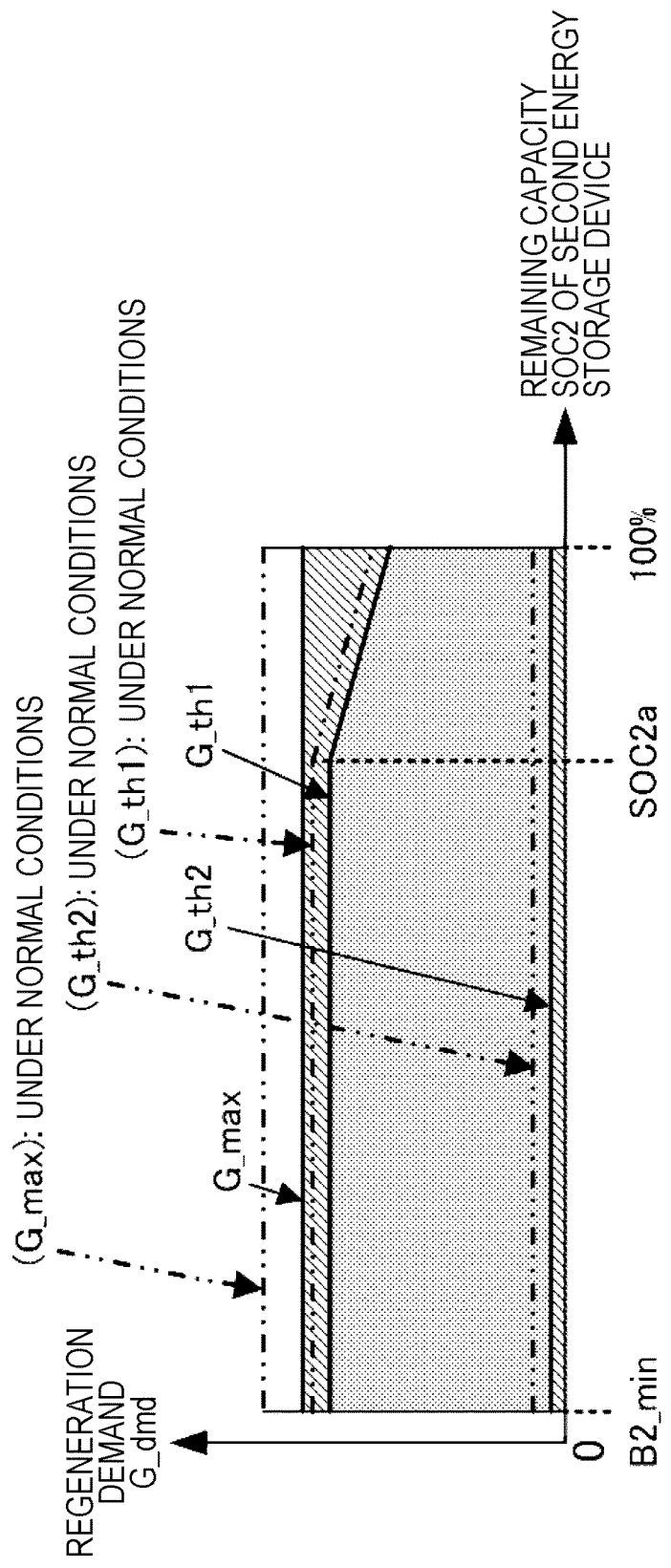
FIG. 26 illustrates a map for the process illustrated in FIG. 24 (or FIG. 27).

Note that a map illustrated in FIG. 26 instead of the map illustrated in FIG. 25 is used in the processing of STEP62 in FIG. 24. The map illustrated in FIG. 26 is a map in form similar to that of the map in FIG. 25 in the normal operating state. However, on the map illustrated in FIG. 26, the upper limit of the regenerative power input to the first energy storage device 2 is limited to a value smaller than that in the normal operating state. Thus, the maximum value G_max and the threshold values G_th1 and G_th2 regarding the regeneration demand G_dmd are different from those in the normal operating state.

Specifically, in FIG. 26, as in FIG. 25, the upper limit of the regenerative power input to the first energy storage device 2 is the value of the regenerative power corresponding to the total width of the diagonally hatched areas (the widths on the vertical axis) (=G_th2+(G_max−G_th1)) at the individual values of the second remaining capacity SOC2.

Note that, in FIG. 26, all the threshold values G_th1 and G_th2 and the maximum value G_max are smaller than those in the normal operating state, whereas the value given by (G_th1−G_th2) (which corresponds to the upper limit of the regenerative power input to the second energy storage device 3) is the same as that obtained in the normal operating state.

In FIG. 26, accordingly, in the partial failure state of the first energy storage device 2, the upper limit of the regenerative power input to the first energy storage device 2 is smaller than the upper limit in the normal operating state. In the partial failure state of the first energy storage device 2, furthermore, the upper limit of the regenerative power input to the second energy storage device 3 is the same as that in the normal operating state.

The process other than the processing of STEP62 is the same or substantially the same as the process performed when both the first energy storage device 2 and the second energy storage device 3 are in normal operation.

In this embodiment, the control process for the regenerative operation of the electric motor 100 in the partial failure state of the first energy storage device 2 is executed in the way described above.

Also in the second embodiment, during the regenerative operation of the electric motor 100 when the partial failure state of the first energy storage device 2 has occurred, both the first energy storage device 2 and the second energy storage device 3, or the second energy storage device 3 can be charged with regenerative power of the electric motor 100 during the regenerative operation so that the input of each normally operating energy storage unit 2a of the first energy storage device 2 and the input of the second energy storage device 3 do not excessively increase. Hence, advantages similar to those of the first embodiment can be achieved.

Thus, both the first energy storage device 2 and the second energy storage device 3, or the second energy storage device 3 can be charged with regenerative power of the electric motor 100 so that the progression of deterioration of each normally operating energy storage unit 2a of the first energy storage device 2 and the progression of deterioration of the second energy storage device 3 can be restrained as much as possible.

In addition, the control process for the regenerative operation in the partial failure state of the first energy storage device 2 can basically achieve advantages similar to the advantages described above for the control process during the regenerative operation in the normal operating state.

The correspondences between this embodiment and the present disclosure are the same as those for the first embodiment.

Third Embodiment

Next, a third embodiment of the present disclosure will be described with reference to FIG. 27. This embodiment is the same or substantially the same as the second embodiment, except for a control process performed during the regenerative operation of the electric motor 100. Thus, the same or substantially the same portions as those in the second embodiment are not described herein.

In this embodiment, the control process for the power transmission controller 41 during the regenerative operation of the electric motor 100 is executed at intervals of a predetermined control process period in a way illustrated in a flowchart in FIG. 27 when the first energy storage device 2 and the second energy storage device 3 are in normal operation.

Specifically, in STEP71, the power transmission controller 41 acquires a detected value of the second remaining capacity SOC2 and a regeneration demand G_dmd of the electric motor 100. The processing of STEP71 is the same or substantially the same as the processing of STEP51 in the first embodiment.

Then, in STEP72, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Note that the map used in this embodiment (how areas are separated by the threshold values G_th1 and G_th2) is the same or substantially the same as that in the second embodiment (illustrated in FIG. 25). In this embodiment, however, the energy storage device to be charged in the shaded area within which the regeneration demand G_dmd is greater than the threshold value G_th2 and is less than or equal to the threshold value G_th1 is different from that in the second embodiment.

In this embodiment, the shaded area illustrated in FIG. 25 is an area within which only the second energy storage device 3 is charged. When the combination of the detected value of the second remaining capacity SOC2 and the regeneration demand G_dmd falls within the shaded area illustrated in FIG. 25, the target input Pc1 of the first energy storage device 2 is set to zero and the regeneration demand G_dmd is set as the target input Pc2 of the second energy storage device 3.

In this embodiment, accordingly, the upper limit of the regenerative power input to the first energy storage device 2 in the normal operating state is the same as that in the second embodiment (in FIG. 25, the value of the regenerative power corresponding to the total width of the diagonally hatched areas (=G_th2+(G_max−G_th1)) at the individual values of the second remaining capacity SOC2), whereas the upper limit of the regenerative power input to the second energy storage device 3 is the value of the regenerative power corresponding to the width of an area obtained by combining the bottom diagonally hatched area and the shaded area in FIG. 25 (=G_th1).

The method of setting the target inputs Pc1 and Pc2 within the bottom diagonally hatched area and the top diagonally hatched area illustrated in FIG. 25 is the same or substantially the same as that in the second embodiment.

Then, in STEP73, the power transmission controller 41 determines whether or not the regeneration demand G_dmd is less than or equal to the threshold value G_th2.

The determination result of STEP73 is affirmative within the bottom diagonally hatched area illustrated in FIG. 25. In this situation, in STEP74, the power transmission controller 41 controls the power transmission circuit unit 11 so that only the first energy storage device 2 is charged with the target input Pc1.

In this case, specific control of the power transmission circuit unit 11 can be performed in a manner similar to that in the processing of STEP64 in the second embodiment.

On the other hand, if the determination result of STEP73 is negative, then, in STEP75, the power transmission controller 41 further determines whether or not the regeneration demand G_dmd is greater than the threshold value G_th1.

The determination result of STEP75 is affirmative within the top diagonally hatched area illustrated in FIG. 25. In this situation, in STEP76, the power transmission controller 41 controls the power transmission circuit unit 11 so that the first energy storage device 2 and the second energy storage device 3 are charged with the target inputs Pc1 and Pc2, respectively.

In this case, specific control of the power transmission circuit unit 11 can be performed in a manner similar to that in the processing of STEP54 in the first embodiment.

The determination result of STEP75 is negative within the shaded area illustrated in FIG. 25. In this case, in STEP77, the power transmission controller 41 controls the power transmission circuit unit 11 so that only the second energy storage device 3 is charged with the target input Pc2.

In this case, specific control of the power transmission circuit unit 11 can be performed in a manner similar to that in the processing of STEP55 in the first embodiment.

In this embodiment, in the normal operating state, the control process for the power transmission controller 41 during the regenerative operation of the electric motor 100 is executed in the way described above.

The control process for the power transmission controller 41 during the regenerative operation is executed in the way described above, thereby allowing, when the regeneration demand G_dmd is a small regenerative value less than or equal to the threshold value G_th2, the first energy storage device 2 to be charged with the small regenerative value. In this case, as in the second embodiment, the first energy storage device 2 can be charged slowly at a low charging rate. This allows the first energy storage device 2 to be charged while preventing the progression of deterioration of the first energy storage device 2. Hence, the drivable range of the vehicle can be extended.

When the regeneration demand G_dmd is greater than the threshold value G_th2, only the second energy storage device 3 is charged with regenerative power corresponding to the regeneration demand G_dmd so long as the threshold value G_th1 is not exceeded. In this case, even if the second energy storage device 3 is not charged at a low charging rate, deterioration of the second energy storage device 3 is less likely to progress. This can facilitate rapid charging of the second energy storage device 3. Thus, the power transmission circuit unit 11 can be controlled with high stability during the regenerative operation.

Next, a description will be given of a control process for the power transmission controller 41 during the regenerative operation of the electric motor 100 in the partial failure state of the first energy storage device 2.

In this embodiment, as in the first embodiment, the control process illustrated in the flowchart in FIG. 19 is executed in the partial failure state of the first energy storage device 2. In this case, the process other than the control process for the regenerative operation in STEP104 is the same or substantially the same as that in the first embodiment.

During the regenerative operation of the electric motor 100, the control process for the regenerative operation is executed at intervals of a predetermined control process period in a way illustrated in a flowchart in FIG. 23. In this case, the processing of STEP121 to STEP123 is the same or substantially the same as that in the first embodiment.

In this embodiment, if the determination result of STEP122 is negative or after the execution of the processing of STEP123, the power transmission controller 41 executes the same or substantially the same processing as the processing in STEP72 in FIG. 27 and the subsequent processing. Accordingly, the power transmission circuit unit 11 is controlled by a control process similar to the control process illustrated in FIG. 27.

Note that the map illustrated in FIG. 26 instead of the map illustrated in FIG. 25 is used in the processing of STEP72 in FIG. 27. The map illustrated in FIG. 26 is the same as the map in the partial failure state of the first energy storage device 2 in the second embodiment. On this map, as in the normal operating state, the shaded area in FIG. 26 represents an area within which only the second energy storage device 3 is charged with regenerative power.

Accordingly, in the partial failure state of the first energy storage device 2, as in the second embodiment, the upper limit of the regenerative power input to the first energy storage device 2 is an upper limit smaller than that in the normal operating state (in FIG. 26, (G_th2+(G_max−G_th1))). In the partial failure state of the first energy storage device 2, furthermore, the upper limit of the regenerative power input to the second energy storage device 3 is an upper limit smaller than that in the normal operating state (in FIG. 26, G_th1).

In this embodiment, the control process for the regenerative operation of the electric motor 100 in the partial failure state of the first energy storage device 2 is executed in the way described above.

Also in the third embodiment, during the regenerative operation of the electric motor 100 when the partial failure state of the first energy storage device 2 has occurred, both the first energy storage device 2 and the second energy storage device 3, or the second energy storage device 3 can be charged with regenerative power of the electric motor 100 during the regenerative operation so that the input of each normally operating energy storage unit 2a of the first energy storage device 2 and the input of the second energy storage device 3 do not excessively increase. Hence, advantages similar to those of the first embodiment can be achieved.

Thus, both the first energy storage device 2 and the second energy storage device 3, or the second energy storage device 3 can be charged with regenerative power of the electric motor 100 so that the progression of deterioration of each normally operating energy storage unit 2a of the first energy storage device 2 and the progression of deterioration of the second energy storage device 3 can be restrained as much as possible.

In addition, the control process for the regenerative operation in the partial failure state of the first energy storage device 2 can basically achieve advantages similar to the advantages described above for the control process during the regenerative operation in the normal operating state.

The correspondences between this embodiment and the present disclosure are the same as those for the first embodiment.

Modifications

There will now be described some modifications which may be made to the first to third embodiments described above.

In the embodiments described above, the first energy storage device 2 can be charged with the regenerative power during the regenerative operation of the electric motor 100. However, only the second energy storage device 3 may be charged with the regenerative power without the first energy storage device 2 being charged with the regenerative power.

In this case, the control process for the power transmission circuit unit 11 during the regenerative operation of the electric motor 100 may be performed in the same way in the normal operating state and the partial failure state. In this case, furthermore, the first energy storage device 2 may be implemented as a non-rechargeable energy storage device such as a fuel cell or an air battery.

In the embodiments described above, the base supplied power P1_base during the power-running operation of the electric motor 100 is the same in the normal operating state and the partial failure state. Alternatively, the base supplied power P1_base in the partial failure state may be smaller than that in the normal operating state.

In addition, for example, the mode of the control process when both the first energy storage device 2 and the second energy storage device 3 are in normal operation may be made switchable among a plurality of control modes to perform the control process for the power transmission circuit unit 11 during the power-running operation or regenerative operation of the electric motor 100 in a different manner for each control mode.

For example, the control process for the power transmission circuit unit 11 may be made executable with an upper limit (the threshold value B2_th1) within a range of the second remaining capacity SOC2 that allows execution of a control process for, while outputting the base supplied power P1_base from the first energy storage device 2 during the power-running operation of the electric motor 100, supplying part of the base supplied power P1_base to charge the second energy storage device 3, or may be made executable in a plurality of control modes with different base supplied powers P1_base.

In the embodiments described above, furthermore, the extended-stop control process is executed in the normal operating state. However, the extended-stop control process may be omitted. Alternatively, a process similar to the extended-stop control process may also be executed in the partial failure state of the first energy storage device 2.

In the embodiments described above, furthermore, the driving force demand DT_dmd of the electric motor 100 is used as the request value when power is to be supplied to the electric motor 100 (electric load) (during the power-running operation). Alternatively, for example, the amount of energy to be supplied to the electric motor 100 per unit time in response to the driving force demand DT_dmd or a request value for the current flowing through the electric motor 100 (a request value for the amount of charge per unit time) which corresponds to the driving force demand DT_dmd can be used as a request value of the electric motor 100 (electric load).

In the embodiments described above, furthermore, the regeneration demand G_dmd of the electric motor 100 is used as a request value for the output of regenerative power from the electric motor 100 (electric load) (during the regenerative operation). Alternatively, for example, a braking force demand during the regenerative operation of the electric motor 100 or a request value for the current flowing through the electric motor 100 which corresponds to the braking force demand may be used as a request value of the electric motor 100.

In the embodiments described above, furthermore, the electric load is the electric motor 100, by way of example but not limited. The electric load may be an electric actuator other than the electric motor 100, or may be an electrical device that does not output any mechanical power.

In addition, a transportation device in which the power supply system 1 is mounted is not limited to an electrically driven vehicle. The transportation device may be a hybrid vehicle, for example, or may be a ship, a railway vehicle, or any other device.

A power supply system according to an aspect of the present disclosure includes a first energy storage device including a plurality of energy storage units connected in parallel, a second energy storage device, a power transmission circuit unit, and a control device (a first aspect of the present disclosure). The power transmission circuit unit is disposed in a power transmission path among an electric load, the first energy storage device, and the second energy storage device, the electric load being activated upon being supplied with power from at least one of the first energy storage device and the second energy storage device. The power transmission circuit unit is configured to be capable of controlling power transmission among the electric load, the first energy storage device, and the second energy storage device in accordance with a control signal provided to the power transmission circuit unit. The control device is configured to have a function of controlling the power transmission circuit unit. The control device is configured to acquire a request value and failure detection information. The request value is at least one of a request value of the electric load which specifies an amount of power supplied to the electric load when power is to be supplied from at least one of the first energy storage device and the second energy storage device to the electric load and a request value of the electric load which specifies an amount of regenerative power output from the electric load when regenerative power is to be supplied from the electric load to charge at least one of the first energy storage device and the second energy storage device. The failure detection information indicates whether or not there has been a failure in each of the plurality of energy storage units of the first energy storage device. The control device is configured to have a function of executing a power transmission control process for controlling the power transmission circuit unit to perform power transmission between the electric load and at least one of the first energy storage device and the second energy storage device in accordance with the request value of the electric load in a normal operating state and a partial failure state. The normal operating state is a state where none of the plurality of energy storage units of the first energy storage device has failed. The partial failure state is a state where at least one of the plurality of energy storage units of the first energy storage device has failed. The control device is configured such that shares allocated to an output or input of the first energy storage device and an output or input of the second energy storage device in accordance with the request value of the electric load are changed between the power transmission control process for the normal operating state and the power transmission control process for the partial failure state.

Certain terms as used herein will be briefly explained below. The phrase "the power transmission circuit unit is capable of controlling power transmission among the electric load, the first energy storage device, and the second energy storage device" refers to that the power transmission circuit unit at least has a function of being capable of controlling the power supplied from each of the first energy storage device and the second energy storage device to the electric load or, in addition to this function, a function of being capable of providing selective switching control of the source and destination of power supply among the electric load, the first energy storage device, and the second energy storage device and controlling the power supplied from the source to the destination. In this case, if the electric load is an electric load capable of outputting regenerative power while no power is supplied to the electric load, the electric load may be the source of supply of power (regenerative power) and one or both of the first energy storage device and the second energy storage device may be the destination (the target to be charged with regenerative power).

The "power supplied" or "supplied power" refers to an "amount of electricity" output from the source of power or supplied to the destination of power. The "amount of electricity" is expressed as an amount of electrical energy per unit time (e.g., a value of (electric) power) or an amount of charge per unit time (e.g., a value of current), for example.

The "request value of the electric load which specifies an amount of power supplied to the electric load" refers to a request value regarding the state of activation of the electric load when power is to be supplied to the electric load, the request value being correlated with the power supplied to the electric load in such a manner that the power supplied to the electric load monotonically increases or decreases in accordance with an increase or decrease in the request value. Examples of the request value include a request value for the power supplied to the electric load. For example, if the electric load is designed to generate a mechanical output (dynamic or kinetic energy) corresponding to the supplied power, a request value for the mechanical output may be used as the request value.

The "request value of the electric load which specifies an amount of regenerative power output from the electric load" refers to a request value regarding the state of activation of the electric load when regenerative power is to be output from the electric load, the request value being correlated with the regenerative power in such a manner that the amplitude of the regenerative power monotonically increases or decreases in accordance with an increase or decrease in the request value. Examples of the request value include a request value for an amount of electricity output from the electric load during a regenerative operation (e.g., a request value for the regenerative power). For example, if the electric load is an electric load (e.g., an electric motor) that generates a braking force corresponding to the regenerative power to be output, a request value for the braking force may be used as the request value.

The "output" of each of the first energy storage device and the second energy storage device refers to an amount of electricity discharged from each of the first energy storage device and the second energy storage device (that is, an amount of discharge power), and the "input" of each of the first energy storage device and the second energy storage device refers to an amount of electricity used to charge each of the first energy storage device and the second energy storage device (that is, an amount of charging power).

Based on the terms defined above, exemplary embodiments of the present disclosure will now be described.

According to the first aspect of the present disclosure, the control device causes shares allocated to an output or input of the first energy storage device and an output or input of the second energy storage device in accordance with the request value of the electric load to be changed between the power transmission control process for the normal operating state of the first energy storage device and the power transmission control process for the partial failure state of the first energy storage device.

The term "share" refers to, when power is to be supplied to the electric load, to which target value an output of each of the first energy storage device and the second energy storage device is controlled in accordance with the request value of the electric load. The term "share" further refers to, when regenerative power is to be output from the electric load, to which target value each of an input of the first energy storage device and the second energy storage device is controlled in accordance with the request value of the electric load.

According to the first aspect of the present disclosure, when power is to be supplied to the electric load or when regenerative power is to be output from the electric load, the respective output or input of the first energy storage device and the second energy storage device can be controlled in accordance with shares suitable for each of the normal operating state and the partial failure state.

According to the first aspect of the present disclosure, therefore, in a power supply system that includes two energy storage devices including a first energy storage device having a plurality of energy storage units connected in parallel, if some of the energy storage units of the first energy storage device have failed, it may be possible to accurately supply power to an electric load by using the remaining normally operating energy storage units of the first energy storage device or to accurately charge the normally operating energy storage units with regenerative power.

In the first aspect of the present disclosure, the first energy storage device and the second energy storage device may be energy storage devices having different characteristics. In this case, preferably, for example, the first energy storage device is an energy storage device having a higher energy density and a lower power density than the second energy storage device (a second aspect of the present disclosure).

Accordingly, a combination of the first energy storage device and the second energy storage device can realize an energy source with both increased power density and energy density, which is difficult to realize with a single type of energy storage device.

Since the first energy storage device has a relatively high energy density, in the partial failure state, as well as in the normal operating state, power can be continuously supplied to the electric load for as long a period as possible by using power (which is not a small amount of power) stored in the remaining normally operating energy storage units.

Since the second energy storage device has a relatively high power density, even if the request value of the electric load changes over a comparatively large range during power supply to the electric load, the supplied power corresponding to the request value can be supplied to the electric load with high responsivity.

The "supplied power corresponding to the request value" during power supply to an electric load refers to a supplied power to be supplied to the electric load to meet the request value.

In the first or second aspect of the present disclosure, preferably, the control device is configured to execute the power transmission control process for the partial failure state in such a manner that the share allocated to the output or input of the first energy storage device in accordance with the request value of the electric load is smaller than in the power transmission control process for the normal operating state (a third aspect of the present disclosure).

According to this configuration, in the partial failure state of the first energy storage device, the power transmission control process can be executed so that the output or input of the first energy storage device can be reduced to a minimum compared with the normal operating state, or the power transmission control process can be executed so that the frequency with which the first energy storage device is discharged (to supply power to the electric load or the like) or the first energy storage device is charged with regenerative power is reduced to a minimum compared with the normal operating state.

Thus, a reduction in the remaining capacity of the first energy storage device in the partial failure state can be delayed as much as possible, resulting in a period over which power can be supplied from the first energy storage device to the electric load being extended as long as possible, or the progression of deterioration of normally operating energy storage units of the first energy storage device in the partial failure state can be restrained as much as possible.

In the first to third aspects of the present disclosure, more specifically, the control device may be configured to execute the power transmission control process so that, in the partial failure state, a first upper limit that is an upper limit of the output or input of the first energy storage device in the power transmission control process is limited to a value smaller than in the normal operating state (a fourth aspect of the present disclosure).

According to this configuration, if the first upper limit to be limited is an upper limit of the output of the first energy storage device, limiting the upper limit of the output of the first energy storage device in the partial failure state of the first energy storage device can prevent excessive increase of the output of each normally operating energy storage unit of the first energy storage device when power is supplied to the electric load.

If the first upper limit to be limited is an upper limit of the input of the first energy storage device, limiting the upper limit of the input of the first energy storage device in the partial failure state of the first energy storage device can prevent excessive increase of the input of each normally operating energy storage unit of the first energy storage device when the electric load outputs regenerative power.

Accordingly, if the first upper limit to be limited is an upper limit of the output of the first energy storage device, in the partial failure state of the first energy storage device, a reduction in the remaining capacity of each normally operating energy storage unit of the first energy storage device can be delayed as much as possible. Therefore, power can be supplied to the electric load for as long a period as possible.

In addition, in a case where the first upper limit to be limited is either an upper limit of the output of the first energy storage device or an upper limit of the input of the first energy storage device, in the partial failure state of the first energy storage device, the progression of deterioration of each normally operating energy storage unit of the first energy storage device can be restrained.

In particular, when the first energy storage device is an energy storage device having a relatively high energy density, as the value of the input or output of the first energy storage device per unit time increases, the degree of influence on deterioration of the first energy storage device increases at an accelerated rate. According to the fourth aspect of the present disclosure, therefore, the advantages described above for the delayed reduction in the remaining capacity of each normally operating energy storage unit of the first energy storage device or the progression of deterioration of each normally operating energy storage unit of the first energy storage device can be increased.

In the fourth aspect of the present disclosure, preferably, the control device is configured to have a function of changing the first upper limit in accordance with the number of failed energy storage units among the plurality of energy storage units of the first energy storage device so that, in the partial failure state, the first upper limit in the power transmission control process decreases as the number of failed energy storage units increases (a fifth aspect of the present disclosure).

According to this configuration, in the power transmission control process in the partial failure state of the first energy storage device, the first upper limit changes in the manner described above in accordance with the number of failed energy storage units of the first energy storage device. This can appropriately prevent the output or input of each normally operating energy storage unit of the first energy storage device from excessively increasing regardless of the number of failed energy storage units of the first energy storage device (in other words, regardless of the number of normally operating energy storage units of the first energy storage device).

Thus, the advantages described above with reference to the fourth aspect of the present disclosure can be suitably achieved regardless of the number of failed energy storage units of the first energy storage device.

In the power transmission control process in the partial failure state of the first energy storage device, furthermore, an upper limit of the output or input of each energy storage unit of the first energy storage device can be prevented from being limited to a value that is small excessively more than necessary compared with the normal operating state. Thus, in the partial failure state of the first energy storage device, the share allocated to the output or input of the second energy storage device with respect to the request value of the electric load can be prevented as much as possible from excessively increasing compared with the normal operating state. Therefore, the progression of deterioration of the second energy storage device can be restrained.

In the first to fifth aspects of the present disclosure, the control device may be configured to execute the power transmission control process so that, in the partial failure state, a second upper limit that is an upper limit of a supplied power supplied to the electric load or an upper limit of a regenerative power output from the electric load is limited to a value smaller than in the normal operating state (a sixth aspect of the present disclosure).

According to this configuration, if the second upper limit to be limited is an upper limit of the supplied power supplied to the electric load, when power is to be supplied to the electric load in the partial failure state of the first energy storage device, the upper limit of the total output of the first energy storage device and the second energy storage device is limited to a value smaller than that in the normal operating state.

Thus, in a situation where power is supplied from both the first energy storage device and the second energy storage device to the electric load in the partial failure state of the first energy storage device, power supply to the electric load is shared between the first energy storage device and the second energy storage device so that excessive increase of any one of the output of each normally operating energy storage unit of the first energy storage device and the output of the second energy storage device can be prevented.

If the second upper limit to be limited is an upper limit of the regenerative power output from the electric load, when regenerative power is to be output from the electric load in the partial failure state of the first energy storage device, the upper limit of the total input of the first energy storage device and the second energy storage device is limited to a value smaller than that in the normal operating state.

Thus, in a situation where both the first energy storage device and the second energy storage device are charged with regenerative power in the partial failure state of the first energy storage device, charging of regenerative power of the electric load is shared between the first energy storage device and the second energy storage device so that excessive increase of any one of the input of each normally operating energy storage unit of the first energy storage device and the input of the second energy storage device can be prevented.

Accordingly, if the second upper limit to be limited is an upper limit of the supplied power supplied to the electric load, in the partial failure state of the first energy storage device, a reduction in the total remaining capacity of the first energy storage device and the second energy storage device can be delayed as much as possible. Therefore, power can be supplied to the electric load for as long a period as possible.

In addition, in a case where the second upper limit to be limited is either an upper limit of the supplied power supplied to the electric load or an upper limit of the regenerative power output from the electric load, in the partial failure state of the first energy storage device, the progression of deterioration of each normally operating energy storage unit of the first energy storage device and the progression of deterioration of the second energy storage device can be restrained.

In particular, combining the sixth aspect of the present disclosure with any of the second to fifth aspects of the present disclosure can increase, in the partial failure state of the first energy storage device, the advantage of extending a period over which power can be supplied to the electric load as long as possible, restraining the progression of deterioration of each normally operating energy storage unit of the first energy storage device, or restraining the progression of deterioration of the second energy storage device.

In the sixth aspect of the present disclosure, preferably, the control device is configured to have a function of changing the second upper limit in accordance with the number of failed energy storage units among the plurality of energy storage units of the first energy storage device so that, in the partial failure state, the second upper limit in the power transmission control process decreases as the number of failed energy storage units increases (a seventh aspect of the present disclosure).

According to this configuration, in the power transmission control process in the partial failure state of the first energy storage device, the second upper limit changes in the manner described above in accordance with the number of failed energy storage units of the first energy storage device.

Thus, if the second upper limit to be limited is an upper limit of the supplied power supplied to the electric load, it is suitably achievable that, when power is to be supplied to the electric load in the partial failure state of the first energy storage device, power supply to the electric load is shared between the first energy storage device and the second energy storage device so that excessive increase of any one of the output of each normally operating energy storage unit of the first energy storage device and the output of the second energy storage device can be prevented, regardless of the number of failed energy storage units of the first energy storage device (in other words, regardless of the number of normally operating energy storage units of the first energy storage device).

In addition, in a case where the second upper limit to be limited is either an upper limit of the supplied power supplied to the electric load or an upper limit of the regenerative power output from the electric load, it is suitably achievable that, when regenerative power is output from electric load in the partial failure state of the first energy storage device, charging of regenerative power of the electric load is shared between the first energy storage device and the second energy storage device so that excessive increase of any one of the input of each normally operating energy storage unit of the first energy storage device and the input of the second energy storage device can be prevented, regardless of the number of failed energy storage units of the first energy storage device (in other words, regardless of the number of normally operating energy storage units of the first energy storage device).

In the first to seventh aspects of the present disclosure, preferably, the power transmission control process includes a first power supply process for controlling the power transmission circuit unit to supply power from the first energy storage device to the electric load while charging the second energy storage device with power supplied from the first energy storage device when a condition that the request value when power is to be supplied to the electric load is smaller than a predetermined A-th threshold value and the second energy storage device has a remaining capacity smaller than a predetermined first threshold value holds, and a second power supply process for controlling the power transmission circuit unit to supply power from at least one of the first energy storage device and the second energy storage device to the electric load without charging the second energy storage device when the condition does not hold. Preferably, the control device is configured to selectively execute the first power supply process and the second power supply process in such a manner that a rate of decrease in D2 with respect to D1 is lower than a rate of decrease in D4 with respect to D3, where D1 is defined as an upper limit of the output of the first energy storage device in the first power supply process in the normal operating state, D2 is defined as an upper limit of the output of the first energy storage device in the first power supply process in the partial failure state, D3 is defined as an upper limit of the output of the first energy storage device in the second power supply process in the normal operating state, and D4 is defined as an upper limit of the output of the first energy storage device in the second power supply process in the partial failure state (an eighth aspect of the present disclosure).

According to this configuration, if the condition described above holds when power is to be supplied to the electric load, in either the normal operating state or partial failure state of the first energy storage device, the first power supply process is performed to supply power from the first energy storage device to the electric load while supplying power from the first energy storage device to charge the second energy storage device.

If the condition described above does not hold, in either the normal operating state or partial failure state of the first energy storage device, the second power supply process is performed to supply power from at least one of the first energy storage device and the second energy storage device to the electric load without charging the second energy storage device.

Thus, the remaining capacity of the second energy storage device is likely to be kept within a remaining-capacity area less than or equal to the first threshold value and comparatively close to the first threshold value.

Then, the first power supply process and the second power supply process are selectively executed in such a manner that, with regard to the upper limits D1, D2, D3, and D4 of the output of the first energy storage device defined as described above, the rate of decrease in D2 with respect to D1 is lower than the rate of decrease in D4 with respect to D3.

Thus, the first power supply process for supplying power from the first energy storage device to charge the second energy storage device is executed so that, in the partial failure state of the first energy storage device, the charging power used to charge the second energy storage device is not much reduced compared with the normal operating state or is kept at the same charging power as that in the normal operating state. In this case, the first power supply process is executed with the request value being set to a comparatively small value that is smaller than the A-th threshold value. Hence, even in the partial failure state of the first energy storage device, the charging power supplied from the first energy storage device to charge the second energy storage device can be kept substantially the same as that in the normal operating state.

According to the eighth aspect of the present disclosure, when power is to be supplied to the electric load, as described above, the first power supply process and the second power supply process are selectively executed in accordance with whether or not the condition described above holds. Hence, in either the normal operating state or partial failure state of the first energy storage device, the remaining capacity of the second energy storage device can be kept as much as possible within a remaining-capacity area less than or equal to the first threshold value and comparatively 1

Thus, even when the first energy storage device enters the partial failure state, it is ensured as much as possible that a comparatively large supplied power can be supplied from the second energy storage device to the electric load when power is to be supplied to the electric load. Consequently, even when the first energy storage device enters the partial failure state, unexpected termination of the supply of the supplied power corresponding to the request value to the electric load is avoidable. Thus, power can be supplied to the electric load for as long a period as possible.

In addition, since the remaining capacity of the second energy storage device can be kept as much as possible within a remaining-capacity area less than or equal to the first threshold value and comparatively close to the first threshold value, the remaining capacity of the second energy storage device can be kept as much as possible within an approximately medium remaining-capacity area within which the progression of deterioration is most suppressed. Hence, in particular, when the second energy storage device is an energy storage device having a relatively high power density, the progression of deterioration of the second energy storage device can be restrained as much as possible in either the normal operating state or partial failure state of the first energy storage device.

In the eighth aspect of the present disclosure, the control device may be configured to execute the first power supply process so as not to cause a change in the output of the first energy storage device due to a transition of a state of the first energy storage device from the normal operating state to the partial failure state during execution of the first power supply process (a ninth aspect of the present disclosure).

According to this configuration, even if the state of the first energy storage device changes from the normal operating state to the partial failure state during execution of the first power supply process, the second energy storage device can be charged with power from the first energy storage device in the same or substantially the same manner as that in the normal operating state. Hence, even if the state of the first energy storage device changes from the normal operating state to the partial failure state, the remaining capacity of the second energy storage device can be kept as much as possible within a remaining-capacity area less than or equal to the first threshold value and comparatively close to the first threshold value, with high stability.

In the eighth aspect of the present disclosure or ninth aspect of the present disclosure, the first energy storage device may be an energy storage device having a lower resistance to deterioration due to changes in the input or output of the first energy storage device than the second energy storage device. In this case, preferably, the control device is configured to execute the first power supply process in such a manner that a sensitivity of a change in the output of the first energy storage device to a change in the request value of the electric load in the first power supply process is relatively lower than a sensitivity of a change in the input of the second energy storage device to a change in the request value of the electric load in the first power supply process (a tenth aspect of the present disclosure).

The phrase "the first energy storage device has a lower resistance to deterioration due to changes in the input or output of the first energy storage device than the second energy storage device" refers to that deterioration of the first energy storage device is more likely to progress than that of the second energy storage device (in other words, deterioration of the second energy storage device is less likely to progress than that of the first energy storage device) as a result of comparison between the degree of progression of deterioration of the first energy storage device when the input or output of the first energy storage device frequently changes and the degree of progression of deterioration of the second energy storage device when the input or output of the second energy storage device frequently changes.

According to the tenth aspect of the present disclosure, even if the request value of the electric load frequently changes during execution of the first power supply process, the output of the first energy storage device is less likely to change. Hence, the progression of deterioration of the first energy storage device can be restrained.

In the tenth aspect of the present disclosure, for example, the following configuration may be used. The control device may be configured to control the power transmission circuit unit to, in the first power supply process, output from the first energy storage device a base supplied power set regardless of the request value of the electric load, in such a manner as to supply a supplied power that is a portion of the base supplied power corresponding to the request value of the electric load to the electric load and as to charge the second energy storage device with a supplied power equal to a difference obtained by subtracting the supplied power that is a portion of the base supplied power corresponding to the request value of the electric load from the base supplied power (an eleventh aspect of the present disclosure).

According to this configuration, in the first power supply process, the base supplied power, which is a supplied power to be output from the first energy storage device, is not set as a function value of the request value, and thus is not or less likely to be affected by changes in the request value. This can ensure the stability of the output of the first energy storage device during execution of the first power supply process. Thus, the progression of deterioration of the first energy storage device can be restrained.

Furthermore, a supplied power that is a portion of the base supplied power corresponding to the request value is supplied to the electric load and a supplied power equal to a difference obtained by subtracting the supplied power that is a portion of the base supplied power corresponding to the request value from the base supplied power is used to charge the second energy storage device. This allows the first energy storage device to supply power to charge the second energy storage device while supplying the supplied power corresponding to the request value to the electric load.

In this case, the input of the second energy storage device (the amount of charging power) changes in response to a change in the request value. However, the second energy storage device has a relatively high resistance to deterioration due to changes in the input or output of the second energy storage device. Thus, deterioration of the second energy storage device is less likely to progress.

In the eleventh aspect of the present disclosure, the first power supply process is executed under a condition that the supplied power corresponding to the request value is less than the base supplied power. The base supplied power corresponds to an upper limit of the output of the first energy storage device in the first power supply process.

In the eleventh aspect of the present disclosure, preferably, the control device is configured to have a function of setting the base supplied power to be variable in accordance with the remaining capacity of the second energy storage device so that the base supplied power decreases as the remaining capacity of the second energy storage device approaches the first threshold value (a twelfth aspect of the present disclosure).

According to this configuration, the first power supply process for charging the second energy storage device is less likely to be executed as the remaining capacity of the second energy storage device, which is in a range less than the first threshold value, approaches the first threshold value. This prevents the remaining capacity of the second energy storage device from increasing beyond the first threshold value.

In addition, as the remaining capacity of the second energy storage device, which is in a range less than the first threshold value, moves away from the first threshold value, the first power supply process for charging the second energy storage device is more likely to be executed and the amount of power used to charge the second energy storage device is more likely to increase. This facilitates the recovery of the remaining capacity of the second energy storage device to the first threshold value.

According to the twelfth aspect of the present disclosure, therefore, the realization of keeping as much as possible the remaining capacity of the second energy storage device within a remaining-capacity area less than or equal to the first threshold value and comparatively close to the first threshold value can be effectively increased.

In the first to twelfth aspects of the present disclosure described above, the electric load may be, for example, an electric motor (a thirteenth aspect of the present disclosure).

In the thirteenth aspect of the present disclosure, preferably, the power transmission circuit unit includes a voltage converter that converts an output voltage of at least one of the first energy storage device and the second energy storage device to produce a voltage and that outputs the produced voltage, and an inverter that converts a direct-current power input from the first energy storage device, the second energy storage device, or the voltage converter into an alternating-current power and that supplies the alternating-current power to the electric motor (a fourteenth aspect of the present disclosure).

According to this configuration, it may be possible to appropriately control power transmission among an electric motor serving as the electric load, the first energy storage device, and the second energy storage device.

Further, a transportation device according to another aspect of the present disclosure includes the power supply system according to the first to fourteenth aspects of the present disclosure (a fifteenth aspect of the present disclosure). This transportation device is implementable as a transportation device that achieves the advantages described above with reference to the first to fourteenth aspects of the present disclosure.

Further, a power transmission method according to still another aspect of the present disclosure is a method for performing power transmission among an electric load, a first energy storage device, and a second energy storage device in a power supply system, the power supply system including the first energy storage device and the second energy storage device, the first energy storage device including a plurality of energy storage units connected in parallel, the power supply system being configured to supply power from at least one of the first energy storage device and the second energy storage device to the electric load. The power transmission method includes a first step of acquiring a request value and failure detection information, the request value being at least one of a request value of the electric load which specifies an amount of power supplied to the electric load when power is to be supplied from at least one of the first energy storage device and the second energy storage device to the electric load and a request value of the electric load which specifies an amount of regenerative power output from the electric load when regenerative power is to be supplied from the electric load to charge at least one of the first energy storage device and the second energy storage device, the failure detection information indicating whether or not there has been a failure in each of the plurality of energy storage units of the first energy storage device; and a second step of performing power transmission between the electric load and at least one of the first energy storage device and the second energy storage device in accordance with the request value of the electric load in a normal operating state and a partial failure state, the normal operating state being a state where none of the plurality of energy storage units of the first energy storage device has failed, the partial failure state being a state where at least one of the plurality of energy storage units of the first energy storage device has failed, wherein in the second step, the power transmission is performed in such a manner that shares allocated to an output or input of the first energy storage device and an output or input of the second energy storage device in accordance with the request value of the electric load are changed between the normal operating state and the partial failure state (a sixteenth aspect of the present disclosure).

According to this configuration, as in the first aspect of the present disclosure, in a power supply system that includes two energy storage devices including a first energy storage device having a plurality of energy storage units connected in parallel, if some of the energy storage units of the first energy storage device have failed, it may be possible to accurately supply power to an electric load by using the remaining normally operating energy storage units of the first energy storage device or to accurately charge the normally operating energy storage units with regenerative power.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system comprising:
a first energy storage to supply electric power to an electric load and to be charged by the electric load, the first energy storage including a plurality of energy storage units connected to each other in parallel;
a second energy storage to supply electric power to the electric load and to be charged by the electric load;
a power transmission circuit via which the electric load is connected to the first energy storage and to the second energy storage;
circuitry configured to
acquire at least one of a request supply amount of electric power to be supplied to the electric load and a request output amount of regenerative electric power output from the electric load;

acquire failure detection information indicating whether there is a failure in each of the plurality of energy storage units of the first energy storage;
control the power transmission circuit to control electric power transmission among the electric load and at least one of the first energy storage and the second energy storage in accordance with the at least one of the request supply amount and the request output amount such that a ratio of an amount of electric power supplied from or to the first energy storage and an amount of electric power supplied from or to the second energy storage is to be a first ratio in a normal operating state in which no failure is detected in all of the plurality of energy storage units of the first energy storage based on the failure detection information; and
control the power transmission circuit to control the electric power transmission in accordance with the at least one of the request supply amount and the request output amount such that the ratio is to be a second ratio which is different from the first ration in a partial failure state in which at least one failure is detected in the plurality of energy storage units of the first energy storage based on the failure detection information.

2. The power supply system according to claim 1, wherein the first energy storage is an energy storage device having a higher energy density and a lower power density than the second energy storage.

3. The power supply system according to claim 1, wherein the circuitry is configured to execute a power transmission control process for the partial failure state in such a manner that a share allocated to an output or input of the first energy storage in accordance with the at least one of the request supply amount and the request output amount is smaller than in the power transmission control process for the normal operating state.

4. The power supply system according to claim 1, wherein the circuitry is configured to execute a power transmission control process so that, in the partial failure state, a first upper limit that is an upper limit of an output or input of the first energy storage in the power transmission control process is limited to a value smaller than in the normal operating state.

5. The power supply system according to claim 4, wherein the circuitry is configured to have a function of changing the first upper limit in accordance with a total number of failed energy storage units among the plurality of energy storage units of the first energy storage so that, in the partial failure state, the first upper limit in the power transmission control process decreases as the total number of failed energy storage units increases.

6. The power supply system according to claim 1, wherein the circuitry is configured to execute a power transmission control process so that, in the partial failure state, a second upper limit that is an upper limit of a supplied power supplied to the electric load or an upper limit of a regenerative power output from the electric load is limited to a value smaller than in the normal operating state.

7. The power supply system according to claim 6, wherein the circuitry is configured to have a function of changing the second upper limit in accordance with a total number of failed energy storage units among the plurality of energy storage units of the first energy storage so that, in the partial failure state, the second upper limit in the power transmission control process decreases as the total number of failed energy storage units increases.

8. The power supply system according to claim 1, wherein a power transmission control process includes
a first power supply process for controlling the power transmission circuit to supply power from the first energy storage to the electric load while charging the second energy storage with power supplied from the first energy storage when a condition that the at least one of the request supply amount and the request output amount when power is to be supplied to the electric load is smaller than a predetermined A-th threshold value and the second energy storage has a remaining capacity smaller than a predetermined first threshold value holds, and
a second power supply process for controlling the power transmission circuit to supply power from at least one of the first energy storage and the second energy storage to the electric load without charging the second energy storage when the condition does not hold, and
wherein the circuitry is configured to selectively execute the first power supply process and the second power supply process in such a manner that a rate of decrease in D2 with respect to D1 is lower than a rate of decrease in D4 with respect to D3, where
D1 is defined as an upper limit of an output of the first energy storage in the first power supply process in the normal operating state,
D2 is defined as an upper limit of the output of the first energy storage in the first power supply process in the partial failure state,
D3 is defined as an upper limit of the output of the first energy storage in the second power supply process in the normal operating state, and
D4 is defined as an upper limit of the output of the first energy storage in the second power supply process in the partial failure state.

9. The power supply system according to claim 8, wherein the circuitry is configured to execute the first power supply process so as not to cause a change in the output of the first energy storage due to a transition of a state of the first energy storage from the normal operating state to the partial failure state during execution of the first power supply process.

10. The power supply system according to claim 8, wherein the first energy storage is an energy storage device having a lower resistance to deterioration due to changes in an input or output of the first energy storage than the second energy storage, and
wherein the circuitry is configured to execute the first power supply process in such a manner that a sensitivity of a change in the output of the first energy storage to a change in the at least one of the request supply amount and the request output amount in the first power supply process is relatively lower than a sensitivity of a change in an input of the second energy storage to a change in the at least one of the request supply amount and the request output amount in the first power supply process.

11. The power supply system according to claim 10, wherein the circuitry is configured to control the power transmission circuit to, in the first power supply process, output from the first energy storage a base supplied power set regardless of the at least one of the request supply amount and the request output amount, in such a manner as to
supply a supplied power that is a portion of the base supplied power corresponding to the at least one of the request supply amount and the request output amount to the electric load, and charge the second energy storage with a supplied power equal to a difference obtained by subtracting the supplied power that is a portion of the base supplied power corresponding to the at least one of the request supply amount and the request output amount from the base supplied power.

12. The power supply system according to claim 11, wherein the circuitry is configured to have a function of setting the base supplied power to be variable in accordance with the remaining capacity of the second energy storage so that the base supplied power decreases as the remaining capacity of the second energy storage approaches the first threshold value.

13. The power supply system according to claim 1, wherein the electric load is an electric motor.

14. The power supply system according to claim 13, wherein the power transmission circuit includes
a voltage converter that converts an output voltage of at least one of the first energy storage and the second energy storage to produce a voltage and outputs the produced voltage, and
an inverter that converts a direct-current power input from the first energy storage, the second energy storage, or the voltage converter into an alternating-current power and supplies the alternating-current power to the electric motor.

15. A transportation device comprising
the power supply system according to claim 1.

16. A power transmission method for performing power transmission among an electric load, a first energy storage, and a second energy storage, the first energy storage including a plurality of energy storage units connected to each other in parallel, the power transmission method comprising:
acquiring at least one of a request supply amount of electric power to be supplied to the electric load and a request output amount of regenerative electric power output from the electric load;
acquiring failure detection information indicating whether there is a failure in each of the plurality of energy storage units of the first energy storage;
controlling electric power transmission among the electric load and at least one of the first energy storage and the second energy storage in accordance with the at least one of the request supply amount and the request output amount such that a ratio of an amount of electric power supplied from or to the first energy storage and an amount of electric power supplied from or to the second energy storage is to be a first ratio in a normal operating state in which no failure is detected in all of the plurality of energy storage units of the first energy storage based on the failure detection information; and
controlling the electric power transmission in accordance with the at least one of the request supply amount and the request output amount such that the ratio is to be a second ratio which is different from the first ration in a partial failure state in which at least one failure is detected in the plurality of energy storage units of the first energy storage based on the failure detection information.

* * * * *